United States Patent [19]

Tsukamoto et al.

[11] Patent Number: 5,668,641
[45] Date of Patent: Sep. 16, 1997

[54] FACSIMILE APPARATUS FOR ERROR RETRANSMISSION

[75] Inventors: Takeshi Tsukamoto, Kawasaki; Yosuke Ezumi, Yokohama, both of Japan

[73] Assignee: Canon Kabushiki Kaisha, Tokyo, Japan

[21] Appl. No.: 680,884

[22] Filed: Jul. 16, 1996

Related U.S. Application Data

[63] Continuation of Ser. No. 233,418, Apr. 28, 1994, abandoned.

[30] Foreign Application Priority Data

Apr. 28, 1993 [JP] Japan ................. 5-102748

[51] Int. Cl.⁶ ........................... H04N 1/333
[52] U.S. Cl. .................. 358/436; 358/438; 371/32
[58] Field of Search ............ 358/400, 404–406, 358/434–439, 444; 371/5.5, 32; H04N 1/000, 1/333

[56] References Cited

U.S. PATENT DOCUMENTS

| | | | |
|---|---|---|---|
| 4,887,162 | 12/1989 | Azai | 358/400 |
| 5,105,423 | 4/1992 | Tanaka et al. | 358/439 |
| 5,172,246 | 12/1992 | Yoshida | 358/439 |
| 5,220,439 | 6/1993 | Yoshida | 358/404 |
| 5,416,785 | 5/1995 | Nishii | 371/32 |
| 5,438,427 | 8/1995 | Yoshida | 358/439 |

FOREIGN PATENT DOCUMENTS

| | | |
|---|---|---|
| 0448405 | 9/1991 | European Pat. Off. . |
| 0508659 | 10/1992 | European Pat. Off. . |

*Primary Examiner*—Kim Vu
*Attorney, Agent, or Firm*—Fitzpatrick, Cella, Harper & Scinto

[57] ABSTRACT

A facsimile apparatus is provided which having a memory of small capacity and a low speed printer. When printing of received data is late owing to a print speed lower than a reception rate, a time period required for printing is calculated and some operations are executed according to the calculated time period. When the calculated time period is short for printing a flow control according to the recommendation CCITT T39 is conducted, while when it is longer the data amount corresponding to the time period is calculated and resend of the number of frames corresponding to the calculated data amount is requested to a sending station. Thereby, received data is printed with adequate printing time period.

8 Claims, 48 Drawing Sheets

FIG. 1
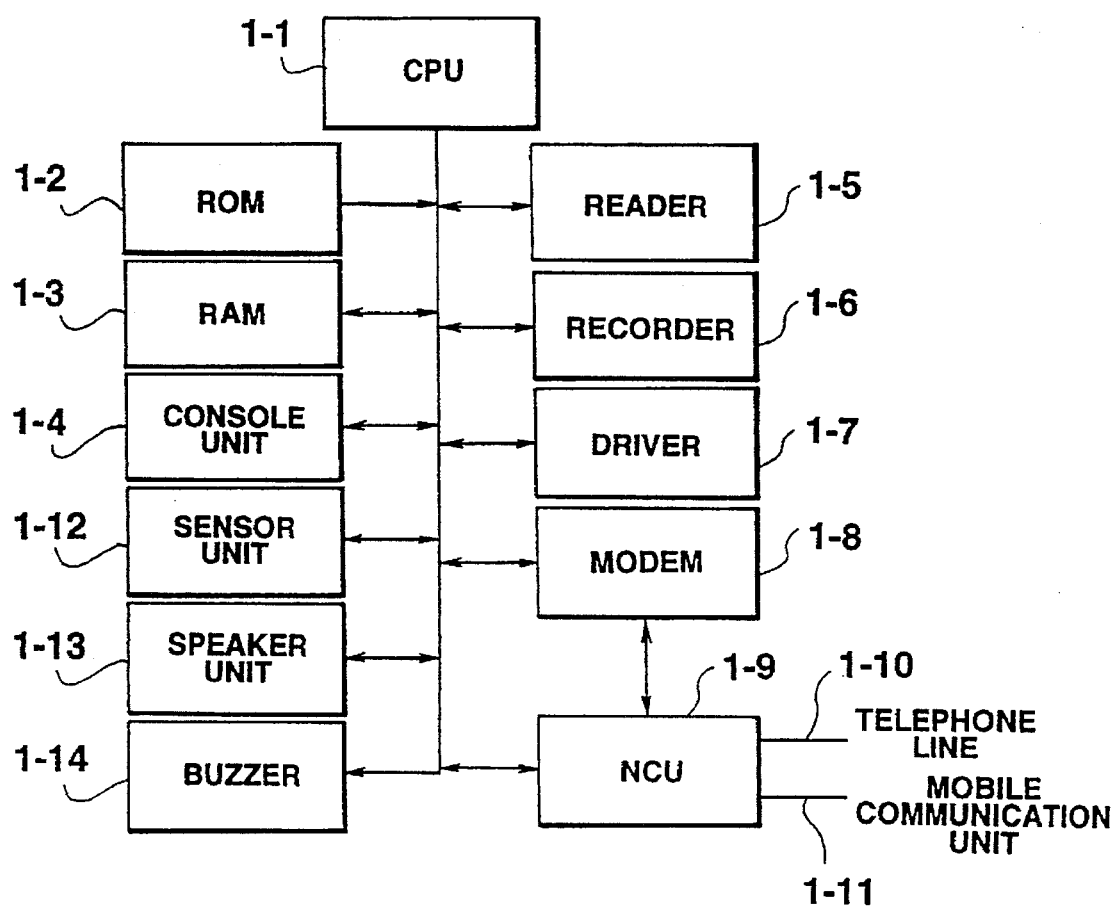
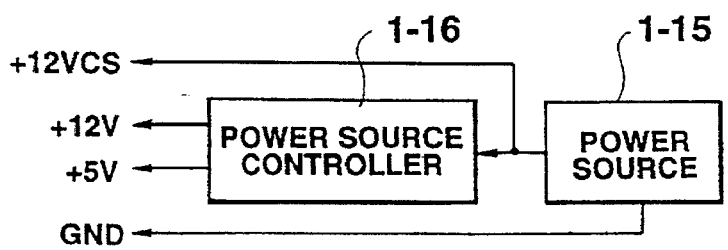

FACSIMILE APPARATUS FOR ERROR RETRANSMISSION

This application is a continuation of application Ser. No. 08/233,418 filed Apr. 28, 1994, which is now abandoned.

BACKGROUND OF THE INVENTION

1. Field of the Invention

The present invention relates to a small image communication apparatus which can request error retransmission (i.e., which has an error correction function, or, an ECM function).

2. Related Background Art

A conventional facsimile apparatus having an error retransmission request function (ECM reception) comprises a large-capacity storage means and a high-speed reproducing (printing) means.

Such a facsimile apparatus uses a memory properly for reception and printing of image signals as needed.

With this arrangement, while image signals are being written in the memory for reception, a previous page (or previous block) received in advance is printed.

Since the storage capacity of the storage means is large, even if there is an error at the beginning of a page, the error portion is retransmitted. The error portion is then reproduced during reception of the next page, or at the end of communication.

Even when the memory becomes full, one page (one block) or more can be reproduced and printed at a high speed, while flow control is performed, thereby setting reception of the next page (block) within a recommended predetermined time.

Furthermore, when printing is not completed within a time upon reception of an elongated original or the like, the latest page (block) is requested to be retransmitted in units of pages (blocks), and a previous page is printed during retransmission of this page (block).

In a small facsimile apparatus such as a portable one, the ECM function is necessary for performing normal communication through the connection with a portable telephone or the like.

A conventional facsimile apparatus having the large-capacity storage means and the high-speed reproducing means results in high cost. At the same time, this results in a larger and complex apparatus using a high energy.

For this reason, in order to arrange a small, light weight, and energy-saving facsimile apparatus having the ECM function at low cost, the ECM reception must be performed using a storage means with a minimum capacity and a low-speed reproducing means.

In addition, a communication time must be minimized to reduce the load of a user.

SUMMARY OF THE INVENTION

It is an object of the present invention to improve a communication apparatus.

It is another object of the present invention to improve a facsimile apparatus.

It is still another object of the present invention to realize smooth ECM reception using a storage means with a minimum capacity and a low-speed reproducing means.

BRIEF DESCRIPTION OF THE DRAWINGS

FIG. 1 is a block diagram showing the arrangement of a main body of a portable facsimile apparatus according to one embodiment of the present invention.

DETAILED DESCRIPTION OF THE PREFERRED EMBODIMENT

Figure 2A:
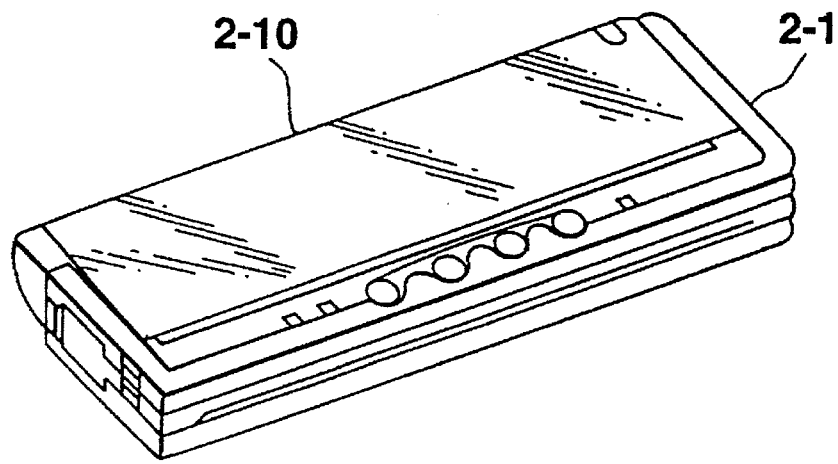
FIGS. 2(a) and 2(b) are perspective views of the portable facsimile apparatus.

An embodiment according to the present invention will be described in detail with reference to the accompanying drawings.

FIG. 1 is a block diagram showing the arrangement of a main body according to this embodiment.

Referring to FIG. 1, a CPU 1-1 controls the overall operation of the portable facsimile apparatus according to programs stored in ROM 1-2, i.e., the function of controlling RAM 1-3, console unit 1-4, reader 1-5, recorder 1-6, driver 1-7, modem 1-8, NCU 1-9, telephone line 1-10, mobile communication unit 1-11, sensor unit 1-12, speaker unit 1-13, buzzer 1-14, power source 1-15, and power source controller 1-16.

RAM 1-3 stores binary image data read by reader 1-5, binary image data to be recorded by the recorder 1-6, and binary data to be modulated by modem 1-8 and transmitted through NCU 1-9 to telephone line 1-10. A signal received through the telephone line 1-10 is demodulated by modem 1-8 through NCU 1-9, and the demodulated binary data is stored in RAM 1-3.

Console unit 1-4 includes a transmission/reception start key, a mode key for designating an image quality mode, such as fine or standard, of the image to be transmitted, a copy key for performing a copying operation, an economy key for designating an energy-saving mode in recording/printing by use of a battery, and a stop key for stopping the operation of the main body. The CPU 1-1 detects the states of each of the console unit keys and controls the respective components in accordance with the states of each of the keys.

Reader 1-5 includes a DMA controller, a CCD or contact image sensor (CS), a TTLIC, a binarizing circuit, etc. The reader 1-5 causes the CCD or CS to convert the read data into binary data, under the control of CPU 1-1 and sequentially sends the binary data to RAM 1-3.

Recorder 1-6 includes a DMA controller, a B4/A4 size thermal head, a TTLIC, etc. The reader 1-6 reads out the recorded data from RAM 1-3 under the control of CPU 1-1 and prints out the recorded data as a hard copy.

Driver 1-7 includes a stepping motor for driving feed/discharge rollers in reader 1-5 and recorder 1-6, gears for transmitting the driving force of the motor, a driver circuit for controlling the motor, etc.

Modem 1-8 includes any suitable modem, such as G3, G2, G1 and old FM modems, a clock generator connected to the modems, etc. The modem 1-8 modulates the transmission data stored in RAM 1-3 under the control of CPU 1-1 and outputs the modulated data to telephone line 1-10 or mobile communication unit 1-11 through NCU 1-9. In addition, modem 1-8 receives an analog signal from telephone line 1-10 or mobile communication unit 1-11 through NCU 1-9, demodulates the analog signal, and stores it in RAM 1-3. The modem 1-8 has a power-saving mode, which saves on the consumption of electric power and is operated by the CPU 1-1. In the power-saving mode, the electric power consumption can be decreased to $1/10$ of the normal consumption. However, when the power-saving mode is utilized, the facsimile apparatus can not perform image transmission or image reception.

NCU 1-9 comprises a DC loop circuit, a 2-to-4 wire converter, a receiving circuit, a signal detecting circuit, a line switching circuit, etc. The NCU 1-9 connects telephone line 1-10 or mobile communication unit 1-11 to modem 1-8.

The mobile communication unit 1-11 is defined as a radio communication unit, such as a portable telephone or a mobile telephone, and the mobile communication line is defined as a line used for the portable telephone and the mobile telephone.

Sensor unit 1-12 includes a recording paper width sensor, a recording paper presence sensor, a recording paper endmark sensor, an original sheet width sensor, and an original sheet presence sensor. The sensor unit 1-12 detects the states of the original sheet and the recording paper under the control of CPU 1-1.

Speaker unit 1-13 includes a speaker and a speaker driver, and is turned on/off in accordance with the control of CPU 1-1. The speaker unit 1-13 outputs sounds of plural kinds of signals which are received through telephone line 1-10, and outputs sounds of key-touch, voice signals, and communication signals from the mobile communication unit 1-11.

Buzzer 1-14 includes a buzzer and a buzzer driver and generates a warning tone in accordance with the control of CPU 1-1.

Figure 3A:
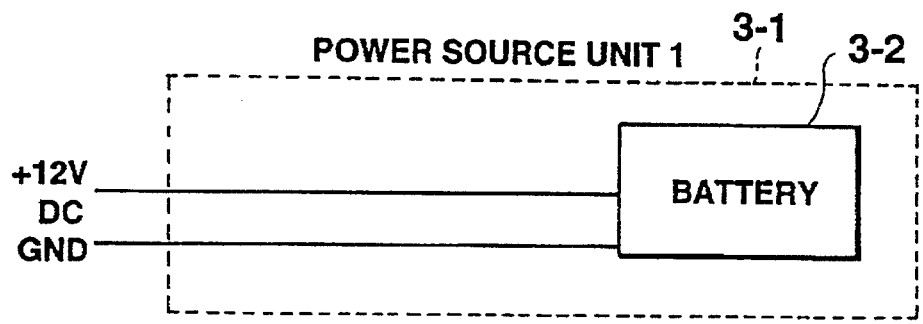
FIGS. 3(a) to 3(c) are block diagrams showing the arrangements of a power source of the main body.
Figure 3B:
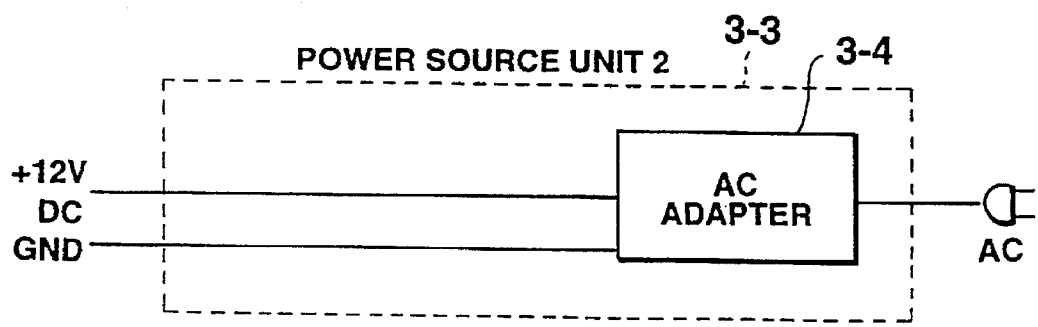
Figure 3C:
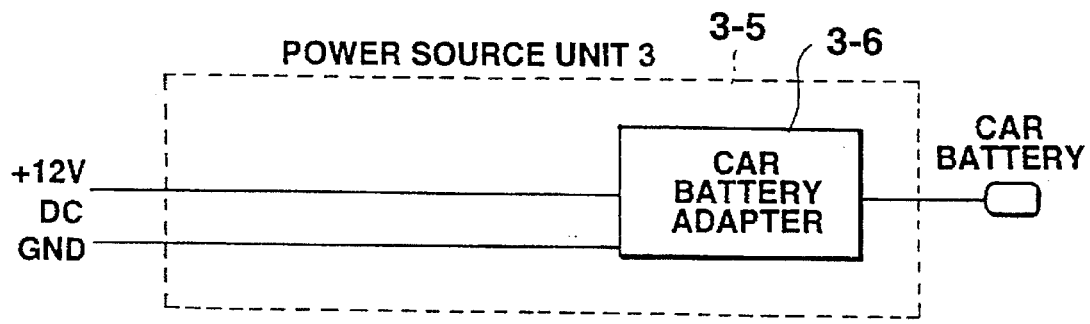

Power source 1-15 supplies power to the main body of the facsimile apparatus. The power source 1-15 supplies a DC voltage of +12 V and a GND by means of a battery, an AC power source, or a car battery (as shown in FIGS. 3(a)–3(c)).

Power source controller 1-16 includes a series regulator, a switching-regulator, a DC/DC convertor, a photovoltaic cell, and a MOSFET. The power source controller 1-16 converts the DC voltage of +12 V from power source 1-15 into a DC voltage of +5 V, and outputs the voltage of +5 V. The power source controller 1-16 is controlled by CPU 1-1. In an output sequence of the power source 1-15 and the power source controller 1-16, the DC voltage of +12 VCS is generated, then the DC voltage of +5 V is generated, and then the DC voltage of 12 V is generated. The voltage of +12 V can be turned on/off in accordance with the control of CPU 1-1.

Figure 2B:
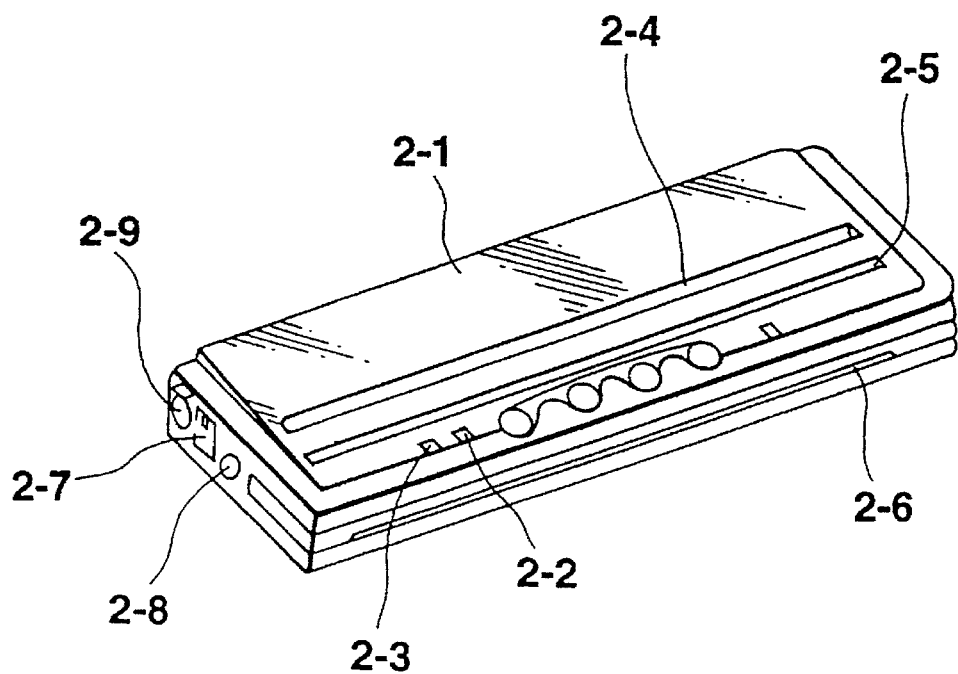

FIGS. 2(a) and 2(b) are outline views of the facsimile apparatus. Numeral 2-1 denotes the main body of the facsimile apparatus. Numeral 2-2 denotes the console unit, and Numeral 2-3 denotes a display unit. Numeral 2-4 denotes a recording paper inserting unit which enables manual setting of recording paper, and Numeral 2-5 denotes an original sheet inserting unit which enables manual setting of an original sheet. The original sheet inserting unit 2-5 is also used as a recorded paper discharging unit for discharging the recorded paper.

Numeral 2-6 denotes an original sheet discharging unit for discharging read original sheets. Numeral 2-7 denotes a connector for connecting the main body of the facsimile apparatus to telephone line 1-10, and Numeral 2-8 denotes a connector for connecting the main body to the mobile communication unit 1-11.

Numeral 2-9 denotes a power switch for supplying the power to the main body. Numeral 2-10 denotes a holder which holds a roll of paper. FIG. 2(a) shows a condition wherein the holder 2-10 is attached to main body 2-1.

FIGS. 3(a) to 3(c) are block diagrams showing the structure of power source 1-15. In FIG. 3(a), power source 1-15 consists of a battery 3-2 of a DC voltage of +12 V.

In FIG. 3(b), power source 1-15 consists of an AC adapter 3-4 which converts the AC power source into a DC voltage of +12 V. In FIG. 3(c), power source 1-15 consists of a car battery adapter 3-6 which converts a DC power from the car battery into a stabilized DC voltage of +12 V.

Figure 4:
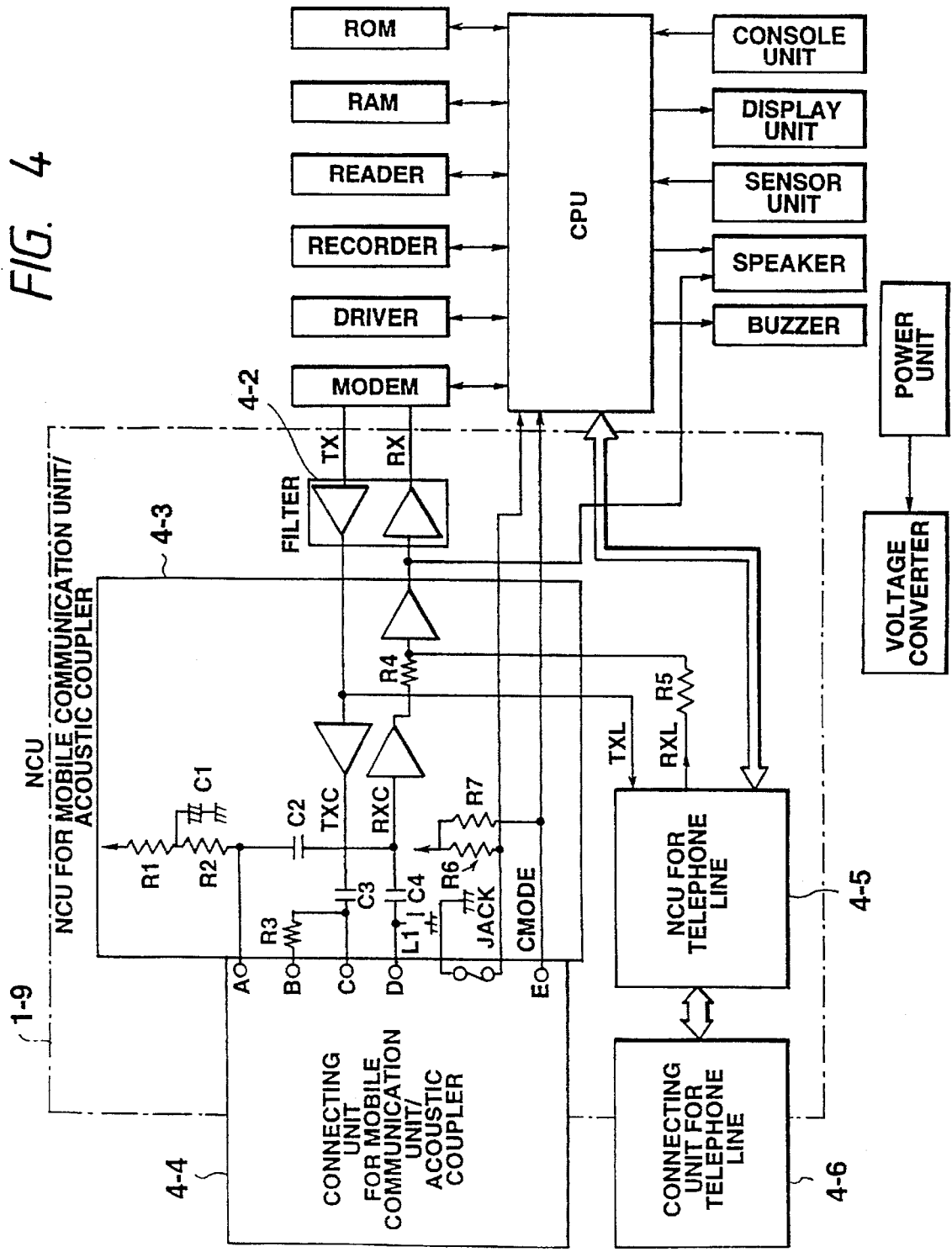
FIG. 4 is a detailed block diagram showing the arrangement of NCU 1–9.

FIG. 4 is a block diagram showing a detailed structure of the NCU 1-9. The NCU 1-9 consists of a filter unit 4-2, an NCU 4-3 for a mobile telephone/acoustic coupler, a connector unit 4-4 for a mobile telephone/acoustic coupler, an NCU 4-5 for a telephone line, and a connector unit 4-6 for a telephone line.

Filter unit 4-2 is a low-pass filter which includes OP amplifiers and other components. The NCU 4-3 for a mobile telephone/acoustic coupler is composed of OP amplifiers, resistors, condensers, inductors, etc. A signal to be transmitted is amplified by filter unit 4-2, is adjusted to a signal level corresponding to mobile communication unit 1-11 or to the acoustic coupler by the NCU 4-3, and then is output as a transmission signal TXC. A receiving signal from the mobile communication unit 1-11 is amplified by an OP amplifier of the NCU 4-3 through inductors and condensers, and is then sent to the filter unit 4-2 through an adder circuit. The signal from the condenser microphone of the acoustic coupler is amplified by an OP amplifier through condensers, and is then supplied to filter unit 4-2 through the adder circuit. The NCU 4-3 includes power source which supplies a power to the condenser microphone of the acoustic coupler. The NCU 4-3 supplies both the receiving signal RXC from the mobile communication unit/acoustic coupler, and the receiving signal RXC from the telephone line, to the filter unit 4-2 through the adder circuit. The structure of NCU 4-3 may be modified so as to supply power selectively by using an analog switch, a relay, etc.

Connector unit 4-4 is a connector having a switch, and serves as an interface for the mobile communication unit and the acoustic coupler. Terminal C supplies a transmitting signal TX from the modem 1-8 to the mobile communication unit 1-11. Terminal D supplies the receiving signal from the mobile communication unit 1-11 to the modem 1-8. Terminal A supplies the transmitting signal from the modem 1-8 to the acoustic coupler. Terminal B supplies the receiving signal from the acoustic coupler to the modem 1-8.

Figure 5:
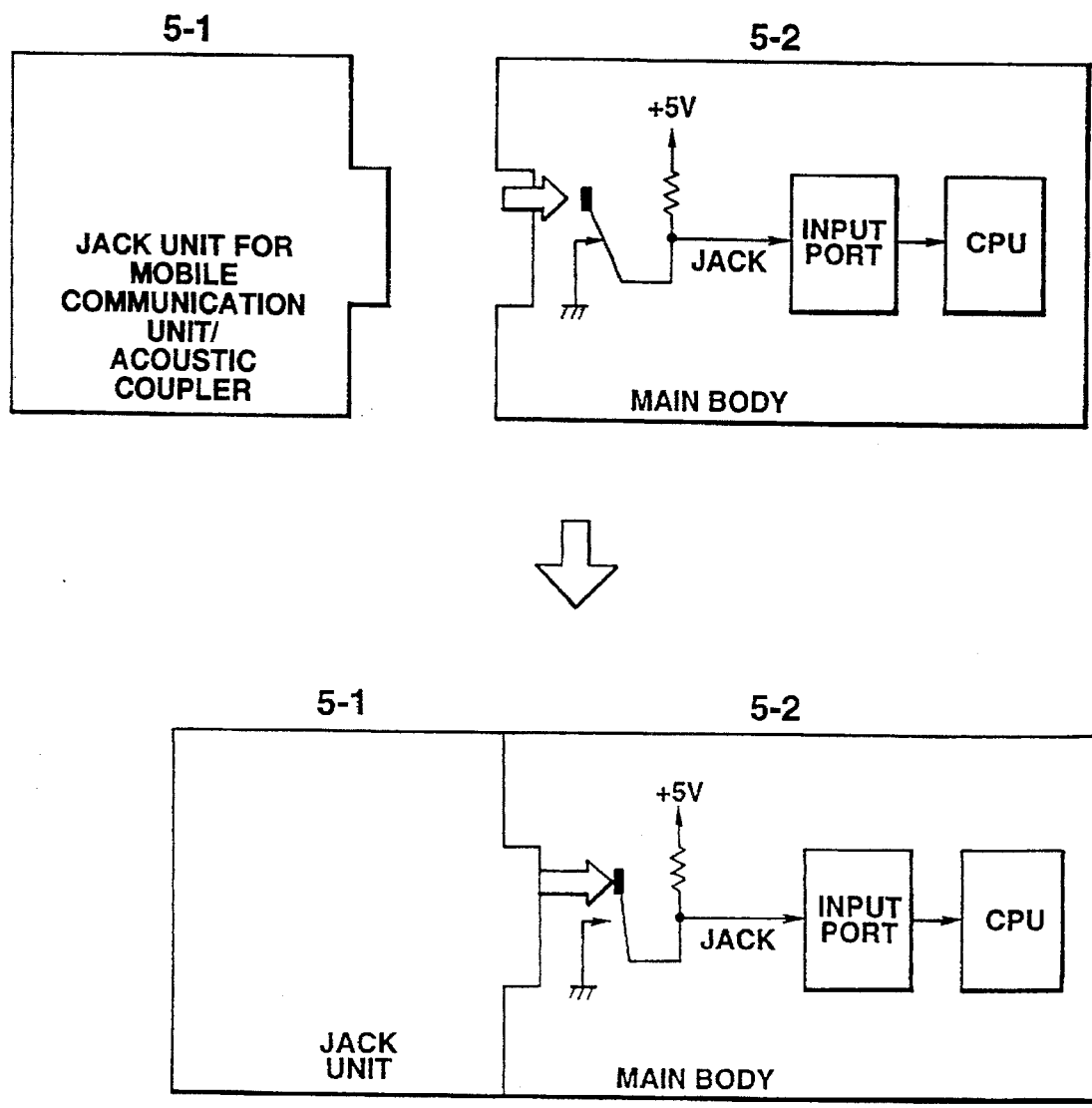
FIG. 5 is a view showing a condition of the signal JACK.

A signal JACK indicates whether a plug of the mobile communication unit 1-11 or the acoustic coupler is connected into the connector unit 4-4. The signal JACK is applied to CPU 1-1. FIG. 5 is a view showing a condition of the signal JACK. When the plug 5-1 of the mobile communication unit 1-11, or the acoustic coupler, is connected into the connector unit 4-4 of the main body 5-2, a switch in the connector unit 4-4 is turned off by the plug and the signal JACK is then switched from a LOW level to a HIGH level.

Figure 6:
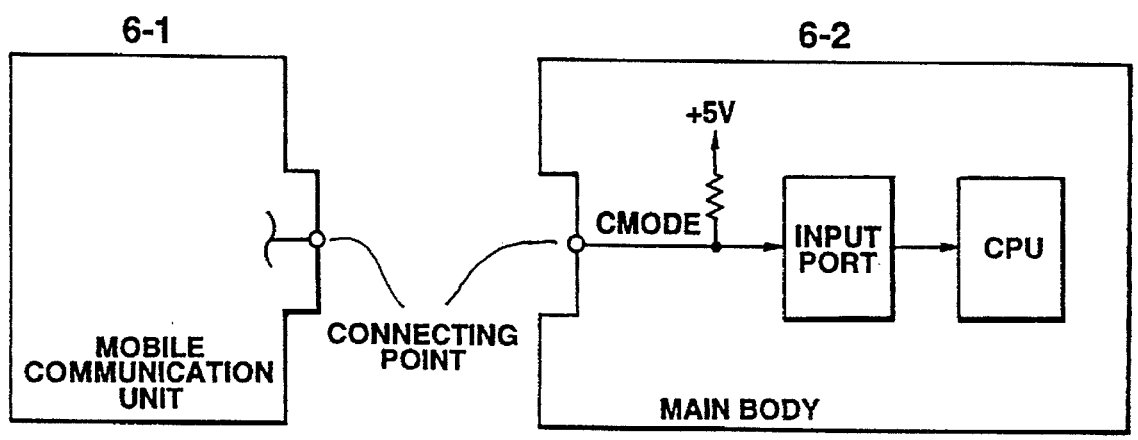
FIG. 6 and FIG. 7 are views showing a condition of the signal CMODE.
Figure 7:
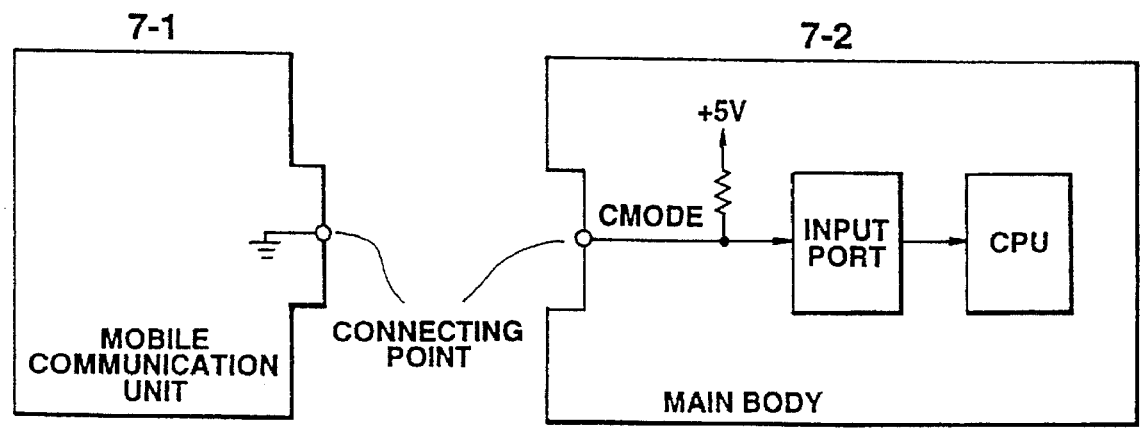

A signal CMODE (see FIG. 4) indicates whether the mobile communication unit 1-11 or the acoustic coupler is connected to the connector unit 4-4. In the case where the mobile communication unit 1-11 is connected to the connector unit 4-4 of the main body 6-2, the signal CMODE is at a HIGH level as shown in FIG. 6. On the other hand, when the acoustic coupler is connected into the connector unit 4-4 of the main body 7-2, the signal CMODE is at a LOW level as shown in FIG. 7.

The connector unit 4-4 includes a GND for the signal JACK.

By using the above-described signals, the portable facsimile apparatus checks whether any plug (the mobile communication unit or the acoustic coupler) is inserted into the connector unit 4-4 or not. The CPU then changes the level of a transmitted signal and the speed of the signal in accordance with the signal JACK.

In a case where the plug of the mobile communication unit or the acoustic coupler is inserted into the connector unit 4-4, CPU 1-1 sets a communication speed of 4800 bps. On the other hand, in a case where the telephone line is connected to the connector unit 4-6, CPU 1-1 sets the communication speed to 9600 bps (bits per second). The portable facsimile apparatus selects either the receiving signal from the connector unit 4-4 or the receiving signal from the connector unit 4-6, and switches the level of monitoring communication signals in accordance with the signal JACK.

Further, in accordance with the signal CMODE, the CPU 1-1 discriminates whether the mobile communication unit or the acoustic coupler is connected to the connector unit 4-4, and then sets the transmitting level and the receiving level at adequate values corresponding to the mobile communication unit and the acoustic coupler.

The NCU 4-5 for the telephone line includes the DC loop circuit and the 2 to 4 wire converter and seizes the telephone line in accordance with the control of the CPU 1-1.

The connector unit 4-6 is a JACK unit for connecting a telephone line to this facsimile apparatus.

Figure 8:
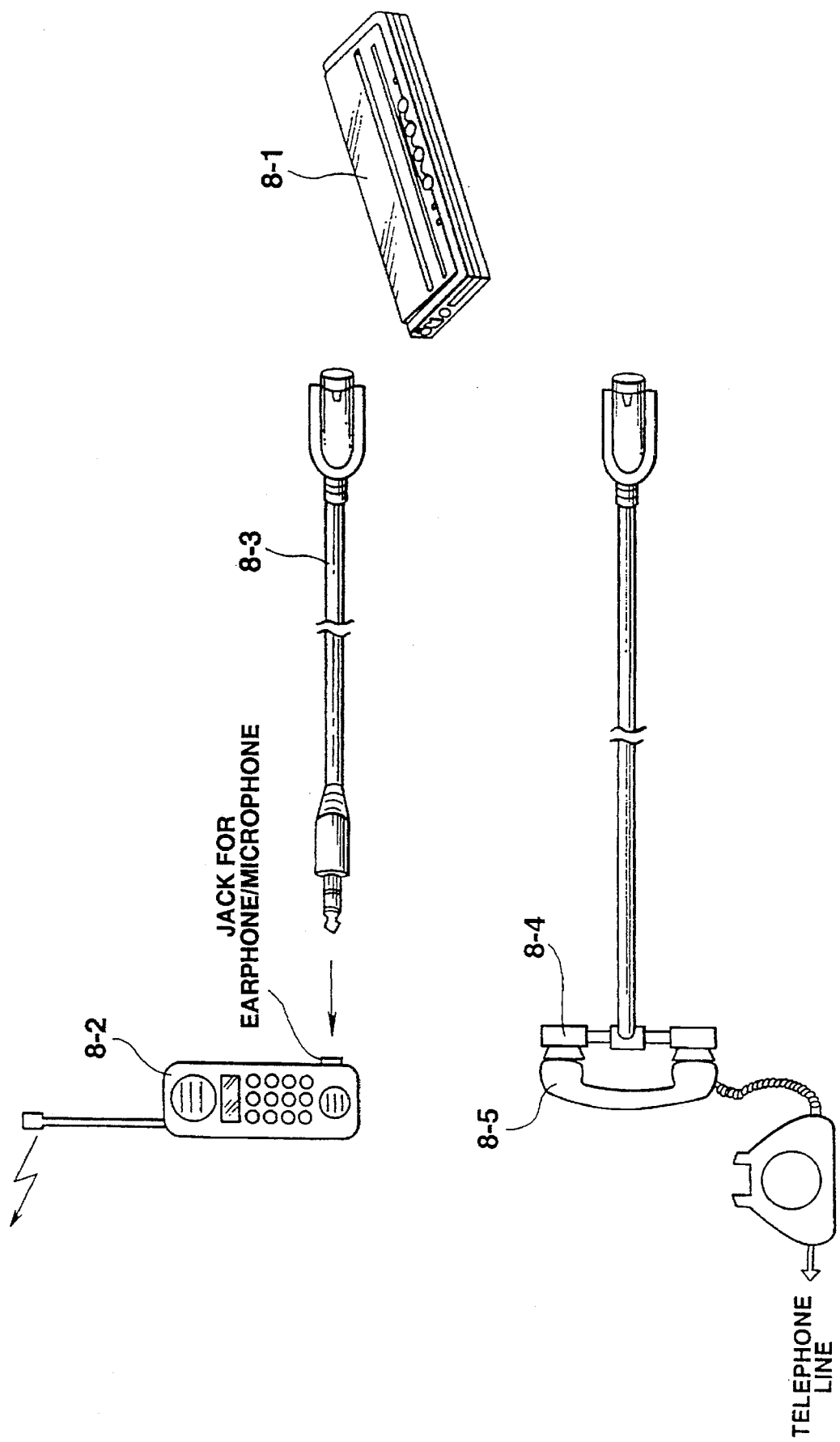
FIG. 8 is a view showing a connection condition between the main body and communication links.

FIG. 8 is a view showing a condition in which the main body 8-1 of the portable facsimile apparatus is connected to the mobile communication unit 8-2 through a cable 8-3. As shown in FIG. 6, when the mobile communication unit is connected to the main body, the signal CMODE goes to the HIGH level.

FIG. 8 also shows a condition in which the main body 8-1 is connected to the acoustic coupler 8-4 and a telephone 8-5. As shown in FIG. 7, when the acoustic coupler 8-4 is connected to the main body, the signal CMODE goes to the LOW level.

Figure 9:
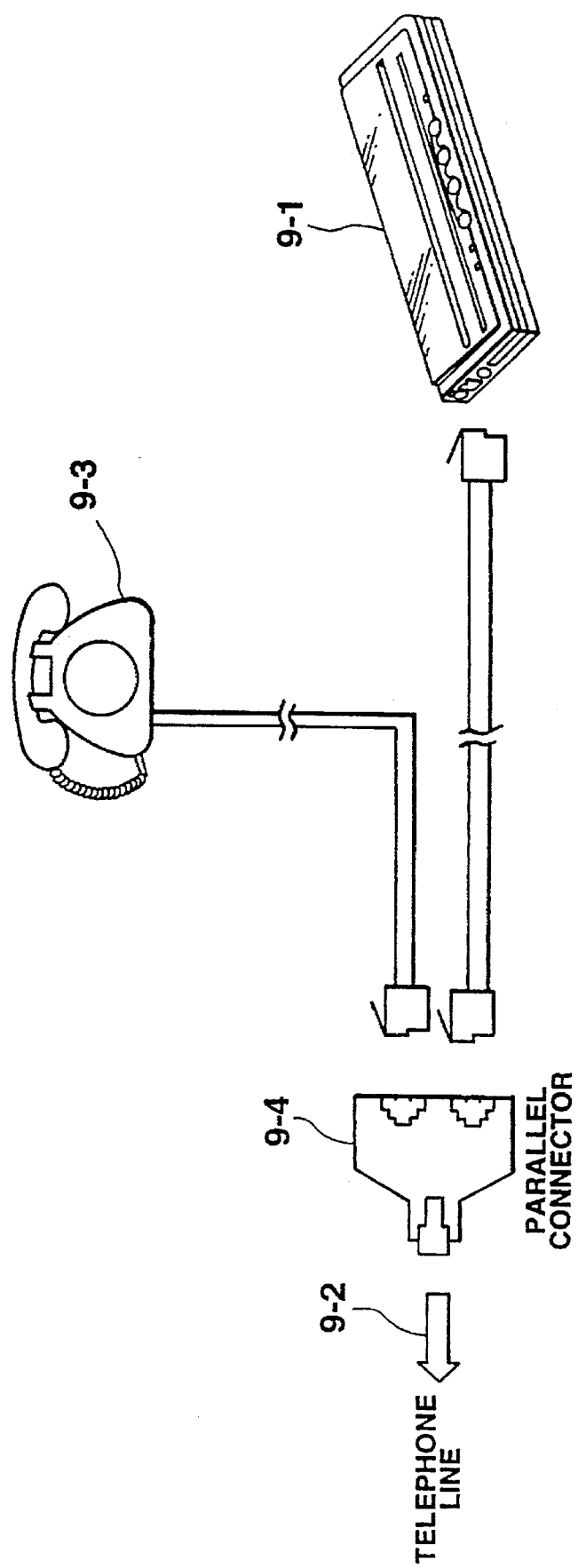
FIG. 9 is a view showing a connecting condition of the main body, a telephone and a communication line through a parallel connector.

FIG. 9 shows a condition in which the main body of the portable facsimile apparatus is connected to the telephone line 9-2 and a telephone 9-3 through a parallel connector 9-4.

The operation of the portable facsimile apparatus will now be described as follows. The control programs which are performed by CPU 1-1 have been stored in ROM 1-2.

Figure 10:
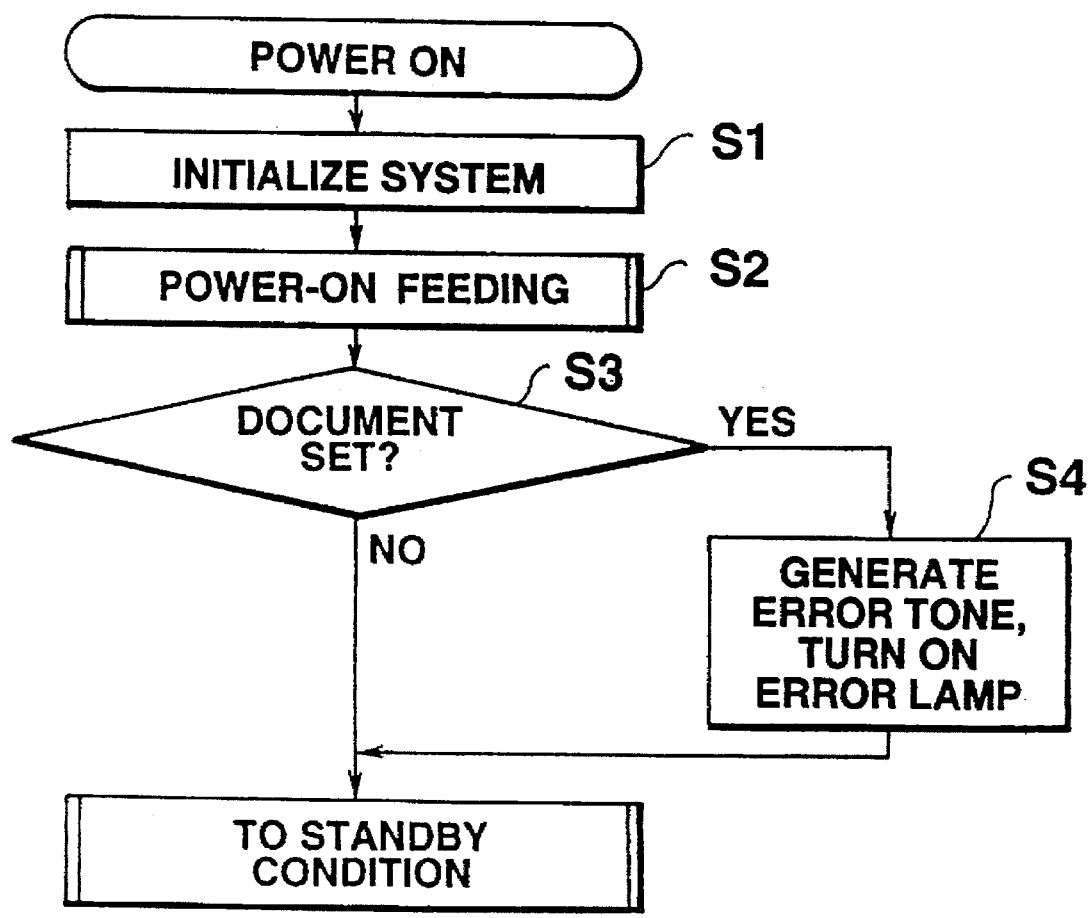
FIG. 10 is a flow chart showing a power-on operation.

When power is supplied to the portable facsimile apparatus, in step S1 of FIG. 10 CPU 1-1 initializes each unit described above in the system of the portable facsimile apparatus. In step S2, CPU 1-1 performs a feeding operation when power is turned on. In the feeding operation, CPU 1-1 switches a pendulum, which is in a switching unit of a driver, from a recording sheet side to an original sheet side, by means of rotating a motor in the driver. The portable facsimile apparatus uses the driving power of the motor to transfer either an original document or a recording sheet by switching the pendulum setting. The feeding operation will be described in detail below. In step S3, CPU 1-1 discriminates whether an original document is set in reader 1-5 when the power is turned on. In a case where an original document is present, in step S4 CPU 1-1 turns on an error lamp and generates an alarm to inform an operator of it and then shifts to a standby mode, shown in FIG. 11.

Figure 11:
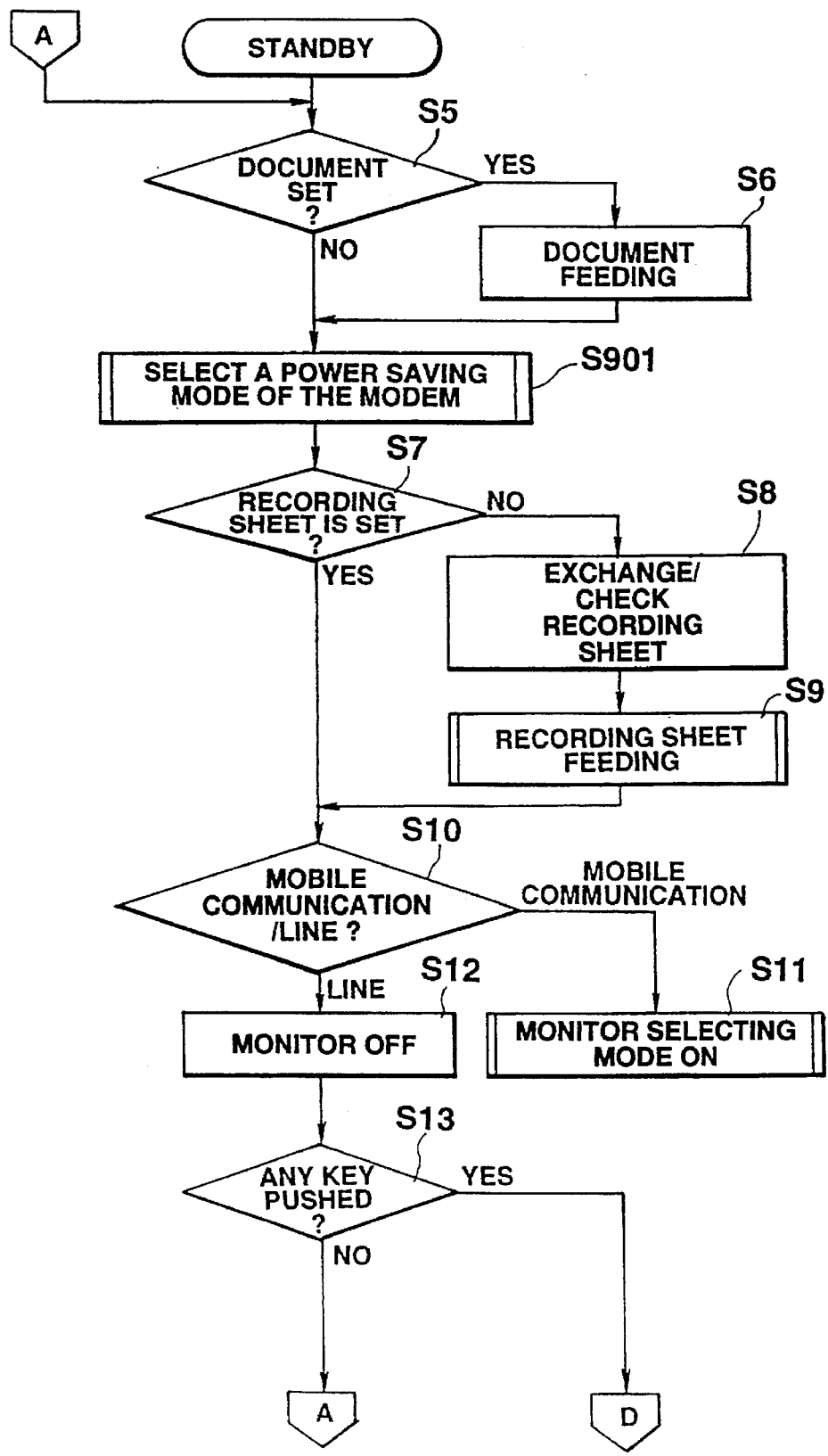
FIG. 11 and FIG. 12 together form a flow chart showing a standby operation.

In step S5 of FIG. 11, the CPU 1-1 discriminates whether an original document has been set in reader 1-5. In the case where an original document is present, CPU 1-1 feeds the original document to a reading position in the reader 1-5 in step S6. In step S901, CPU 1-1 sets the modem 1-8 into the power-saving mode. In step S7, the CPU 1-1 discriminates whether a recording sheet has been set in the recorder 1-6. In a case where no recording sheet has been set, CPU 1-1 performs an operation of indicating that no recording sheet has been set, and again checks whether a recording sheet is set in step S8. If a recording sheet has been set, in step S9 the CPU 1-1 performs the operation of feeding the recording sheet. Then, in step S10, the CPU 1-1 discriminates whether a line connected to the main body is the mobile communication unit 1-11 or the telephone line 1-10. In a case where the connected line is the mobile communication unit 1-11, in step S11 the CPU 1-1 performs an operation (FIG. 18) of setting a monitor mode which outputs a communication signal from the speaker unit 1-13. On the other hand, in a case where the connected line is the telephone line 1-10, in step S12 the CPU 1-1 sets the monitor mode to off.

Figure 12:
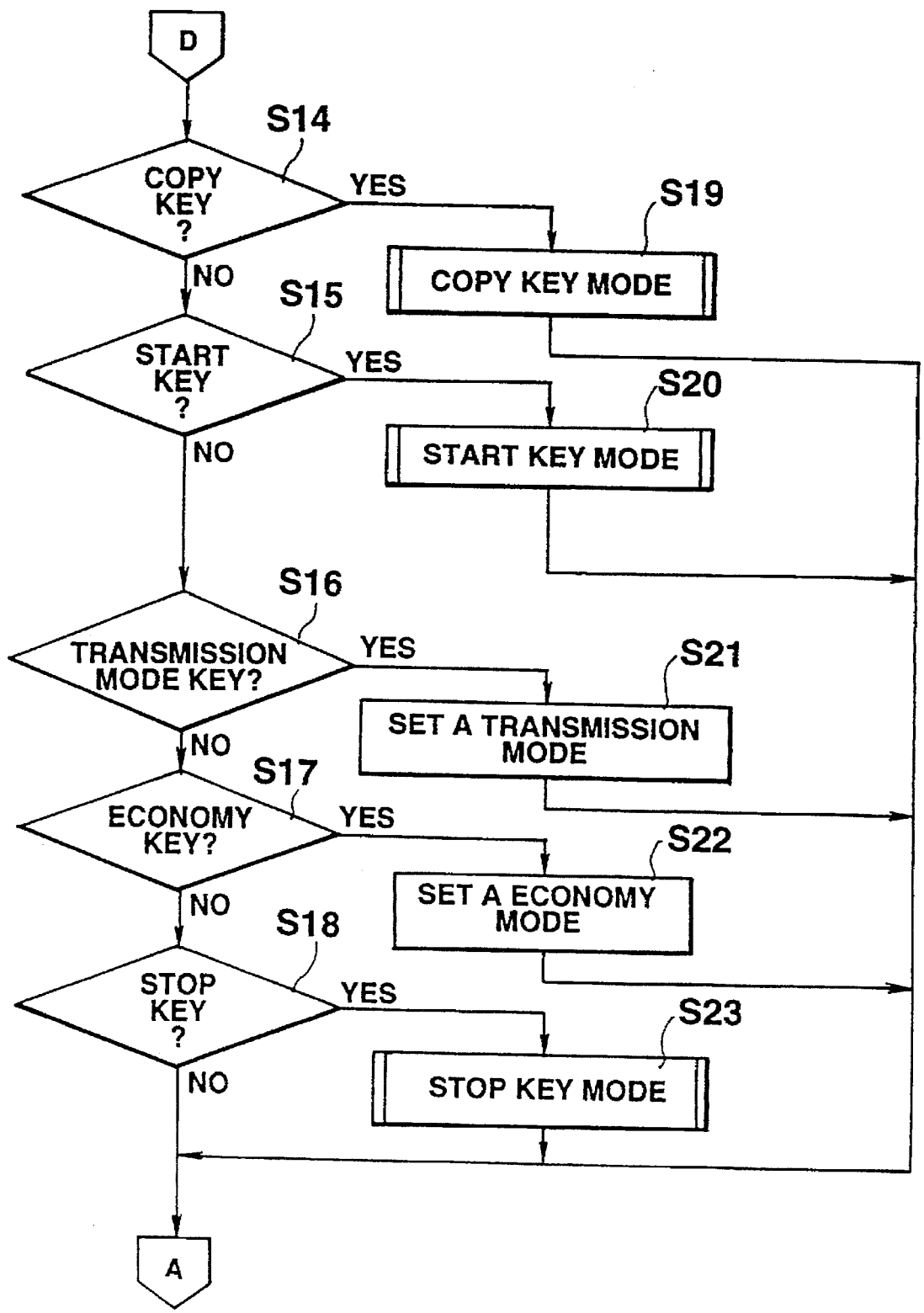

In step S13, the CPU 1-1 discriminates whether any key has been pushed. If any key is pushed, the CPU 1-1 shifts from step S13 to step S14 (FIG. 12). On the other hand, if no key has been pushed, the CPU 1-1 returns to step S5.

The CPU 1-1 discriminates whether the pushed key is the copy key (step S14), a transmission mode key (step S15), an economy key (step S17), or a stop key (step S18). If the pushed key is the copy key, the CPU 1-1 performs an operation of a copy key mode (FIG. 13) in step S19. If the pushed key is the start key, the CPU 1-1 performs an operation of a start key mode (FIG. 14) in step S20. If the pushed key is the transmission key, the CPU 1-1 sets a line density of reading a document (standard mode: 3.85 lines/mm, or fine mode: 7.7 lines/mm) in step S21. If the pushed key is the economy key, the CPU 1-1 sets an economy mode, which prints image data intermittently so as to save printing energy, in step S22. If the pushed key is the stop key, the CPU 1-1 performs an operation of a stop key mode (FIG. 17) in step S23. The CPU 1-1 then returns to the standby condition of FIG. 11.

Figure 13:
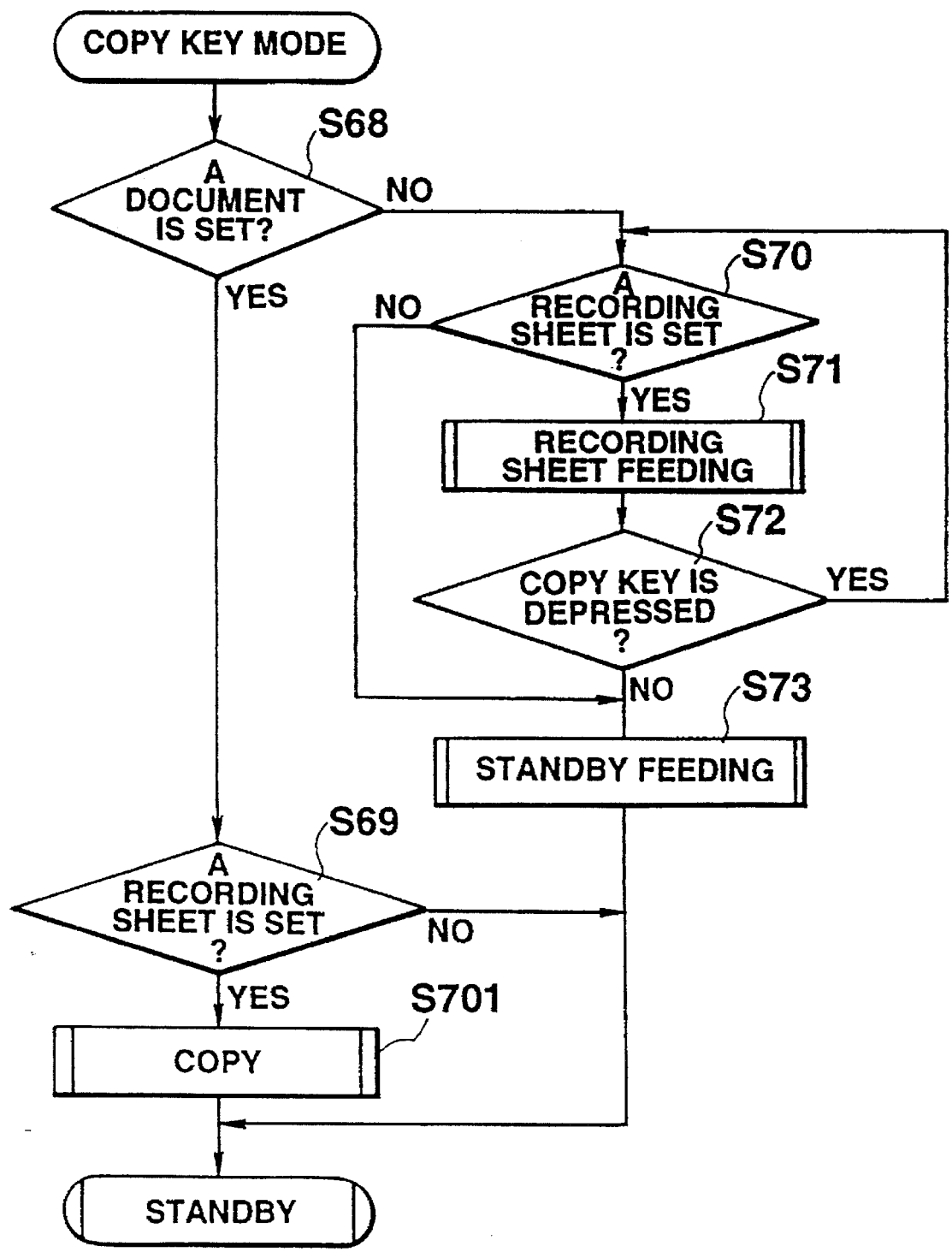
FIG. 13 is a flow chart showing an operation of a copy key mode.

FIG. 13 is a flow chart showing the operation of the copy key mode of step S19 (FIG. 12).

In step S68, the CPU 1-1 discriminates whether an original document has been set. In a case where an original document has been set, the CPU 1-1 discriminates whether a recording sheet is in the recorder 1-6 in step S70. If a recording sheet is present, the CPU 1-1 performs a feed operation of the recording sheet (FIG. 20) so as to feed the recording sheet a fixed amount in step S71, and then discriminates whether the copy key is still activated in step S72. In a case where the copy key is still depressed, the CPU 1-1 returns to step S70 and continues to perform the feed operation on the recording sheet. If a recording sheet is not in the recorder 1-6 in step S70, or if the copy key is not yet depressed in step S72, the CPU 1-1 performs a standby feed operation (FIG. 19) in step S73, and then returns to the standby condition of step S5 (FIG. 11). In the standby feed operation, the CPU 1-1 puts the driver 1-7 back in the initial position. On the other hand, in a case where an original document is in the reader 1-5 in step S68, the CPU 1-1 discriminates whether a recording sheet has been set in step S69. If not, the CPU 1-1 shifts to the standby condition of step S5 (FIG. 11). On the other hand, if a recording sheet has been set in step S69, the CPU 1-1 performs a copying operation (FIG. 22) in step S701, and then shifts to the standby condition of step S5.

Figure 14:
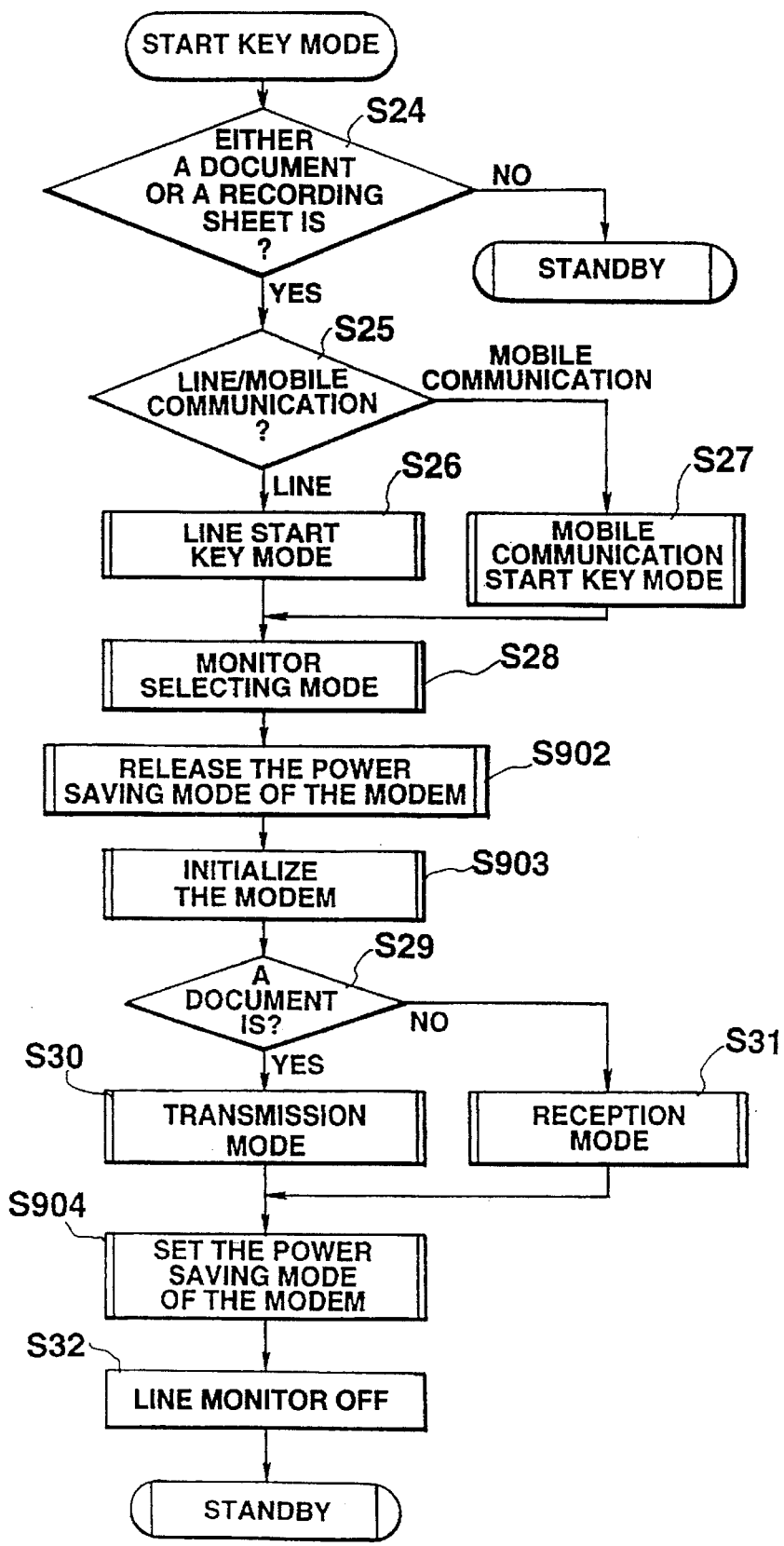
FIG. 14 is a flow chart showing an operation of a start key mode.

FIG. 14 is a flow chart showing an operation of the start key mode of step S20 (FIG. 12).

In step S24 of FIG. 14, the CPU 1-1 checks whether an original document and a recording sheet have been set. If they have not been set, the CPU 1-1 returns to the standby condition of step S55 (FIG. 11). On the other hand, in a case where either has been set, the CPU 1-1 checks whether the telephone line 1-10 or the mobile communication unit 1-11 has been connected to the NCU 1-9 in step S25. If the telephone line 1-10 has been connected, the CPU 1-1 performs an operation of a line start key mode (FIG. 15) in step S26. If the mobile communication unit 1-11 has been connected, the CPU 1-1 performs an operation of a mobile communication start key mode (FIG. 16) in step S27.

Next, the CPU 1-1 performs an operation of a monitor select mode (FIG. 18) in step S28, performs an operation of releasing a power-save mode of the modem 1-8 in step S902, and then performs a mode initializing operation in step S903. The CPU 1-1 then discriminates whether an original document has been set in step S29. If so, the CPU 1-1 performs operation for the transmission mode (FIG. 34 to FIG. 36) in step S30. If no original document has been set, the CPU 1-1 performs operation for the reception mode (FIG. 25 to FIG. 27) in step S31.

Next, the CPU 1-1 performs the operation of setting the modem 1-8 to the power-save mode in step S904, stops the line-monitoring in step S32, and then returns to the standby condition.

Figure 15:
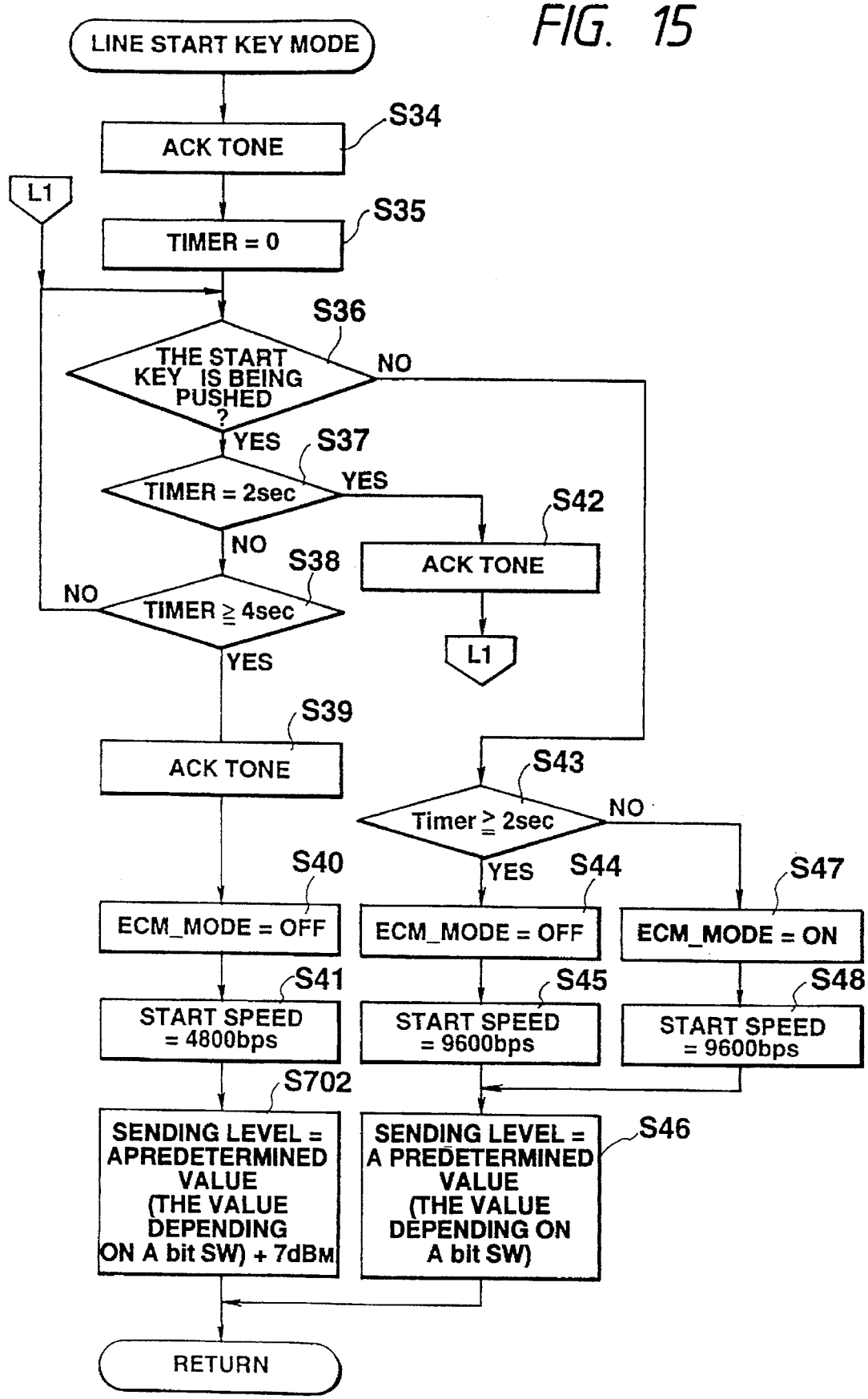
FIG. 15 is a flow chart showing an operation of a line start key mode.

FIG. 15 is a flow chart showing the operation of the line start key mode (step S26 of FIG. 14).

In step S34 of FIG. 15, the CPU 1-1 causes the buzzer 1-14 to generate a confirmation sound (an ACK tone) which indicates that the start key has been depressed, and in step S35, the CPU 1-1 initializes a timer (a software timer) to measure the time the start key remains depressed. While the start key is depressed the CPU 1-1 performs the processes of steps S36, S37 and S38. In step S37, the CPU 1-1 discriminates if the timer has counted two seconds. If so, the CPU 1-1 causes the buzzer 1-14 to generate the ACK tone in step S42, and then returns to step S36. In step S36, the CPU 1-1 discriminates if the start key is still depressed. If not, the CPU 1-1 discriminates whether the value of the timer is less than two seconds in step S43. On the other hand, in step S38, the CPU 1-1 discriminates whether the value counted by the timer is less than four seconds.

In a case where the timer has timed less than two seconds, the CPU 1-1 shifts from step S43 to step S47, sets a flag (ECM-MODE) to allow ECM communication in step S47, sets the communication speed at the start time to be 9600 bps in step S48, and then sets a level of transmitting a signal to be a predetermined value which is decided by bit switches (not shown) in step S46.

In a case where the value of the timer is greater than two seconds and less than four seconds, the CPU 1-1 shifts from step S43 to step S44, clears the flag ECM-MODE to prohibit the ECM communication in step S44, sets the communication speed at the start time to be 9600 bps in step S45, and then shifts to step S46.

In a case where of the timer has counted to four or more seconds, the CPU 1-1 shifts from step S38 to step S39, causes the buzzer 1-14 to generate the ACK tone in step S39, clears the flag ECM-MODE in step S40, sets the communication speed at the start time to be 4800 bps in step S41, sets the level at which the signal will be transmitted to be the predetermined value plus +7 dBm in step S702, and then returns to step S28 of FIG. 14. An operator can thereby manually select the communication mode (G3 or ECM) and the signal transmission level. In a case where an operator is aware that the communication is not good, he or she is able to select an appropriate communication mode and an appropriate level of transmission of the signal so that the time of the image communication will be shortened and the number of line errors will be decreased.

Figure 16:
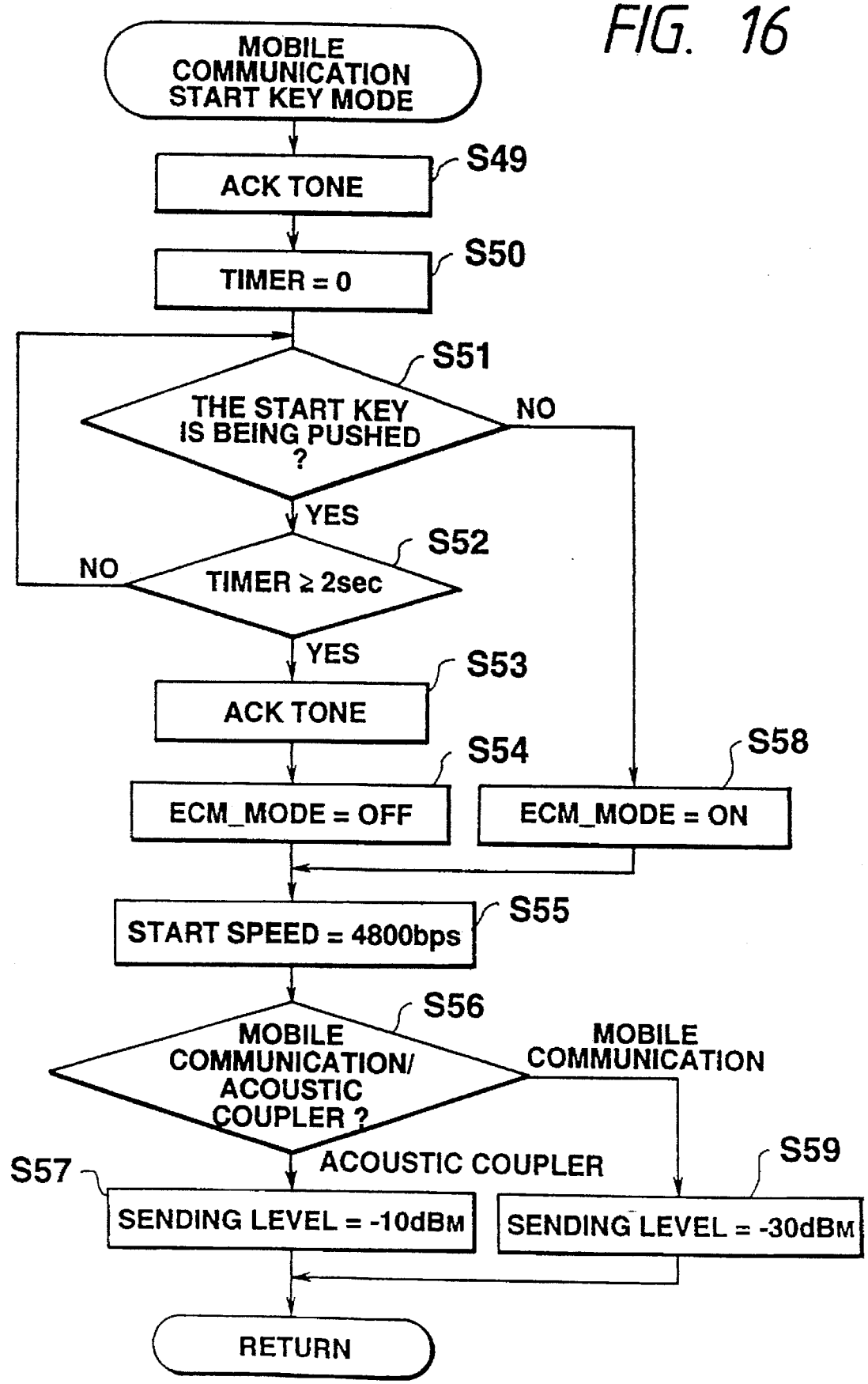
FIG. 16 is a flow chart showing an operation of a mobile communication start key mode.

FIG. 16 is a flow chart showing the operation of the mobile communication start key mode of step S27 in FIG. 14.

In step S49 of FIG. 16, the CPU 1-1 causes the buzzer 1-14 to generate the ACK tone. The CPU 1-1 then initializes the timer so as to measure the time at which the start key is depressed in step S50. While the start key is depressed, the CPU 1-1 performs the processes of step S51 and step S52.

In step S51, the CPU 1-1 discriminates whether the start key is continuously depressed, and in step S52, the CPU 1-1 discriminates whether the period measured by the timer is less than two seconds.

In a case where the time measured by the timer is two or more seconds, the CPU 1-1 causes the buzzer 1-14 to generate the ACK tone in step S53 and then clears the flag ECM-MODE in step S54. On the other hand, in a case where the start key is not depressed, the CPU 1-1 sets the flag ECM-MODE in step S58. Consequently, as in the mobile communication, the operator is able manually to select the communication mode (G3 or ECM).

In step S55, the CPU 1-1 sets the communication speed at the start time to be 4800 bps, and then, in step S56, the CPU 1-1 discriminates whether the mobile communication unit or the acoustic coupler is connected to the NCU 1-9.

In a case where the mobile communication unit is connected to the NCU 1-9, the CPU 1-1 sets the level for transmission to be −30 dBm. On the other hand, in a case where the acoustic coupler is connected to the NCU 1-9, the CPU 1-1 sets a level for transmission to be −10 dBm in step S57, and then returns to step S28 of FIG. 14.

As described above, the facsimile apparatus sets an appropriate communication mode in accordance with the type of communication line connected to the NCU 1-9 and the time of depression of the start key by an operator.

Figure 17:
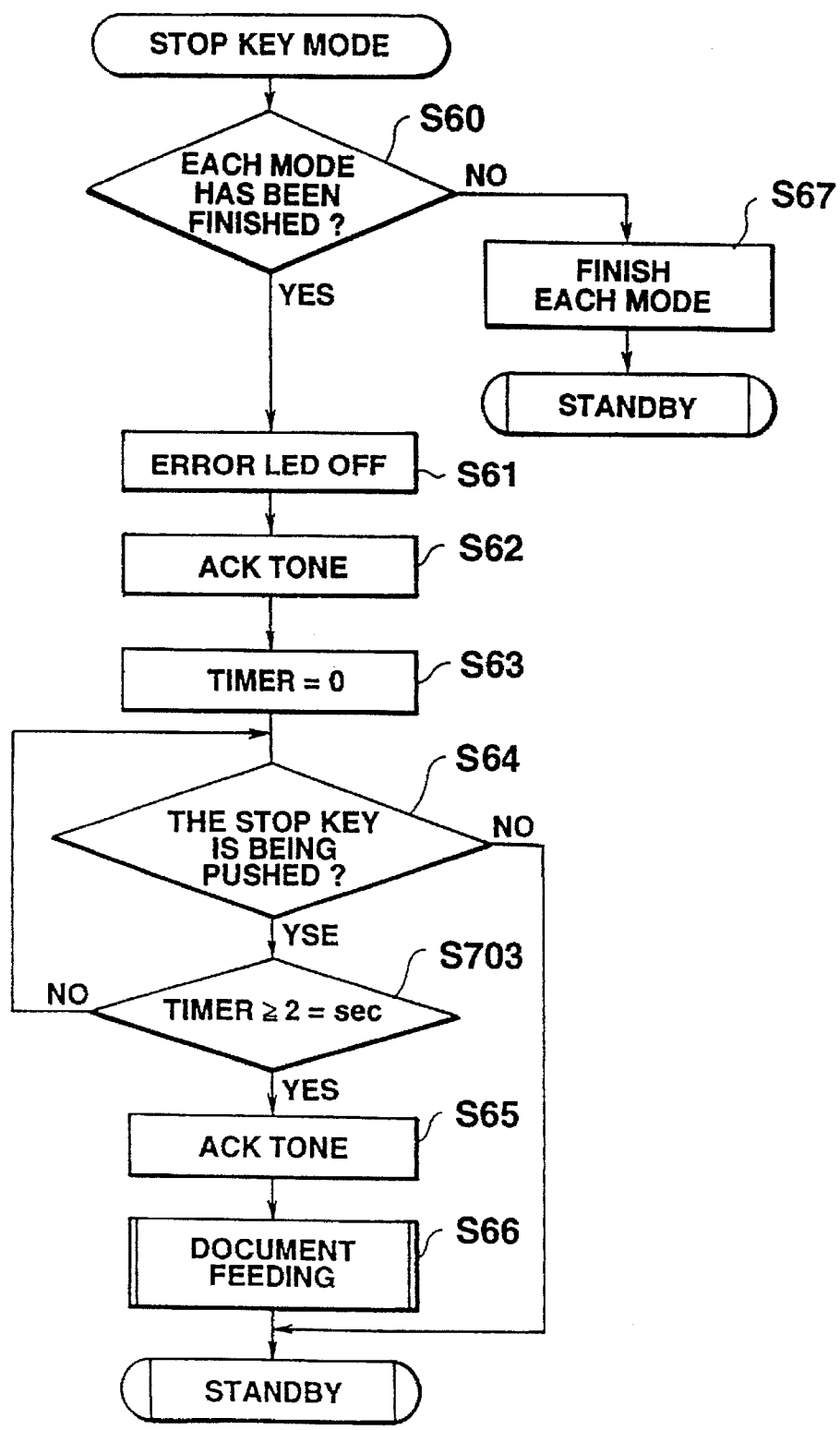
FIG. 17 is a flow chart showing an operation of a stop key mode.

FIG. 17 is a flow chart showing the operation of the stop key mode of step S23 (FIG. 12).

In step S60 of FIG. 17, the CPU 1-1 discriminates whether any local operation (i.e. copy operation) or any facsimile operation (i.e. facsimile transmission) is being performed. If an operation is being performed, the CPU 1-1 stops the operation in step S67, and then returns to the standby condition (step S5 of FIG. 11). On the other hand, if an operation is not being performed, the CPU 1-1 turns off the error LED of the operation unit 1-4 is step S61, causes the buzzer 1-14 to generate the ACK tone in step S62, and initializes a timer to measure the time of depression of the stop key in step S63. Then, while the stop key is depressed, the CPU 1-1 repeatedly performs step S64 and step S703. In step S64, the CPU 1-1 discriminates whether the stop key has continuously remained depressed. In step S703, the CPU 1-1 discriminates whether the timer has counted less than two seconds. If so, the CPU 1-1 shifts from step S64 to the standby condition. On the other hand, when the timer has measured two seconds or more, the CPU 1-1 shifts from step S703 to step S65, causes the buzzer 1-14 to generate the ACK tone in step S65, performs the feeding operation of an original document in step S66, and then returns to the standby condition.

Figure 18:
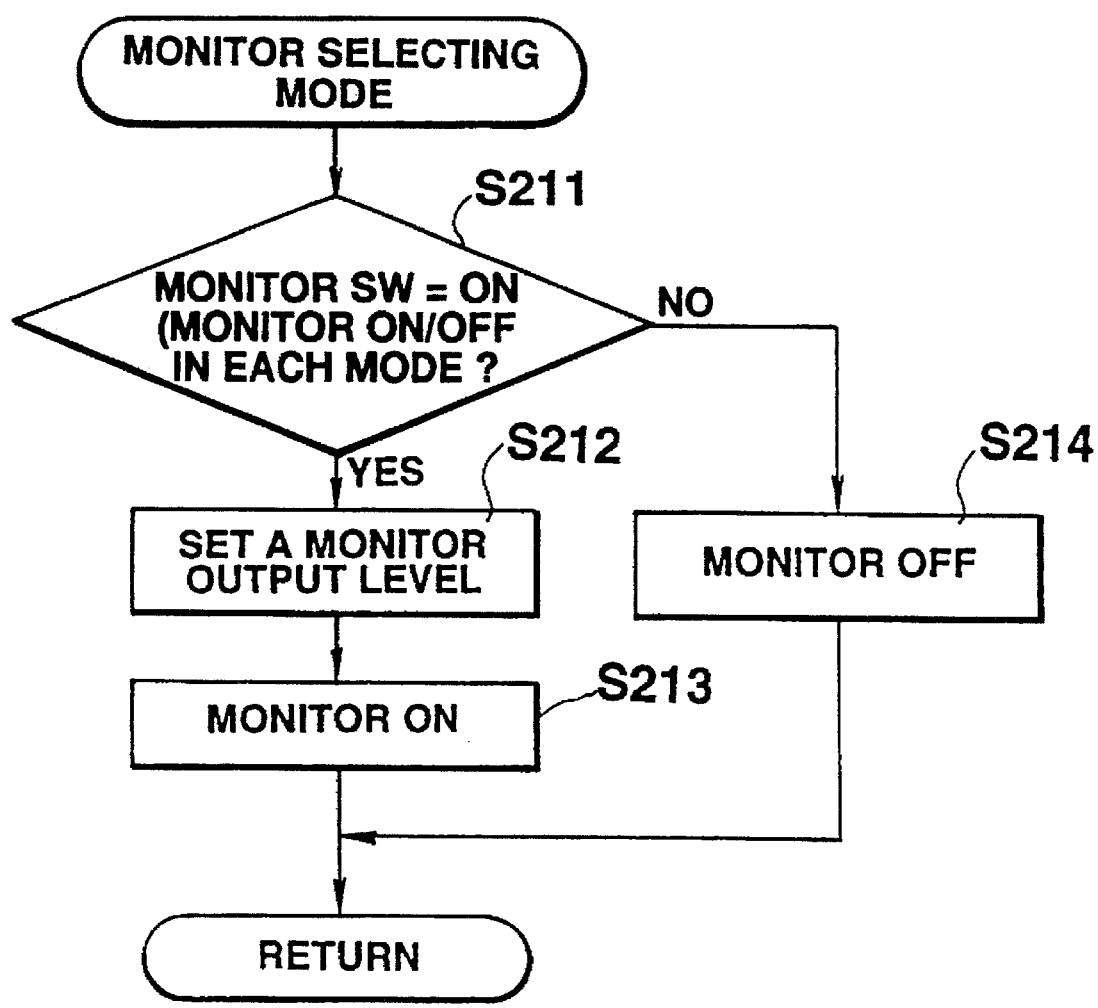
FIG. 18 is a flow chart showing an operation of a monitor selecting mode.
Figure 25:
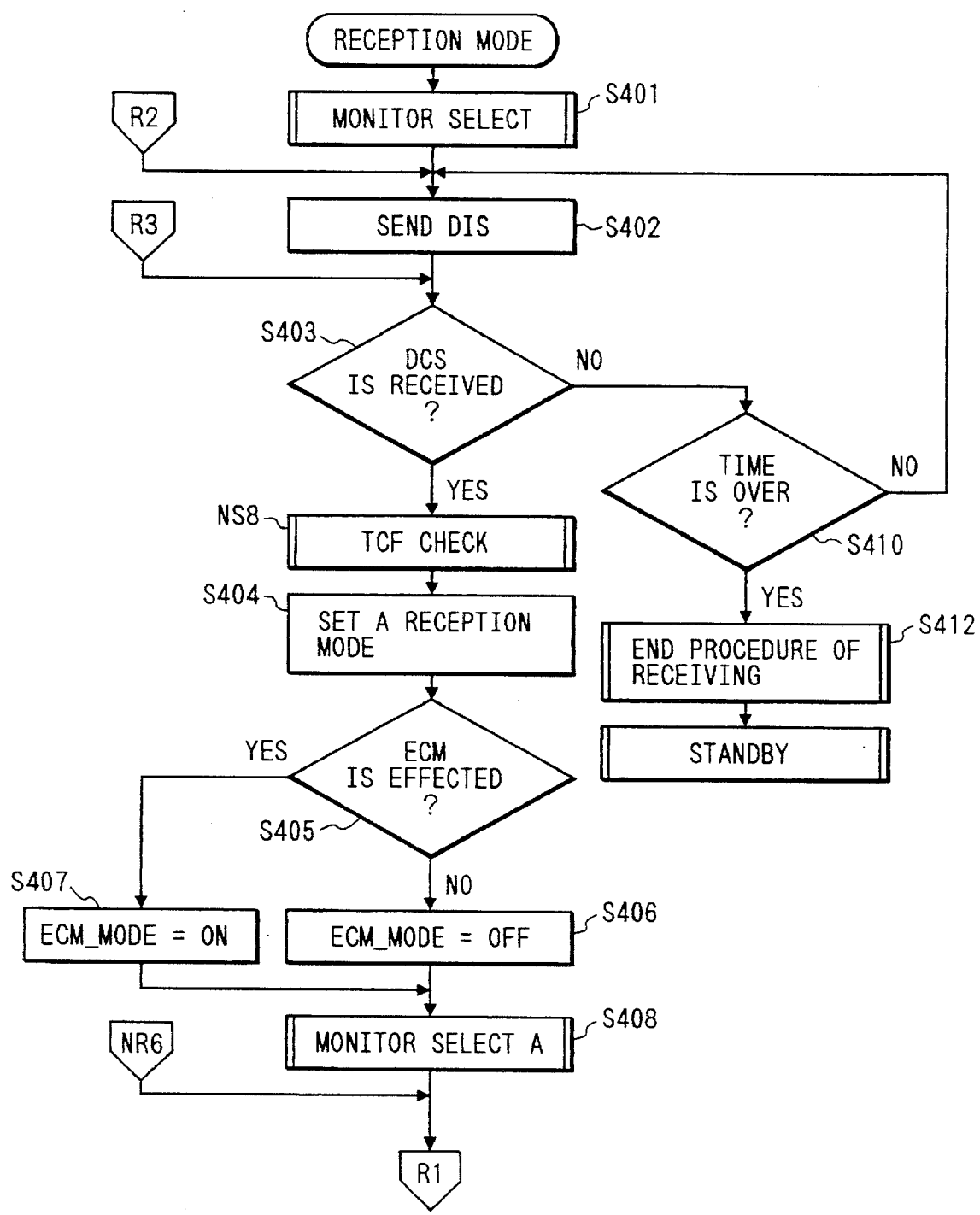
FIG. 25 through FIG. 27, FIG. 29, FIG. 30 and FIG. 43 together form a flow chart showing an operation of a receiving mode.
Figure 34:
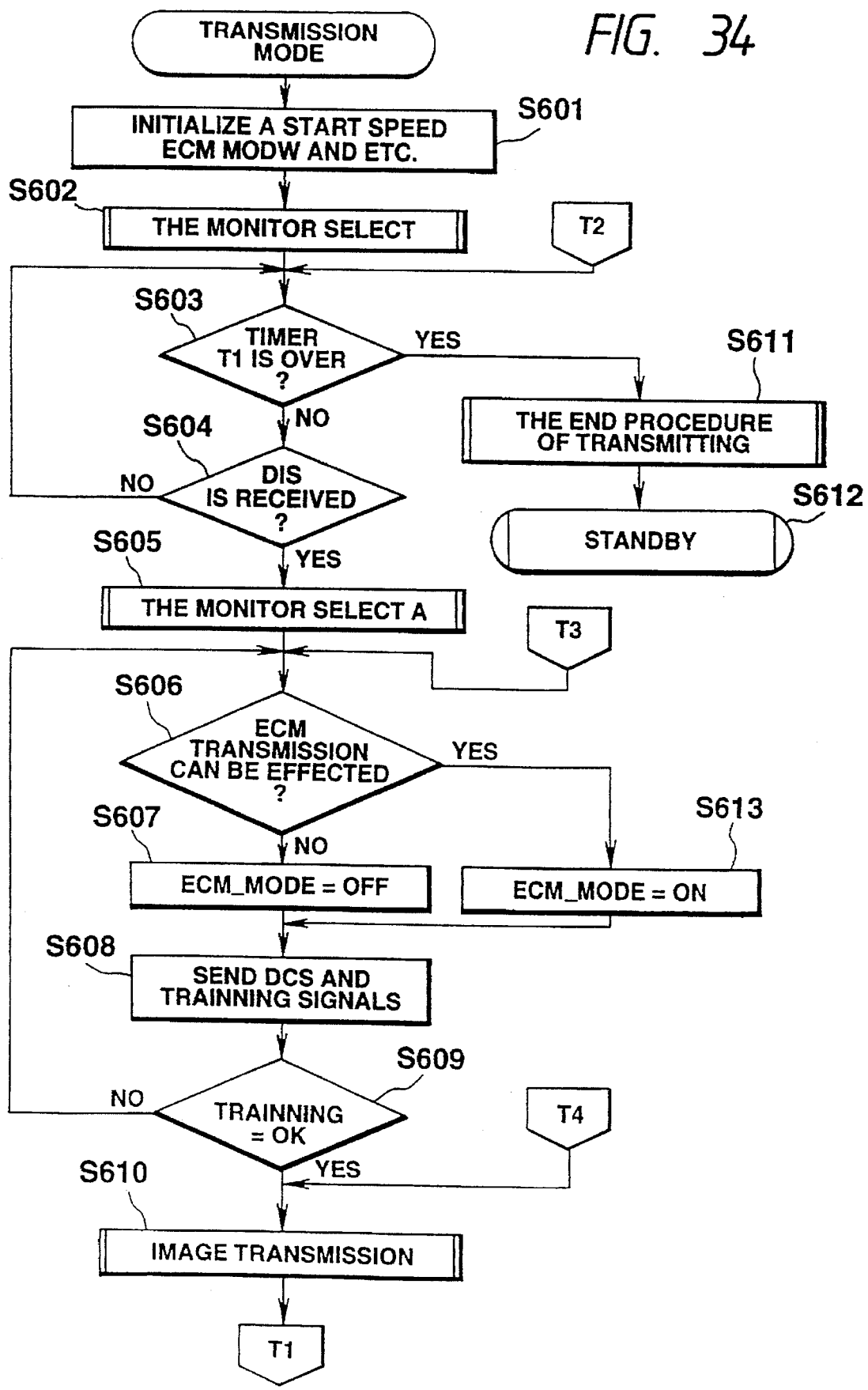
FIG. 34 through FIG. 36 together form a flow chart showing an operation of a transmission mode.

FIG. 18 is a flow chart showing the operation of the monitor select mode (step S11 of FIG. 11, step S28 of FIG. 14, step S401 of FIG. 25, or step S602 of FIG. 34).

In step S211 of FIG. 18, the CPU 1-1 discriminates whether the monitor SW (switch) is turned on. If the monitor SW is not turned on, the CPU 1-1 sets the monitor to off in step S214. On the other hand, if the monitor SW is turned on, the CPU 1-1 sets an output level for the monitor in step S212, and turns the monitor on in step S213.

Figure 19:
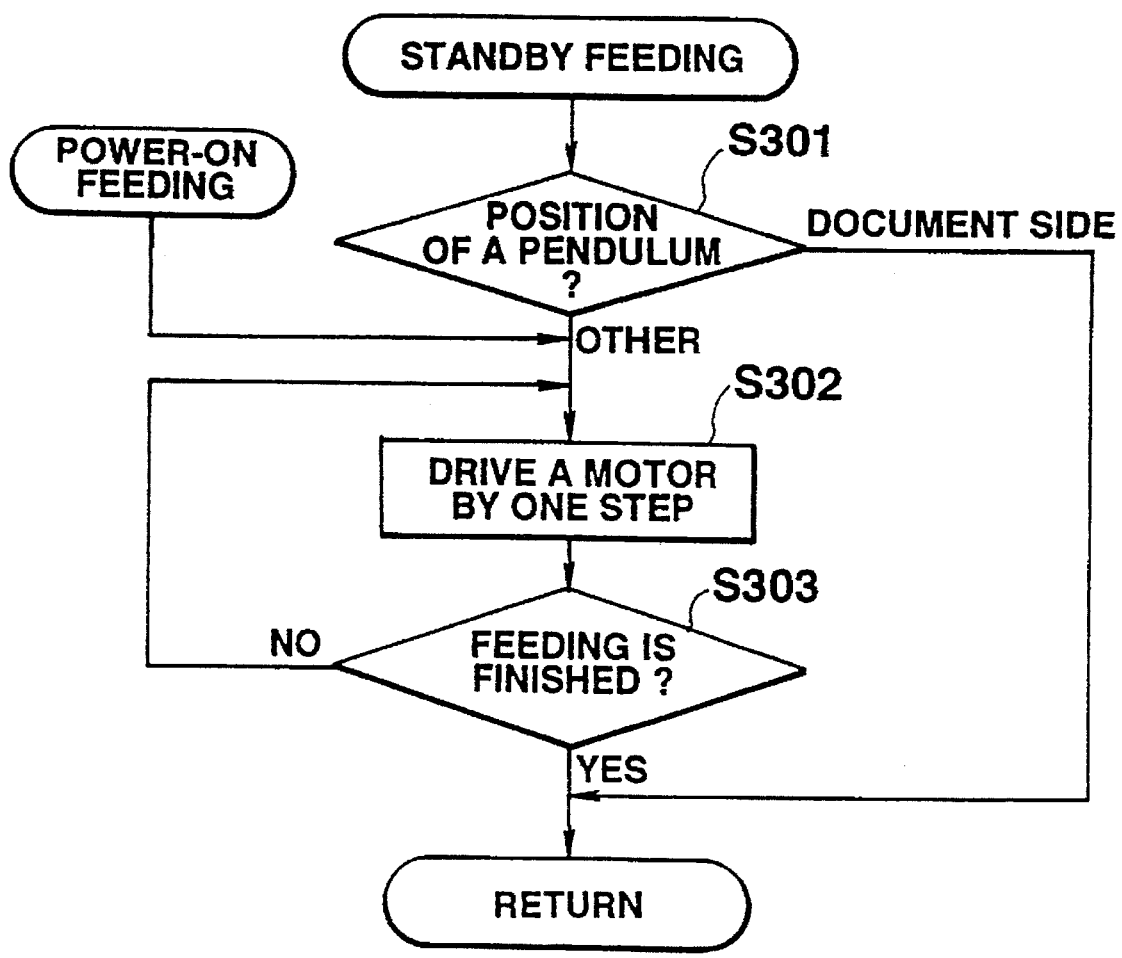
FIG. 19 is a flow chart showing an operation of a standby feeding mode and a power-on feeding mode.
Figure 20:
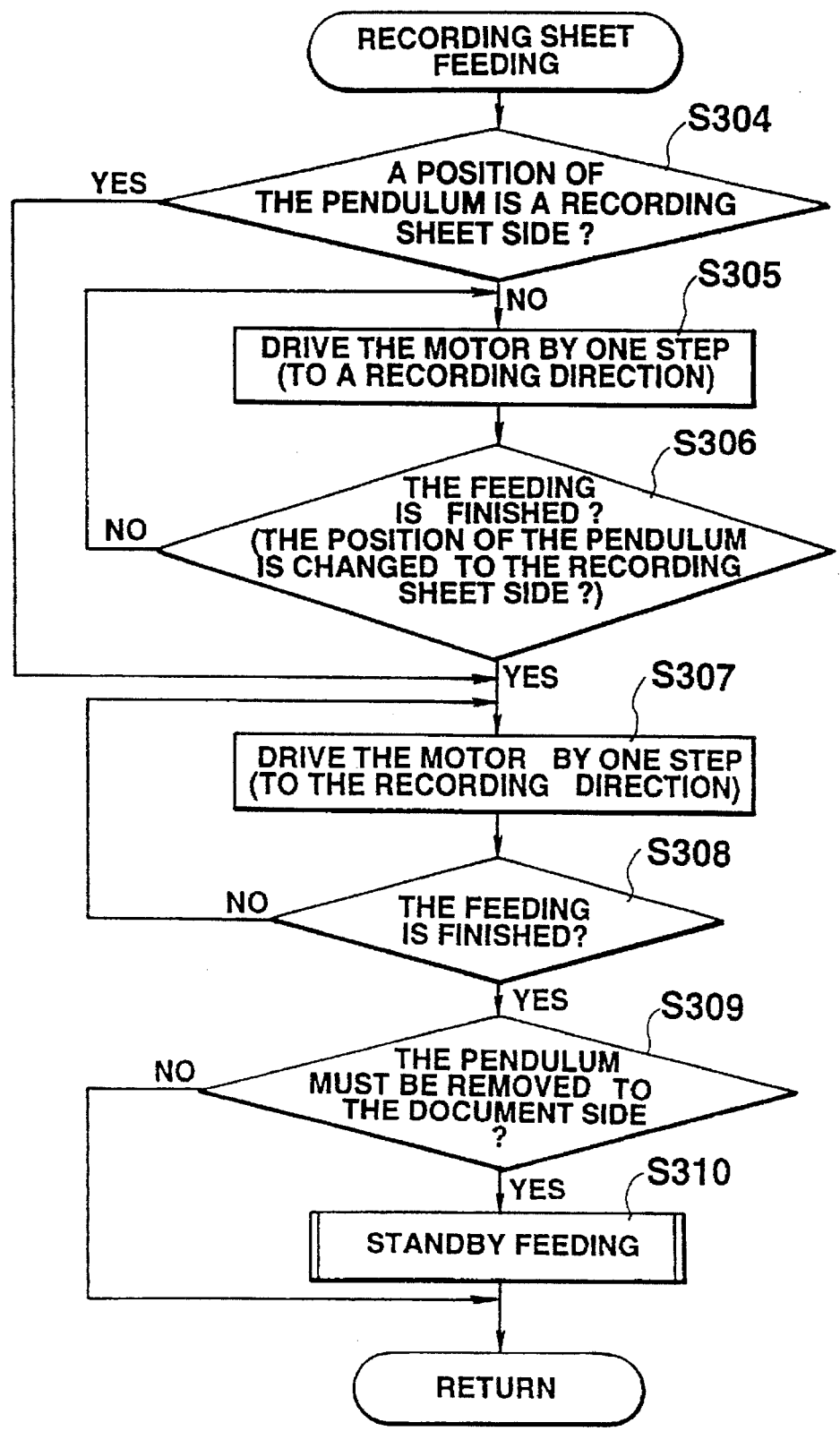
FIG. 20 is a flow chart showing a recording sheet feeding operation.
Figure 21:
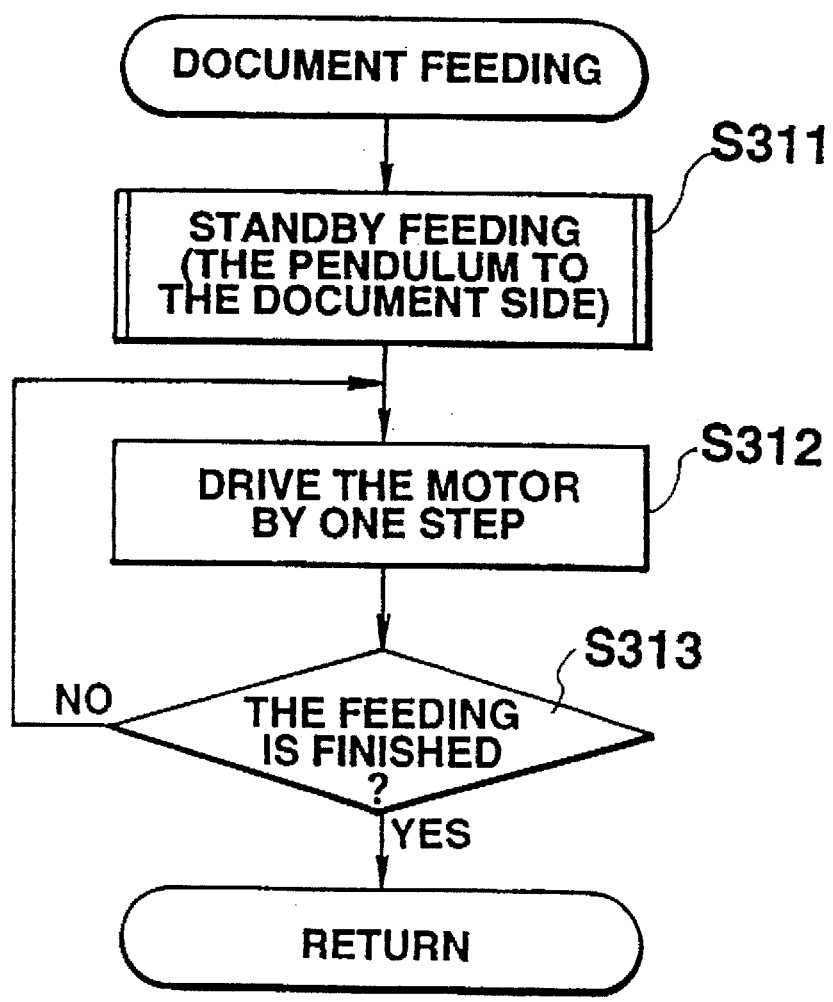
FIG. 21 is a flow chart showing a document feeding operation.

FIG. 19 is a flow chart showing the operation of the power-on feeding (step S2 of FIG. 10) and the standby feeding (step S310 of FIG. 20, step S311 of FIG. 21, etc.)

This facsimile apparatus has a structure in which one motor drives a roller for printing and a roller for reading by means of switching the power of the motor using a pendulum. In this facsimile apparatus, the feeding of an original document is operated on the basis of a positive rotation of the motor, while the feeding of a recording sheet is operated on the basis of negative rotation of the motor. The facsimile apparatus has a pendulum (a gear wheel) which switches a route of transfer of the driving power as between positive rotation and negative rotation. For positive rotation, the pendulum is located on a document side, to drive the roller for reading, while for negative rotation, the pendulum is located on a recording sheet side, to drive the roller for printing. The initial position of the pendulum is the document side, and for negative rotation, the pendulum is shifted to the recording sheet side by a rotation of the motor (a feeding operation). Switching from the recording sheet side to the document side also is performed by the rotation of the motor. In addition, when a document or a recording sheet which has been inserted into the facsimile apparatus is removed by an operator, the pendulum is moved to an intermediate position between the document side and the recording sheet side. The structure of the pendulum prevents feeding of the recording sheet during image transmission.

In step S301 of FIG. 19, the CPU 1-1 discriminates whether the pendulum is positioned at the document side. If the pendulum is at the document side, the CPU 1-1 returns to the previous flow. On the other hand, if the pendulum is not at the document side, the CPU 1-1 operates the motor (e.g. a positive rotation) so as to move the pendulum to the document side in step S302. In step S303, the CPU 1-1 detects the position of the pendulum. The CPU 1-1 then repeatedly performs steps S302 and S303 until the CPU 1-1 detects that the position of the pendulum is at the document side.

In the standby mode, the CPU 1-1 starts from step S301. On the other hand, in the power-on mode, the CPU 1-1 starts from step S302 because the position of the pendulum is uncertain when the power is turned on. Therefore, the CPU 1-1 drives the motor (step motor) by fixed steps so as to fix the position of the pendulum.

FIG. 20 is a flow chart showing the process of feeding of the recording sheet (e.g. step S71 of FIG. 13).

In step S304, the CPU 1-1 checks the position of the pendulum. In a case where the pendulum is not at the recording sheet side, the CPU 1-1 drives the motor by one step in step S305, and again checks the pendulum position in step S306. The CPU 1-1 then repeatedly performs steps S305 and S306 until the CPU 1-1 detects that the pendulum is at the recording sheet side.

In a case where the position of the pendulum is at the recording sheet side, the CPU 1-1 drives the motor by one step in step S307, and checks if a fixed feeding operation is finished in accordance with the detection of a sensor in step S308. The CPU 1-1 then repeatedly performs steps S307 and S308 until the CPU 1-1 detects that the fixed feeding operation is finished. Then in step S307, the CPU 1-1 checks whether the pendulum should be on the document side or the recording sheet side after the feeding operation. In an initial feeding operation of a copy operation or a facsimile reception, the pendulum must be on the recording sheet side because the printing operation is performed after the feeding operation. In the feeding of the recording sheet with the copy key in the standby condition, the pendulum must be returned to the document side. In a case where the pendulum must be returned to the document side, the CPU 1-1 performs the operation of the standby feeding mode (FIG. 19) in step S310, and then returns to the previous flow.

FIG. 21 is a flow chart showing the document feeding operation (e.g. step S66 of FIG. 17).

In step S311 of FIG. 21, the CPU 1-1 performs the standby feeding operation, and thereby switches the pendulum to the document side. In step S312, the CPU 1-1 drives the motor for feeding by one step, thereby feeding the document. In step S313, the CPU 1-1 checks whether the document feeding operation is finished. In a case where the CPU 1-1 detects that the feeding operation is finished, the CPU 1-1 returns from step S313 to the previous flow.

Figure 22:
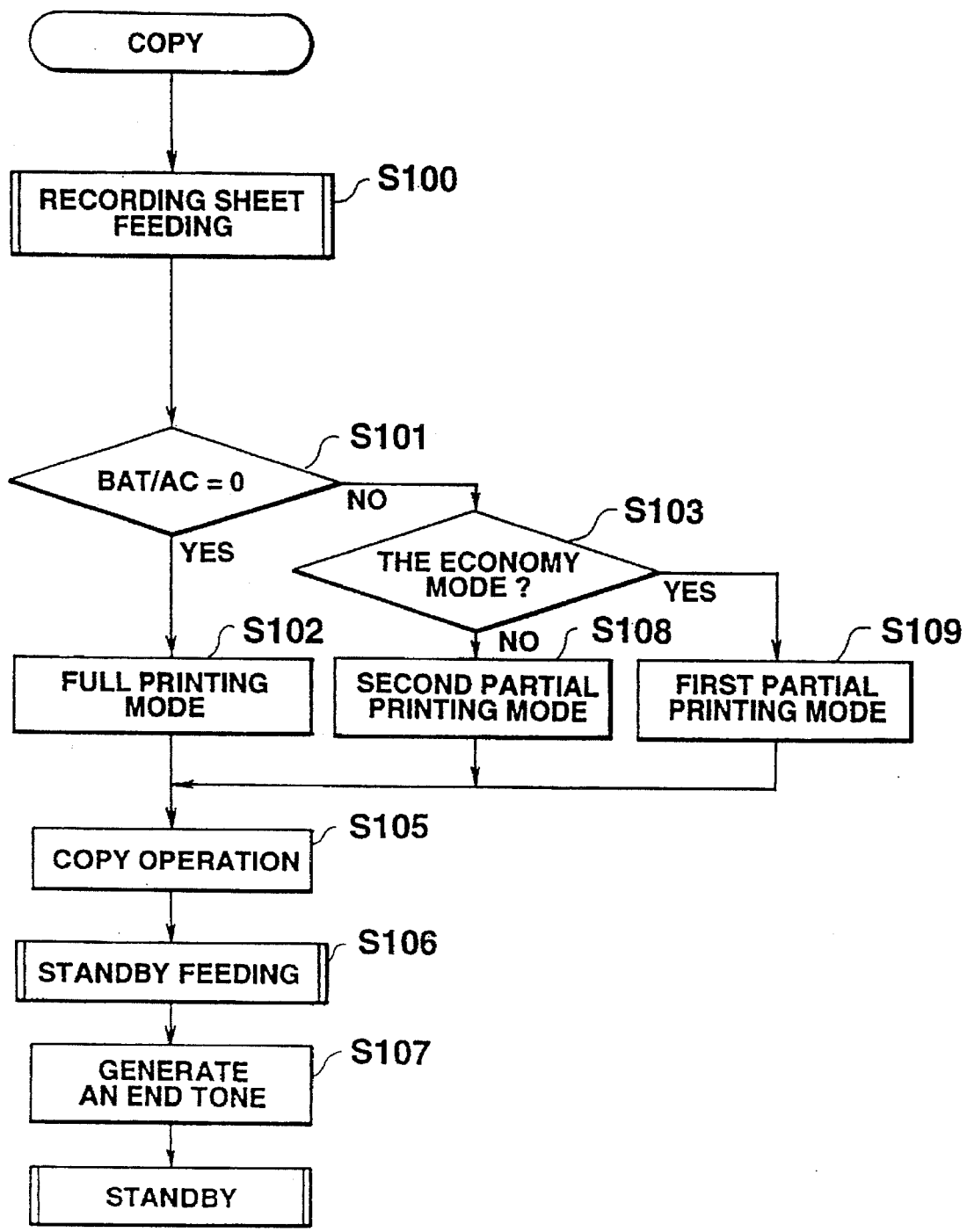
FIG. 22 is a flow chart showing a copy operation.

FIG. 22 is a flow chart showing the copy operation (step S701 of FIG. 13).

In step S100 of FIG. 22, the CPU 1-1 performs the recording sheet feeding operation (FIG. 20), thereby feeding the recording sheet to a predetermined position of the recorder 1-6. In step S101, the CPU 1-1 checks the value of a signal BAT/AC which indicates an AC power or the battery power. When AC power is used, the signal BAT/AC becomes "0" because the signal BAT/AC which is pulled up +5 V is connected to a ground line by the connecting terminal of the AC power unit. On the other hand, in a case where the battery power is used, the signal BAT/AC becomes "1". In a case where a car battery is used, the signal BAT/AC depends on a switch of the car battery power unit. When the capacity of the car battery is large, the switch is turned on so that the signal BAT/AC becomes "0". On the other hand, when the capacity of the car battery is small, the switch is turned off so that the signal BAT/AC becomes "1".

If the value of the signal BAT/AC is "0" in step S101, the CPU 1-1 sets the full printing mode in step S102. If the value of the signal BAT/AC is "1", the CPU 1-1 discriminates whether the economy mode is selected in step S103. When the economy mode is selected, the CPU 1-1 sets a partial printing mode (first partial printing mode) which is to print data partially in step S109. When the economy mode is not selected, the CPU 1-1 sets a different partial printing mode (second partial printing mode) which prints data partially when black ratio data to be printed is over fifty percent in step S108. The CPU 1-1 then performs the copying operation in step S105, performs the standby feeding operation in step S106, causes the buzzer 1-14 to generate an end tone which indicates that the copy operation is terminated in step S107, and then returns to the standby condition. The first partial printing mode and the second partial printing mode save energy when battery or a car battery is used. These two modes are also used when printing received image data.

Figure 23:
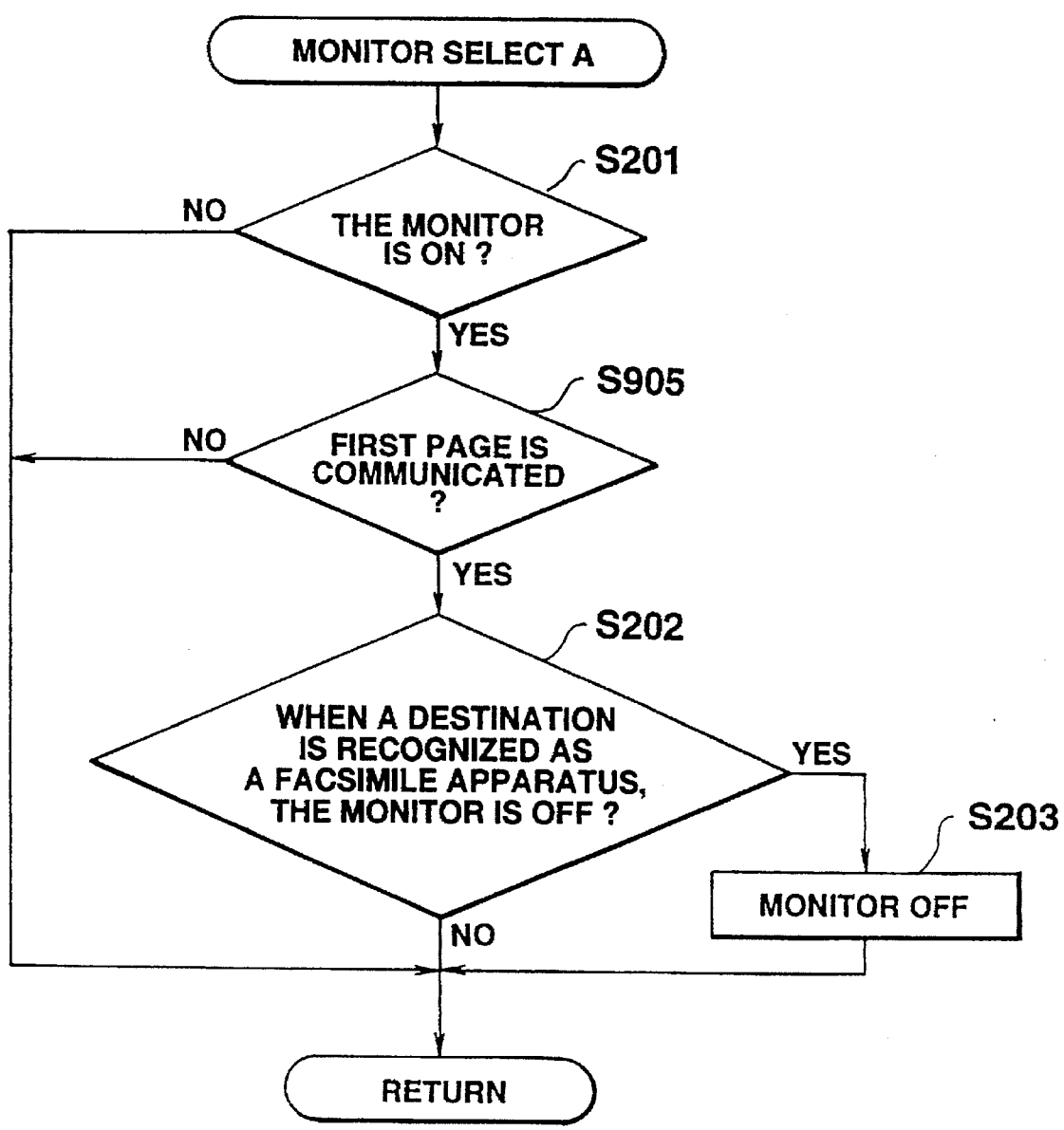
FIG. 23 is a flow chart showing an operation of a monitor selection A.

FIG. 23 is a flow chart showing an operation of a monitor selecting mode A (step S408 of FIG. 25, step S605 of FIG. 34).

In step S201 of FIG. 23, the CPU 1-1 discriminates whether the monitor has been turned on.

In a case where the monitor has been turned on, the CPU 1-1 checks whether a first page is being received in step S905. If the first page is being received, the CPU 1-1 discriminates whether the destination is a facsimile machine in step S202. If the destination is a facsimile machine, the CPU 1-1 turns the monitor off in step S203.

Figure 24:
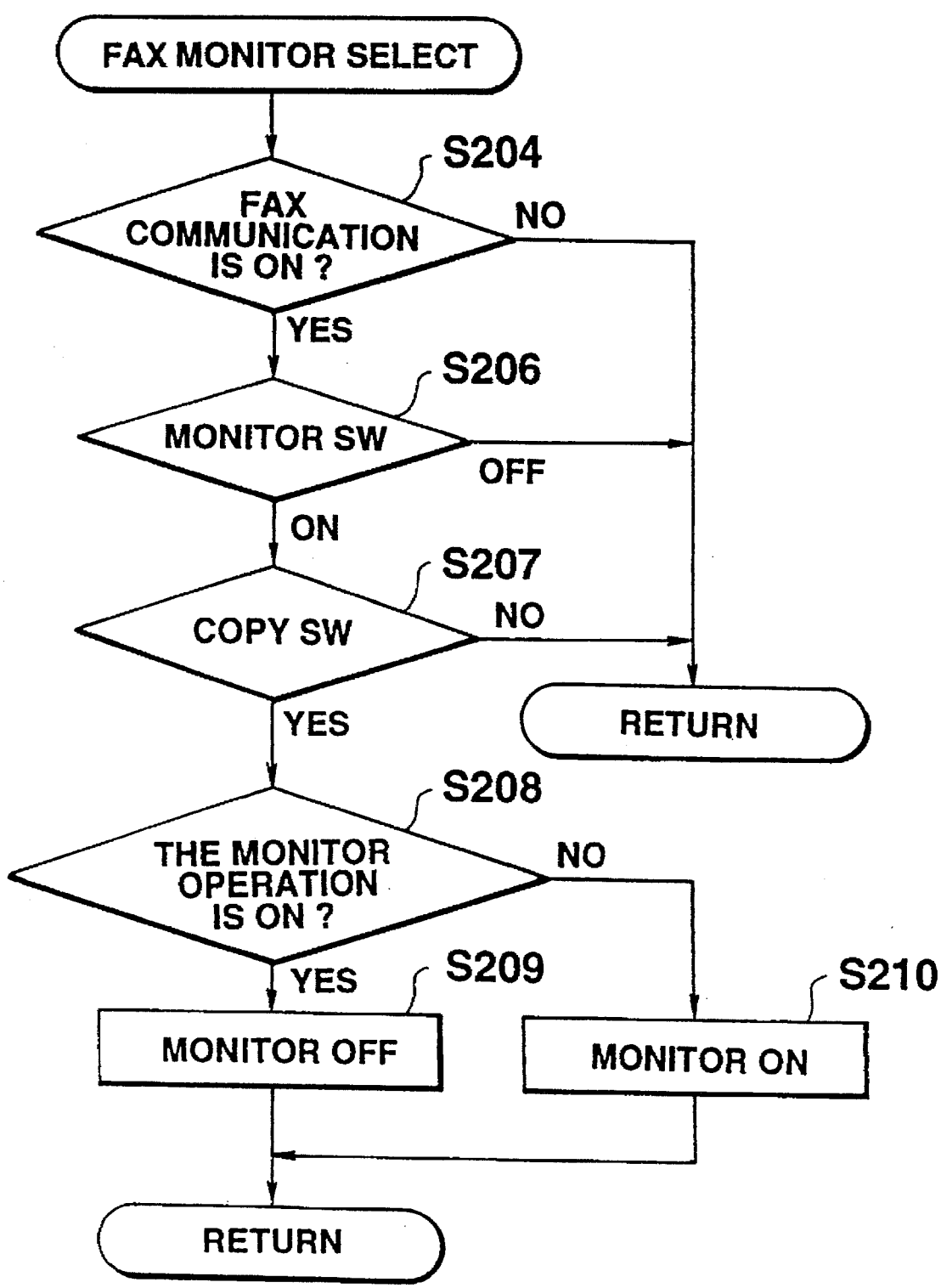
FIG. 24 is a flow chart showing an operation of a FAX monitor selection.

FIG. 24 is a flow chart showing the operation of a FAX monitor selecting mode which turns the monitor on and off by the copy key during facsimile communication.

In step S204 of FIG. 24, the CPU 1-1 checks whether facsimile communication is being performed. In a case where facsimile communication is being performed, the CPU 1-1 checks whether the copy key is being pushed in step S207. If the copy key is depressed, the CPU 1-1 checks whether a monitor operation is being performed in step S208. If so, the CPU 1-1 stops the monitor operation in step S209. On the other hand, in a case where the monitor operation is not being performed, the CPU 1-1 starts monitor operation in step S210.

FIGS. 25 through 33 together form a flow chart showing the operation of the reception mode (step S31 of FIG. 14).

In step S401 of FIG. 25, the CPU 1-1 performs the monitor selecting mode (FIG. 18), sends to the destination a DIS which includes information on the communication speed and the ECM set in the start key mode in step S402, and checks whether a DCS has been received from the destination in step S403. If a DCS has not been received, the CPU 1-1 checks whether an initial identification time-out (e.g. 35 seconds) has occurred in step S410. If so, the CPU 1-1 performs an end procedure of the image reception in step S412, and then returns to the standby condition.

In a case where a DCS has been received from the destination before the initial identification timer has expired, in step NS8 the CPU 1-1 checks whether a TCF has been received, and in step S404 the CPU 1-1 sets an image reception mode in accordance with information included in the received DCS. In step S405, the CPU 1-1 discriminates whether ECM communication is being performed. If so, the CPU 1-1 sets the flag ECM-MODE in step S407. On the other hand, in a case where ECM communication is not being performed, the CPU 1-1 clears the flag ECM-MODE in step S406. In step S408, the CPU 1-1 performs the operation of the monitor selecting mode A, and thereby decides if the monitor is operated. Then, in step S413 of FIG. 26, the CPU 1-1 discriminates whether ECM communication is being performed, in accordance with the flag ECM-MODE. If the flag ECM-MODE is on, the CPU 1-1 shifts from step S413 to step S433 of FIG. 29, and performs ECM reception. On the other hand, if the flag ECM-MODE is not on, the CPU 1-1 performs normal facsimile reception in step S414, and checks whether a recording sheet is in the recorder 1-6 in step S415. If a recording sheet is in the recorder 1-6, the CPU 1-1 causes the recorder 1-6 to print one line of received image data in step S418 and checks whether the line of received image data has been printed in step S419. If the line of received image data has not yet been printed, the CPU 1-1 returns to step S414 so as to continue to receive and print image data. On the other hand, if the line has been printed, the CPU 1-1 checks whether an RTC is detected or not in received data in step S420. If no RTC is detected, the CPU 1-1 returns to step S414 so as to continue to monitor signals. In a case where the RTC is detected in step S420, the CPU 1-1 shifts from steps S420 to step S421 of FIG. 27 and then performs the next procedure.

Figure 27:
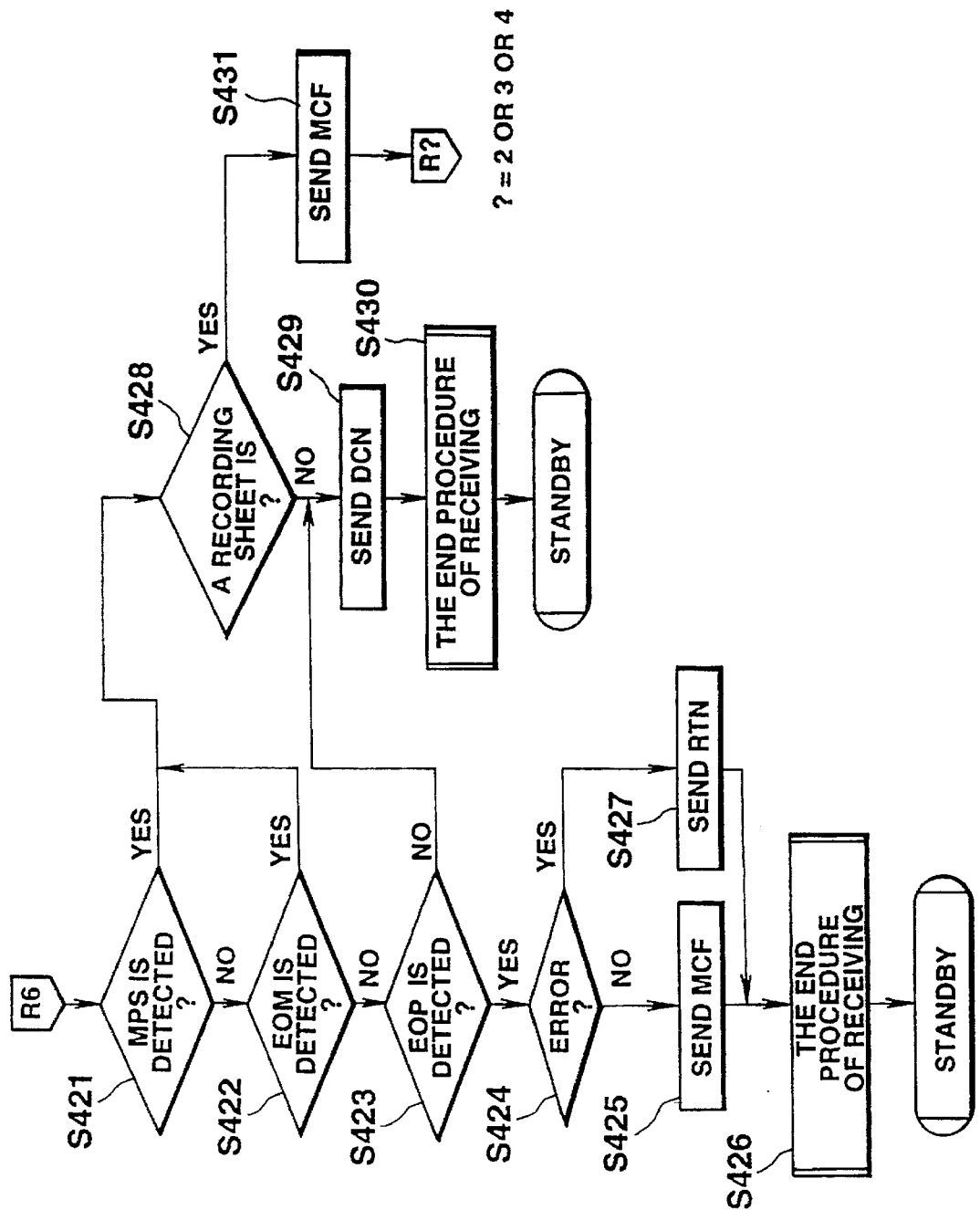

On the other hand, in a case where the recording sheet is not in the recorder 1-6 in step S415, the CPU 1-1 performs an operation of an operator call A (FIG. 28) so as to require an operator to set a recording sheet in step S416. In the operator call A operation, the CPU 1-1 stores received image data in an image memory (RAM 1-3) until a recording sheet is set by the operator. Then, in step S417, the CPU 1-1 checks whether the recording sheet is in the recorder 1-6, and if so, the CPU 1-1 shifts to step S418 so as to continue to print the received image data. If no recording sheet is in the recorder 1-6, the CPU 1-1 shifts from step S417 to step S421 (FIG. 27).

In steps S421, S422 and S423, the CPU 1-1 checks whether an MPS, an EOM or an EOP, respectively, is detected. When these signals are not detected, the CPU 1-1 sends a DCN to the line through the modem 1-8 and the NCU 1-9 in step S429, performs the end procedure of receiving (FIG. 33) in step S430, and then returns to the standby condition.

If the EOP is detected in step S423, the CPU 1-1 checks whether the quality of the received image data is satisfactory in step S424. When the quality of the received image data is adequate, the CPU 1-1 sends an MCF to the line through the modem 1-8 and the NCU 1-9 in step S425. When the quality of the received image is unsatisfactory (i.e. the received image data has more errors than permitted by a predetermined standard), the CPU 1-1 sends an RTN to the line in step S427. The CPU 1-1 then performs the end procedure of receiving in step S426, and returns to the standby condition.

In a case where the MPS or the EOM is detected in step S421 or step S422, the CPU 1-1 checks whether a recording sheet is in the recorder 1-6 in step S428. If so, the CPU 1-1 sends the MCF to the line in step S431, and then shifts to step S402, step S403 or step S413. When the EOM is detected in step S422, the CPU 1-1 shifts from step S431 to step S402 or step S403. When the MPS is detected in step S421, the CPU 1-1 shifts from step S431 to step S413.

On the other hand, in a case where no recording sheet is in the recorder 1-6 in step S428, the CPU 1-1 sends the DCN to the line in step S429, performs the end procedure of receiving in step S430, and then returns to the standby condition.

Figure 26:
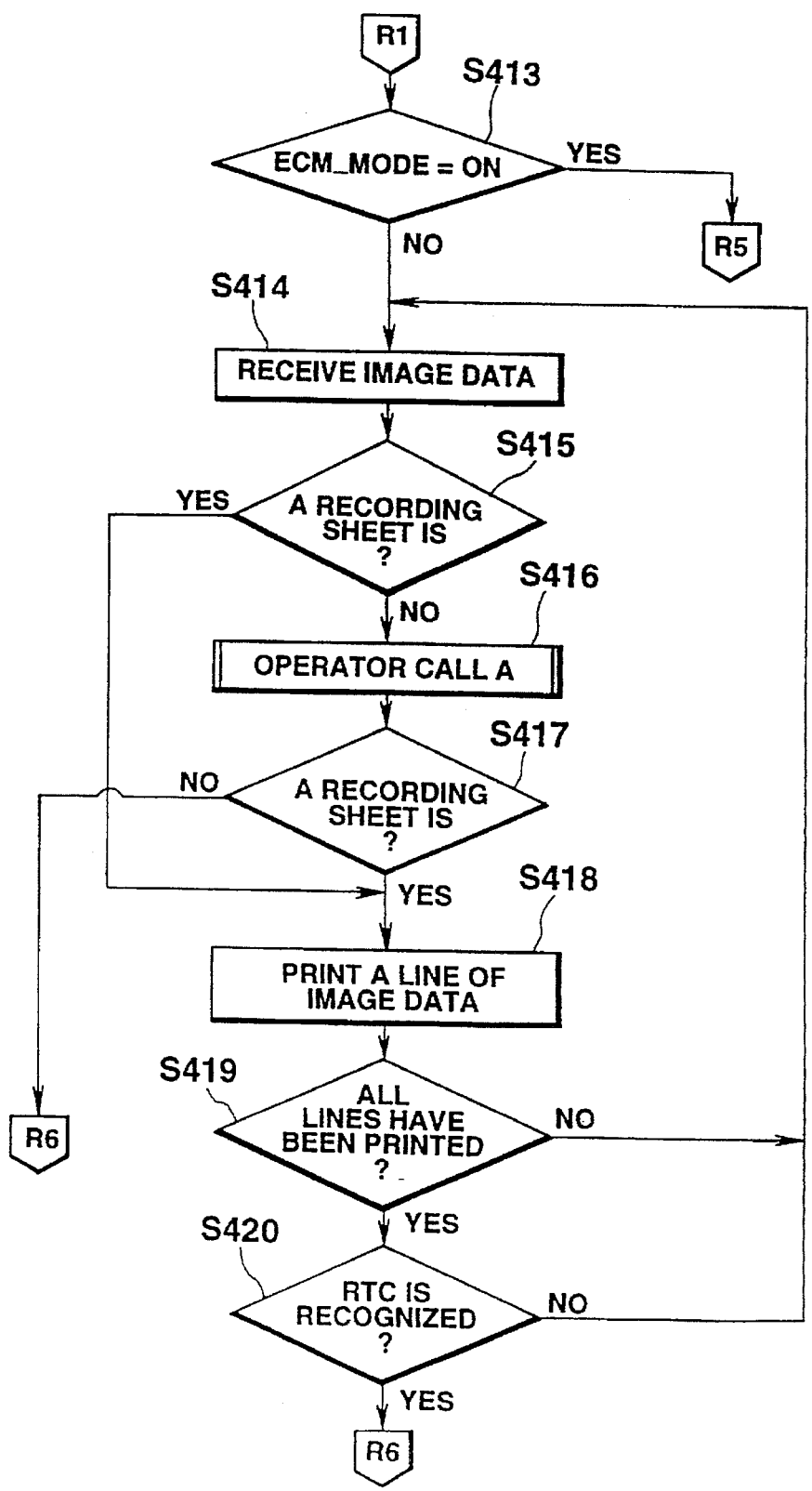
Figure 28:
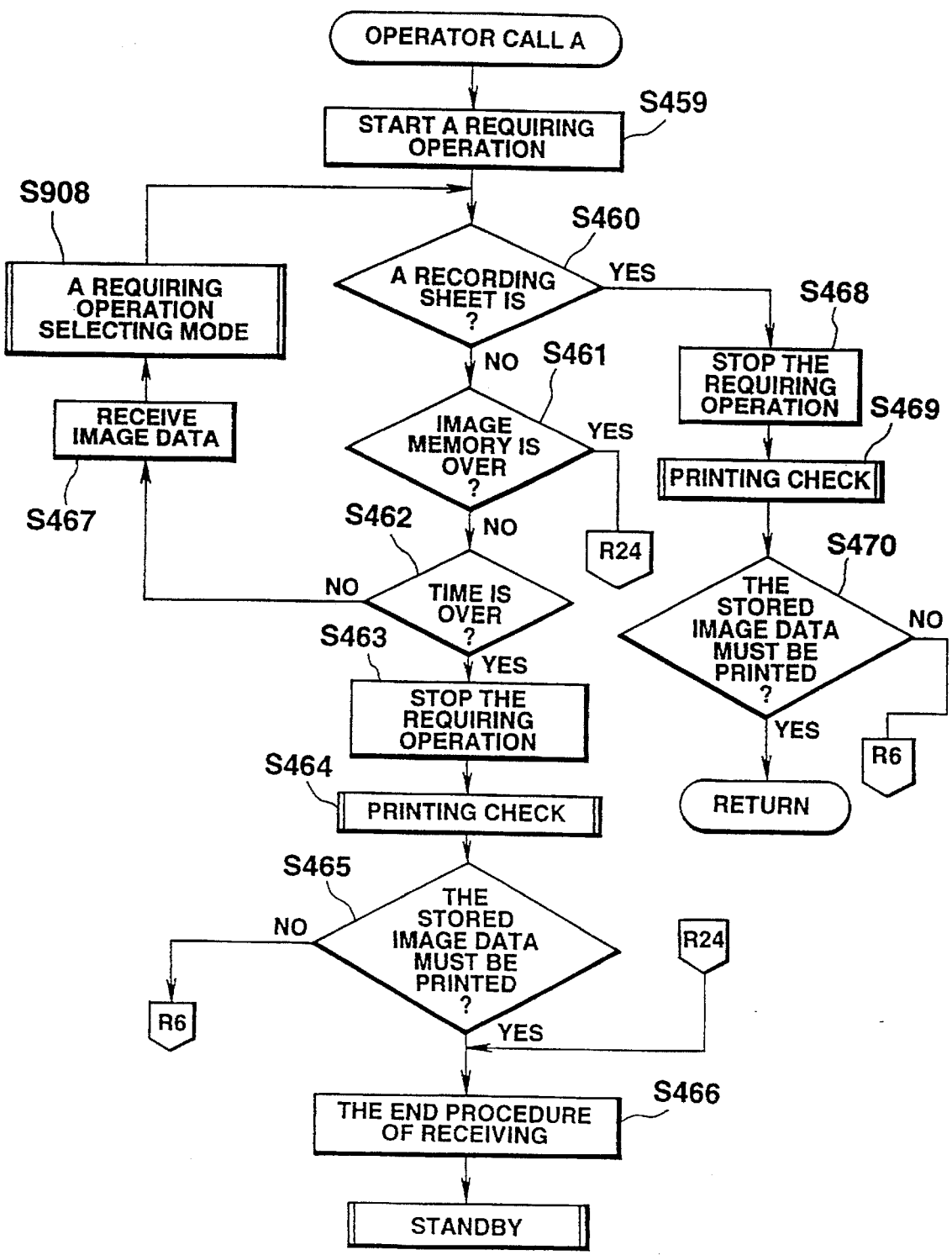
FIG. 28 is a flow chart showing an operation of an operator call A.

FIG. 28 is a flow chart showing the operation of the operator call A (step S418 of FIG. 26).

In step S459 of FIG. 28, the CPU 1-1 starts a requiring operation which requires an operator to set a recording sheet in the recorder 1-6, and which generates an alarm tone and/or displays an alarm.

In step S460 the CPU 1-1 checks whether a recording sheet is set in the recorder 1-6. In a case where a recording sheet is not set, in step S461 the CPU 1-1 checks the capacity of the image memory which is available to store received image data. If the capacity of the image memory is above a predetermined quantity, the CPU 1-1 checks the time elapsed from the start of the requiring operation in step S462.

In a case where a recording sheet is not set in step S460, where there is image memory available in step S461, and where the time is not more than a predetermined time (e.g. 5 seconds) in step S462, the CPU 1-1 receives image signals and stores received image data in the image memory in step S467, performs a requiring operation switching mode (FIG. 42) in step S908, and then returns to step S460.

If a recording sheet is set in the recorder 1-6 in step S460, the CPU 1-1 stops the requiring operation in step S468, checks stored image data to be printed in step S469, and discriminates whether the stored image data must be printed in step S470. If the printing operation must be performed, the CPU 1-1 returns from step S470 to step S417 of FIG. 26. If printing does not need to be performed, the CPU 1-1 shifts from step S470 to step S421 of FIG. 27. For example, when one page of image data has been received (the RTC has been received), or when the quantity of the stored image data is less than a predetermined amount, the CPU 1-1 determines not to print the stored image data.

In a case where image memory is not available in step S461, the CPU 1-1 performs the end procedure of receiving in step S466, and then returns to the standby condition.

In a case where the time elapsed from the start of the requiring operation is more than the predetermined time in step S462, the CPU 1-1 stops the requiring operation in step S463, checks the stored image data to be printed in step S464, and discriminates whether the stored image data must be printed in step S465. If the stored data must be printed, the CPU 1-1 performs the end procedure of receiving in step S466, and then returns to the standby condition. On the other hand, if the stored image data need not be printed, the CPU 1-1 shifts from step S465 to step S421 of FIG. 27.

Figure 29:
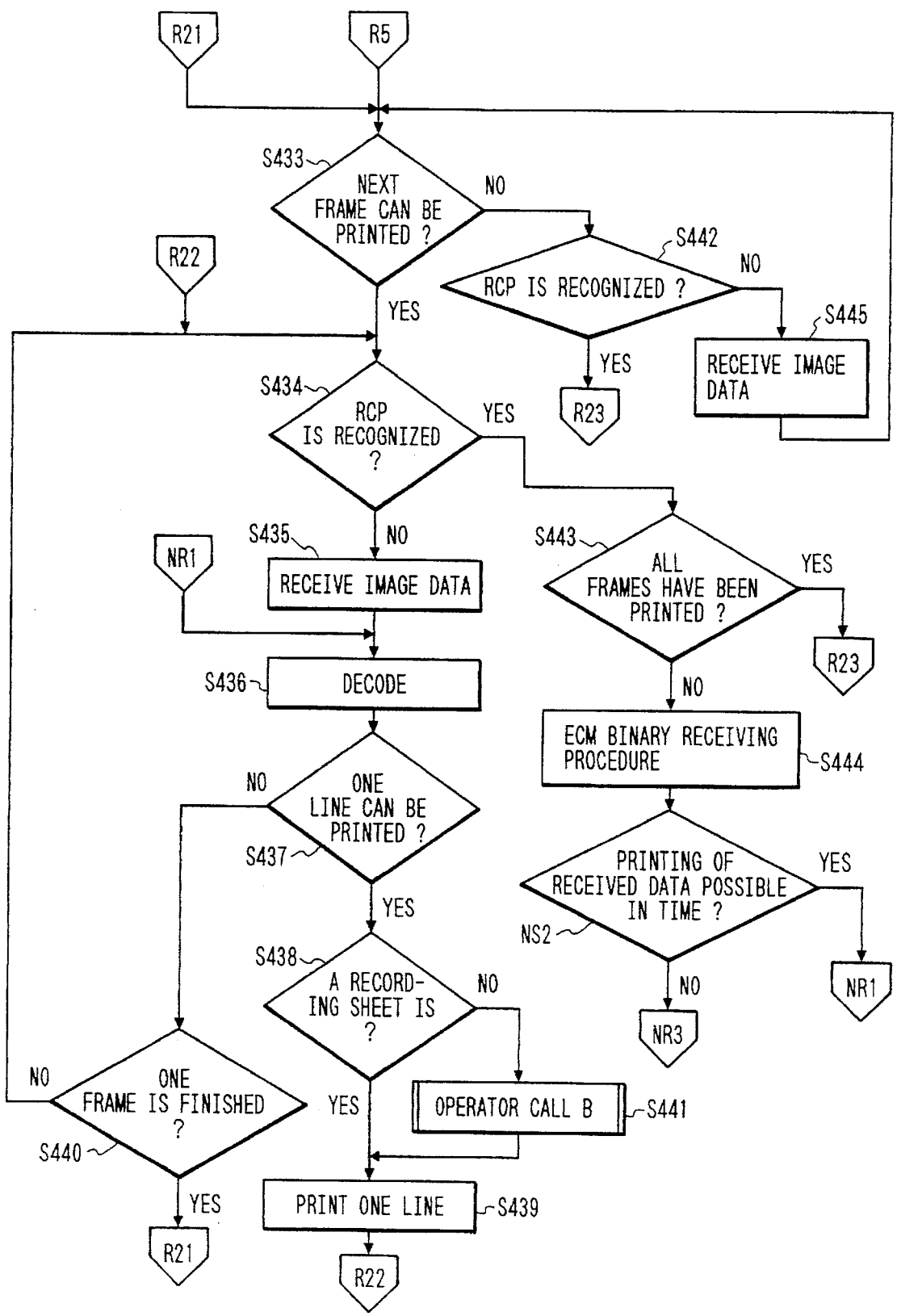

When the ECM reception is performed in step S413 of FIG. 26, the CPU 1-1 discriminates whether received frame data is capable of being printed in step S433 of FIG. 29. If the received frame data cannot be printed, the CPU 1-1 checks whether an RCP has been received in step S422. If no RCP is received, the CPU 1-1 receives image signals in step S445, and then returns to step S433. If the RCP is received in step S442, the CPU 1-1 shifts to step S446 of FIG. 30, and then performs a procedure of phase D.

On the other hand, if the received frame data can be printed in step S433, the CPU 1-1 checks whether the RCP has been received in step S434. If no RCP is received, the CPU 1-1 receives image signals in step S435. If an RCP is received, the CPU 1-1 checks whether all frame data has been printed in step S443. If less than all frame data has been printed, the CPU 1-1 shifts from step S443 to step S446 of FIG. 30. If all frame data has been printed, in step S444 the CPU 1-1 performs an ECM binary receiving procedure (FIG. 31) which is to perform flow control.

In a case where no binary signal is received in step S444, since the CPU 1-1 cannot calculate a time required to print the remaining frame data, the CPU 1-1 shifts to step S436.

In step NS2, the CPU 1-1 calculates the number of frames to be printed in accordance with the received and confirmed binary signal in step S444. If the number of frames to be printed is 128 or more and the frame size is 256 bytes, the CPU 1-1 discriminates that the remaining printing and unit control cannot be completed within the flow control time (about 60±5 sec).

In step NS2, a time and the number of steps required for printing from a time when the binary signal is received and confirmed may be assumed and calculated in accordance with the number of frames to be printed, the number of lines to be printed, the printing time per line, the frame size, and the like so as to discriminate whether the remaining printing and unit control are completed within the flow control time.

If the remaining printing and unit control are discriminated to be completed within the flow control time, the CPU 1-1 shifts to decoding operation in step S436.

Figure 43:
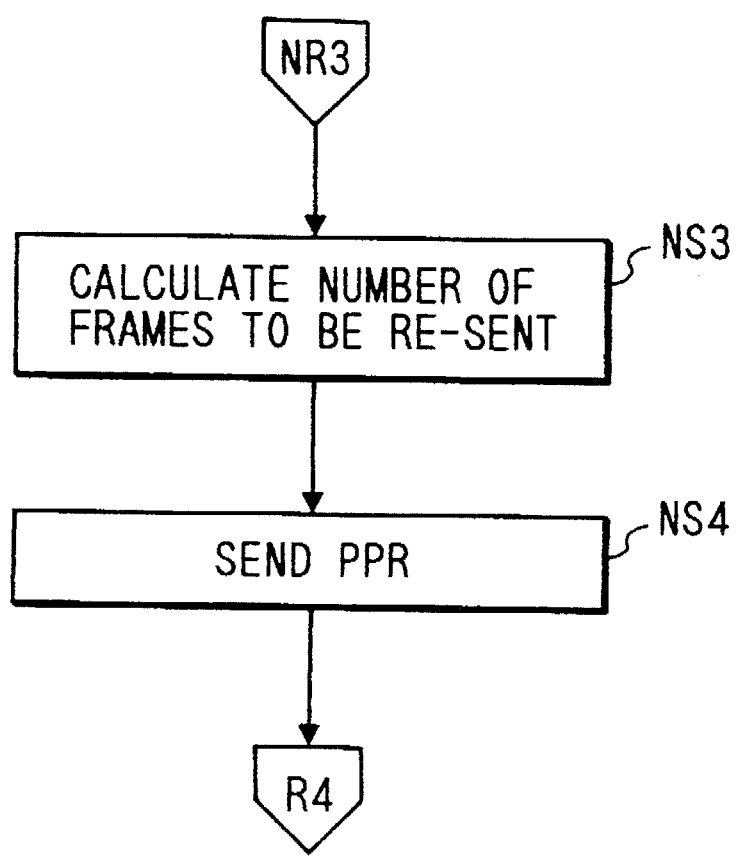

If the remaining printing and unit control are discriminated not to be completed within the flow control time, the CPU 1-1 shifts to the connector NR3 of FIG. 43.

When the CPU 1-1 discriminates that the remaining printing and unit control cannot be completed within the flow control time, a time required for printing and unit control is set to about 30 sec, and the number of frames is calculated in accordance with an image signal rate in step NS3.

In step NS3, the time required for printing and unit control may be assumed and calculated as the optimal number (value in which a retransmission/reception time is equal to a printing time, without a waiting time caused by operations of protocols and units) of retransmission request frames or the specific number of frames so as to correspond to a transmission speed in accordance with the number of frames to be printed, the number of lines to be printed, the printing time per line, the frame size, and the like.

In step NS4, the CPU 1-1 sends a PPR together with the number of frames assumed and calculated in previous step NS3 and the received frame data and the frame data in a reception error.

In sending the PPR, the retransmission request frames are set at the optimal positions under the condition that the printing cannot be completed within the flow control time (i.e., the frames are to be set at the end of reception block).

After the PPR is sent, the CPU 1-1 shifts to offpage connector R4.

Then, in step S436, the CPU 1-1 decodes the received image data, and checks whether one line of image data is decoded and whether the line of image data is able to be printed in step S437. If one line of image data has not been decoded in step S437, the CPU 1-1 checks whether the decoding of one frame data is finished in step S440. If one frame of data is finished, the CPU 1-1 shifts from step S440 to step S433. If the decoding of one frame of data is not finished, the CPU 1-1 returns to step S434.

In a case where one line of image data is decoded, and where the line of image data is able to be printed, the CPU 1-1 checks whether a recording sheet is in the recorder 1-6 in step S438. If so, the CPU 1-1 causes the recorder 1-6 to print the line of image data in step S439, and then returns to step S434. On the other hand, if no recording sheet is in the recorder 1-6, the CPU 1-1 performs an operation of an operator call B (FIG. 32) in step S441. In a case where a recording sheet is set in the procedure operator call B, the CPU 1-1 shifts to step S430.

Figure 30:
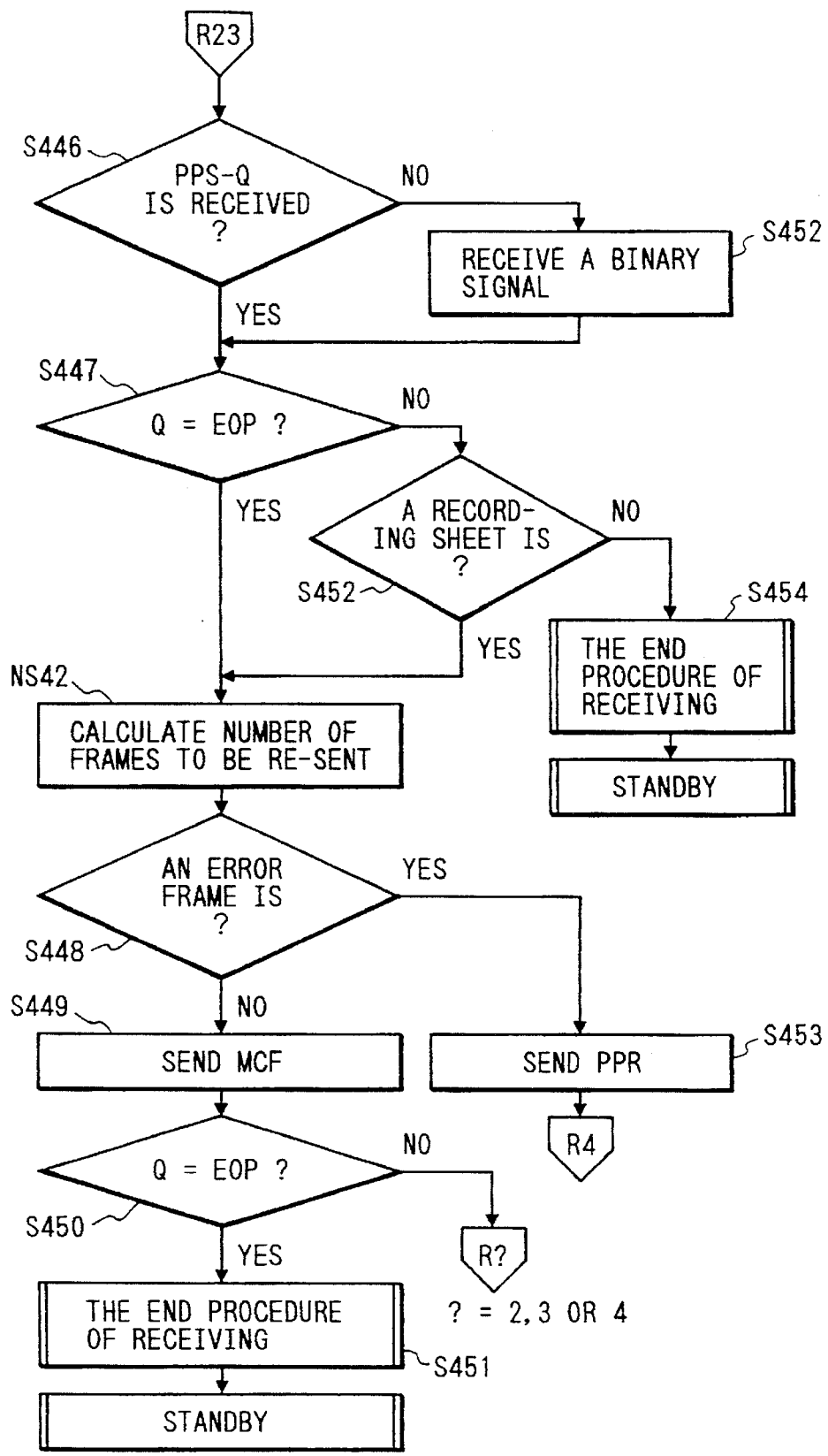

In step S446 of FIG. 30 the CPU 1-1 checks whether a PPS-Q (Q is EOP, EOM, MPS or NULL) is received, and if the PPS-Q is not received, the CPU 1-1 receives a binary signal in step S452.

In step S447, the CPU 1-1 checks whether the received binary signal is the PPS-EOP.

In a case where the received binary signal is not the PPS-EOP, and where the received binary signal is the PPS-NULL, the PPS-MPS, or the PPS-EOM, the CPU 1-1 checks whether a recording sheet is in the recorder 1-6 in step S452. If no recording sheet is in the recorder 1-6, the CPU 1-1 performs the end procedure of receiving in step S454 and then returns to the standby condition.

In a case where the received binary signal is the PPS-EOP in the check of step S447 or where the recording sheet is confirmed in step S452, the number of frames to be printed is assumed and calculated in step NS42 in accordance with the received and confirmed binary signal. If the number of frames to be printed is 128 or more and the frame size is 256 bytes, the CPU 1-1 discriminates that the remaining printing and unit control cannot be completed within the flow control time (about 60±5 sec). A time required for printing and unit control is set to about 30 sec, and the number of frames is assumed and calculated in accordance with an image signal rate.

In step NS42, the time required for printing and unit control may be assumed and calculated as the optimal number of retransmission request frames or the specific number of frames so as to correspond to a transmission speed in accordance with the number of frames to be printed, the number of lines to be printed, the printing time per line, the frame size, and the like. The CPU 1-1 checks whether any error or resend frame is in the received data in step S448. If an error or resend frame is in the received data, the CPU 1-1 sends a PPR to the line through the modem 1-8 and the NCU 1-9 in step S453, and returns to step S413 (FIG. 26) to receive a frame retransmitted from the destination. If no error or resend frame is in the received data, the CPU 1-1 sends the MCF to the line in step S449, and checks whether the received binary signal is the PPS-EOP in step S450. If the received binary signal is the PPS-EOP, the CPU 1-1 performs the end procedure of receiving in step S451, and then returns to the standby condition. If the received binary signal is not the PPS-EOP, the CPU 1-1 shifts to step S402, step S403 or step S413 in accordance with the type of received binary signal.

Figure 31:
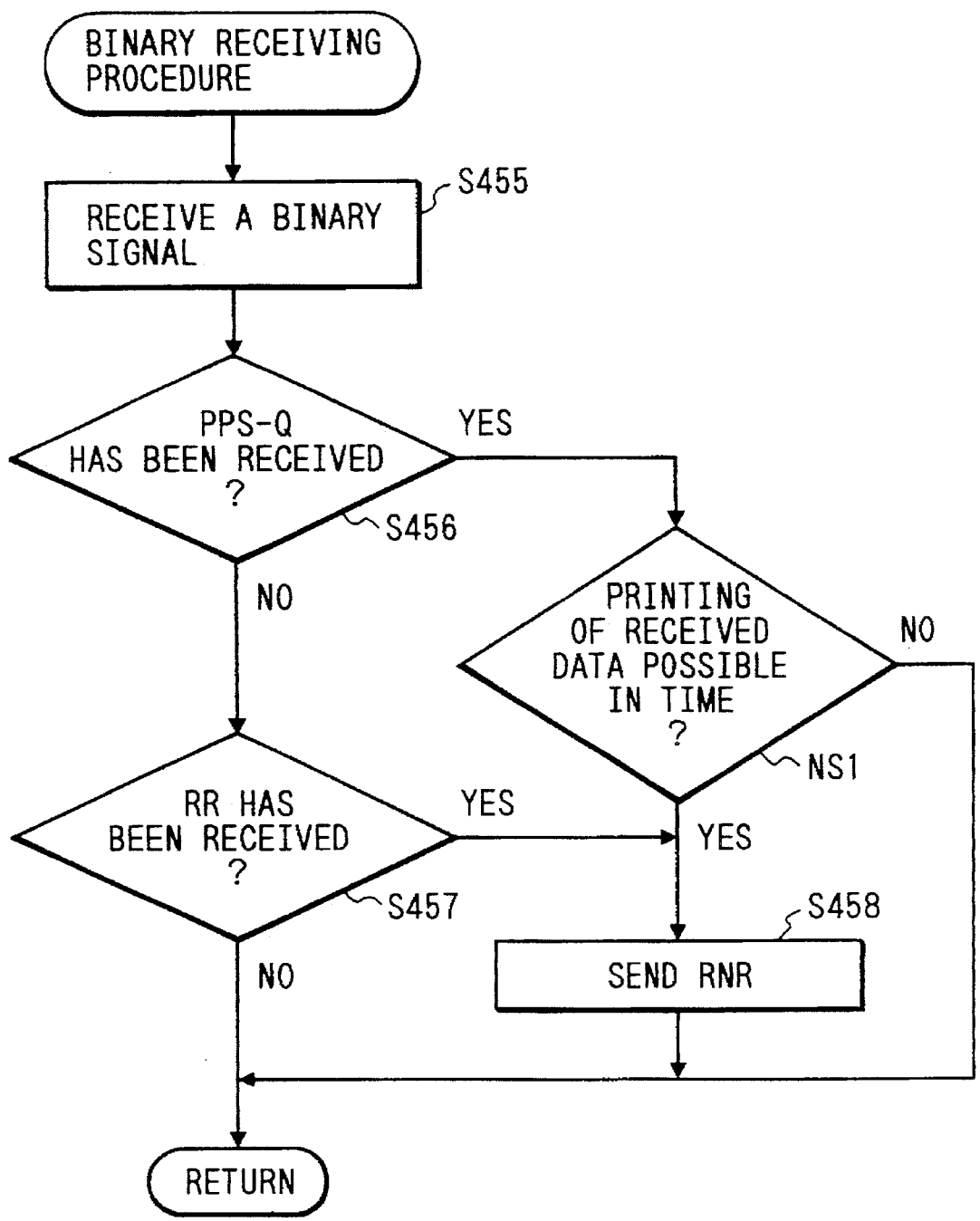
FIG. 31 is a flow chart showing an ECM binary receiving procedure.

FIG. 31 is a flow chart showing the operation of the ECM binary receiving procedure (e.g. step S444 of FIG. 29).

This ECM binary receiving procedure is performed while the stored image data is being printed or the requiring operation for setting a recording sheet is being performed.

In step S455, the CPU 1-1 receives a binary signal. In step S456, the CPU 1-1 checks whether the PPS-Q has been received. If the PPS-Q is not received, the CPU 1-1 checks whether an RR is received in step S457.

When the CPU 1-1 checks the PPS-Q in step S456, the number of frames to be printed is assumed and calculated in step NS1 in accordance with the received and confirmed binary signal. If the number of frames to be printed is 128 or more and the frame size is 256 bytes, the CPU 1-1 discriminates that the remaining printing and unit control cannot be completed within the flow control time (about 60±5 sec).

In step NS1, the time and the number of steps required for printing from a time when the binary signal is received and confirmed may be assumed and calculated in accordance with the number of frames to be printed, the number of lines to be printed, the printing time per line, the frame size, and the like so as to discriminate whether the remaining printing and unit control are completed within the flow control time.

If the remaining printing and unit control are discriminated to be completed within the flow control time, the CPU 1-1 sends an RNR to the line in step S458, and returns to the previous flow to continue printing.

If the remaining printing and unit control are discriminated not to be completed within the flow control time, the CPU 1-1 returns to the previous flow to interrupt printing.

In a case where the RR is received in step S457, the CPU 1-1 sends an RNR to the line in step S458, and then returns to the previous flow.

Figure 44:
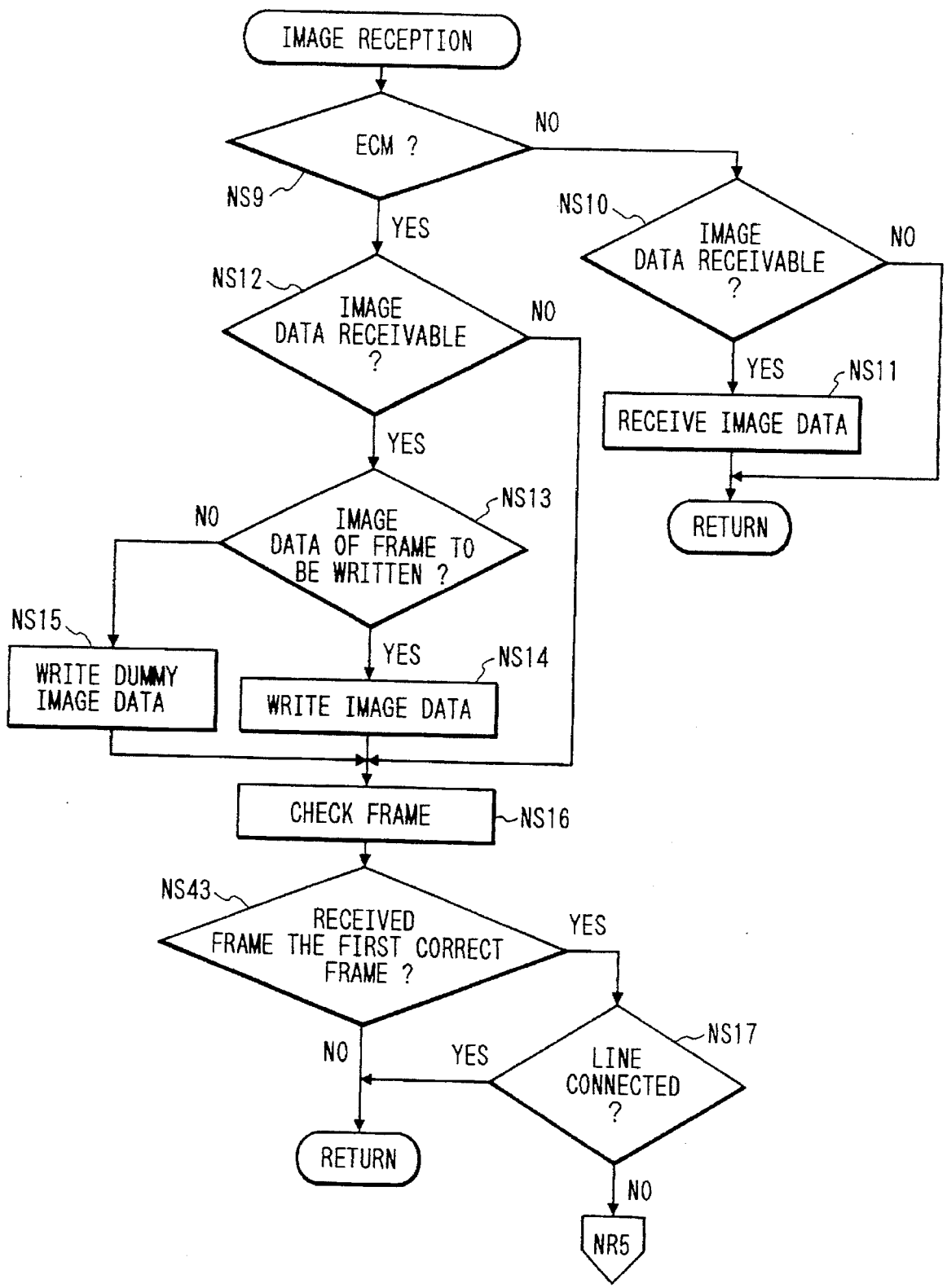
FIG. 44 and FIG. 45 together form a flow chart showing an image data receiving operation (for example, step S414 in FIG. 26).

FIG. 44 is a flow chart showing the operation of the reception of an image.

In step NS9 of FIG. 44, the CPU 1-1 discriminates whether an ECM reception is on.

If the ECM reception is not on, G3 reception is set to be on and the CPU 1-1 discriminates whether image data is loaded in step NS10.

If the image data can be loaded, the CPU 1-1 loads the image data in step NS11, and returns to the previous flow.

If the image data cannot be loaded, the CPU 1-1 returns to the previous flow.

If the ECM reception is on, the CPU 1-1 discriminates whether the image data can be loaded in step NS12.

If the image data can be loaded, the CPU 1-1 discriminates in step NS13 whether the image data is of a frame to be written, a frame required to be retransmitted due to an error, or a frame required to be retransmitted due to failure in printing. If the image data must be written, the image data is written in step NS14.

If the image data need not be written, the image data is loaded as dummy data in step NS15.

(If a correct frame has been written as a frame required to be retransmitted due to failure in printing, or the like, the CPU 1-1 may not load a frame over such a correct frame in order to avoid a further retransmission requirement caused by an error that an error frame is written in the correct frame.)

After image data processing is finished, the CPU 1-1 checks frame data in step NS16.

In step NS43, the CPU 1-1 checks whether the received frame is the first correct one in the image signals. If YES in step NS43, the CPU 1-1 discriminates in step NS17 whether the connection is other than LINE connection. The CPU 1-1 holds an equalizer of the modem so as to discriminate whether an image is received.

Figure 45:
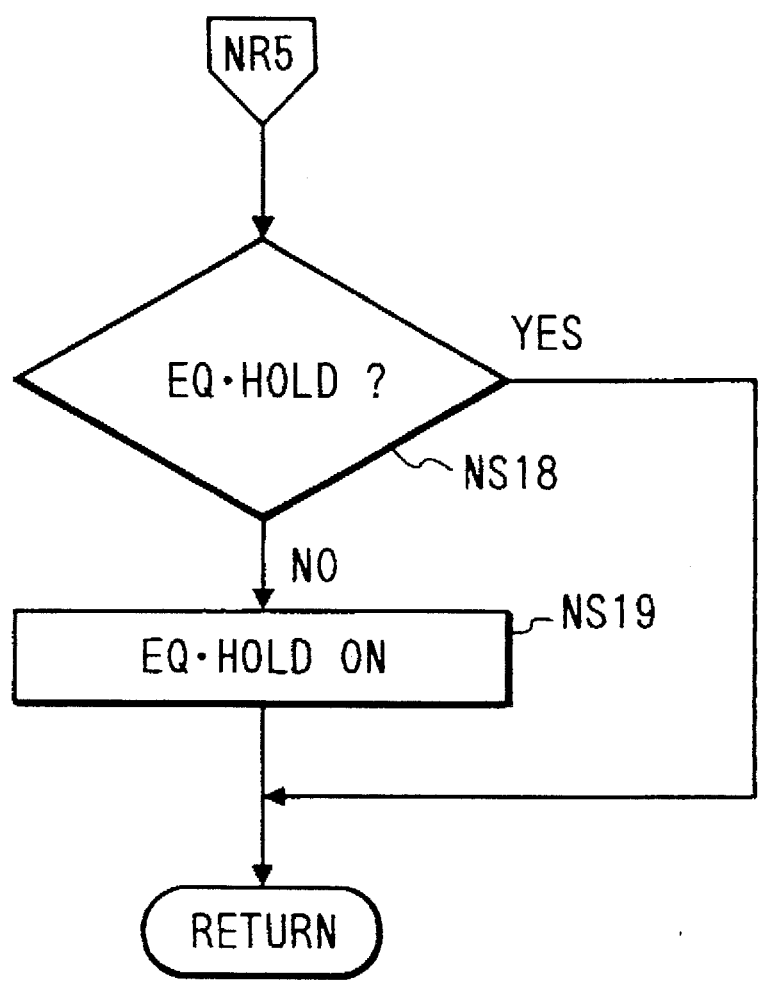

If the connection is other than the LINE connection, the image signals are received. In step NS18 of FIG. 45, the CPU 1-1 discriminates whether the equalizer has been held. If NO in step NS18, the equalizer is held in step NS19 of FIG. 45.

In a case where the equalizer is held and the image signals are received in the ECM-MODE, a communication rate is reset or changed by a CTC or the like, without TCF check. In addition, in a case where the equalizer is reset and held by training at retransmission in accordance with the distribution of error frames, optimal EQ.HOLD can be realized.

When the check on the EQ.HOLD and the like are finished, the CPU 1-1 returns to the previous flow.

Figure 46:
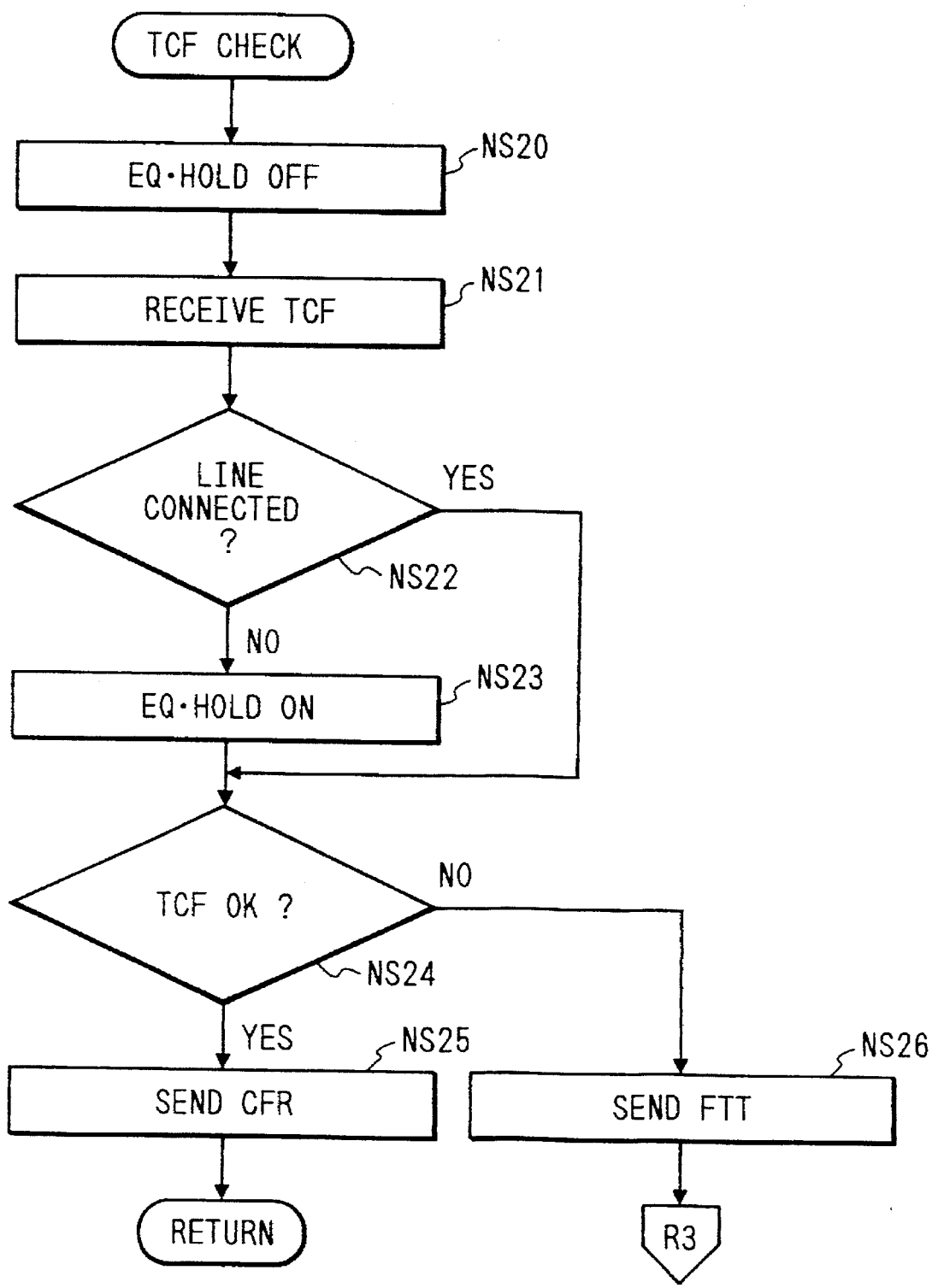
FIG. 46 is a flow chart showing processes when signal TCF is received.

FIG. 46 is a flow chart showing TCF reception check.

After a DCS is received, a TCF is received in this step.

In step NS20, the EQ.HOLD of the modem is released.

In step NS21, the TCF is received to sample signals.

In step NS22, the CPU 1-1 discriminates whether the connection is other than the LINE connection, and then checks whether the image data is received during the EQ.HOLD of the modem.

If the connection is other than the LINE connection, the CPU 1-1 determines that the equalizer of the modem must be held so as to hold the equalizer in step NS23.

The CPU 1-1 may discriminate whether the equalizer is held on the basis of the type of equalizer to be connected to the main body, a variation in received TCF signals, and a line mode.

In step NS24, the CPU 1-1 checks "0" continuity.

If the TCF is adequate, the CPU 1-1 transmits a CFR in step NS25, and returns to the previous flow to wait for reception of the image signals.

If the TCF is not adequate, the CPU 1-1 transmits an FTT in step NS26, and returns to offpage connector R3 to wait for reception of the DCS.

Figure 47:
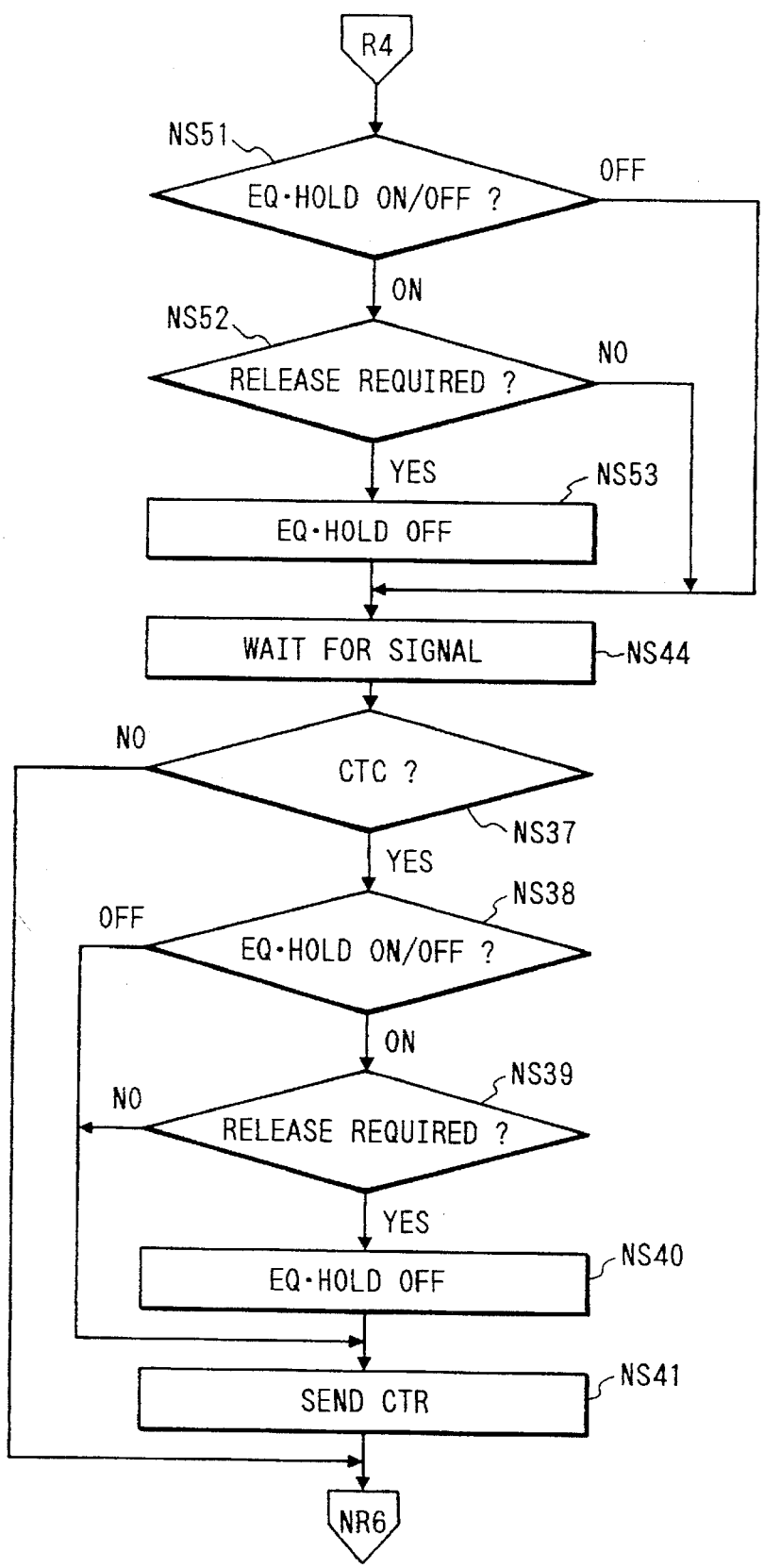
FIG. 47 is a flow chart showing processes after signal PPR is transmitted.

FIG. 47 is a flow chart showing the processing of waiting for an image signal and a binary signal in offpage connector R4.

In FIG. 47, the CPU 1-1 determines whether the equalizer of the modem is held on the basis of reception of an image signal.

In step NS51, the CPU 1-1 checks whether the equalizer is held before the reception of the image signal.

If the equalizer is held, the CPU 1-1 checks in step NS52 whether the equalizer must be released.

(In a case where the CPU 1-1 discriminates that the equalizer may be held in next reception of the image signal on the basis of the type of equalizer to be connected to the main body, and the distribution of error frames, the equalizer is released.)

If the EQ.HOLD is to be released, the EQ.HOLD is released in step NS53.

After processing of the equalizer is finished, the CPU 1-1 waits for signals in step NS44.

In a case where the received signals are the binary CTC (correction continuity) in step NS37, the transmitting end designates a communication rate, which may be different from the present communication rate.

In this case, since the EQ.HOLD may be an obstacle to the reception, the EQ.HOLD is released.

In step NS38, the CPU 1-1 checks whether the equalizer is held before the reception of the image signal.

If the equalizer is held, the CPU 1-1 checks in step NS39 whether the EQ.HOLD must be released.

(In a case where the CPU 1-1 discriminates that the equalizer may be held in next reception of the image signal on the basis of the type of equalizer to be connected to the main body, a resetting or change in a communication rate, and the distribution of error frames, the equalizer is released.)

If the EQ.HOLD is to be released, the EQ.HOLD is released in step NS40. After processing of the equalizer is finished, the CPU 1-1 transmits the CTR in step NS41, and returns to offpage connector NR6 of FIG. 25.

Figure 32:
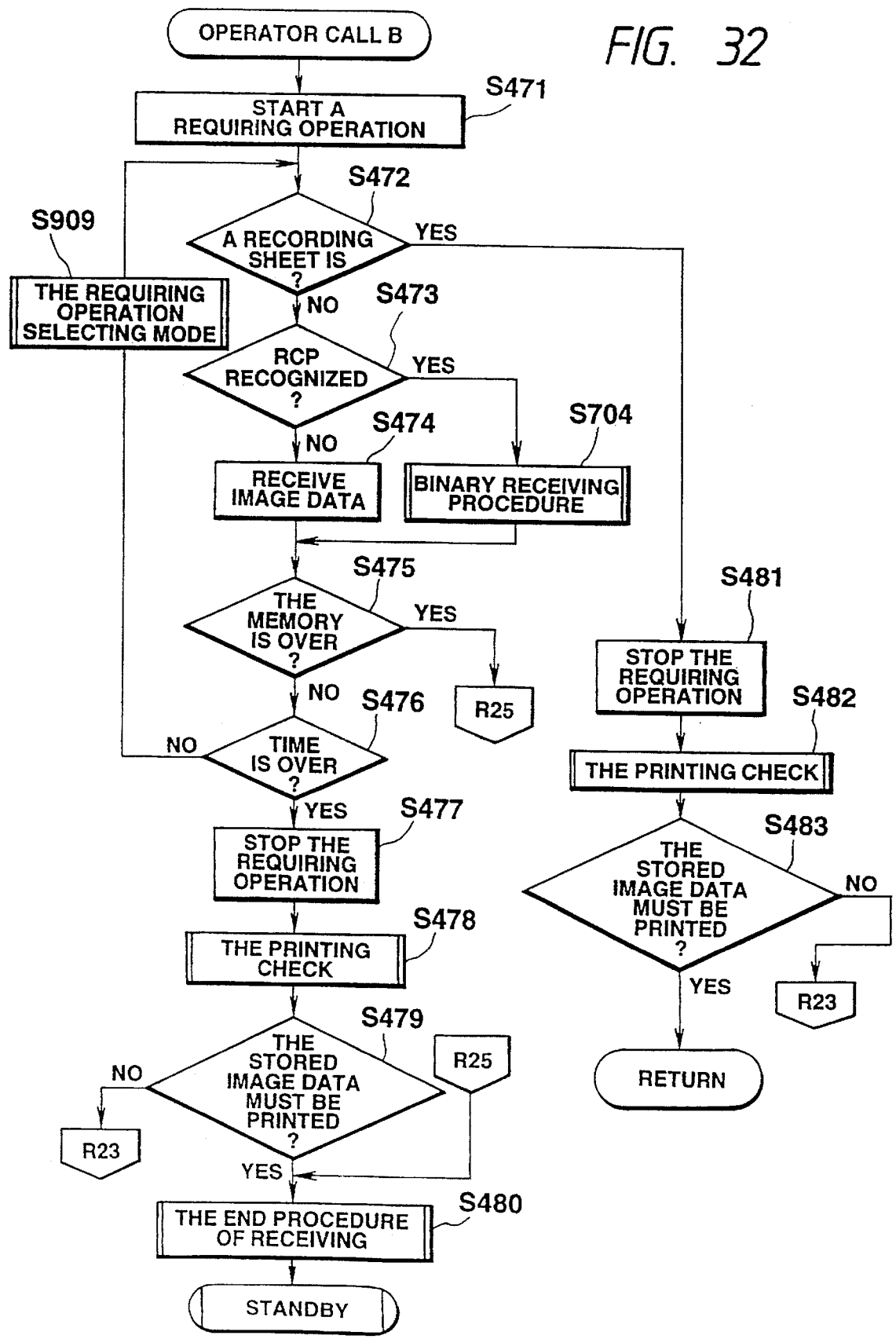
FIG. 32 is a flow chart showing an operation of an operator call B.

FIG. 32 is a flow chart showing the operation of the operator call B (step S441 of FIG. 29).

In step S471 of FIG. 32, the CPU 1-1 starts the requiring operation for setting a recording sheet, and checks whether a recording sheet is in the recorder 1-6 in step S472. If so, the CPU 1-1 stops the requiring operation in step S481, checks the stored image data to be printed in step S482, and discriminates whether the stored image data must be printed in step S483. If the stored image data must be printed, the CPU 1-1 returns to the previous flow. On the other hand, if the stored image data need not be printed, the CPU 1-1 shifts from step S483 to step S446 (FIG. 30).

In a case where a recording sheet is not in the recorder 1-6 in step S472, the CPU 1-1 discriminates whether the RCP has been received in step S473 If the RCP is not received, the CPU 1-1 performs the image reception in step S472. If the RCP is received, the CPU 1-1 performs the ECM binary receiving procedure in step S704.

In step S475, the CPU 1-1 checks whether the capacity of the image memory, which is available to store image data, is above a predetermined amount. If not, the CPU 1-1 performs the end procedure of receiving in step S480, and then returns to the standby condition. If the capacity of the image memory is above the predetermined amount, the CPU 1-1 checks the time elapsed from starting the requiring operation in step S476. In a case where the time is less than the predetermined time, the CPU 1-1 performs the operation of the requiring operation switching mode (FIG. 42) in step S909, and then returns to step S472. On the other hand, in a case where the time is greater than the predetermined time, the CPU 1-1 stops the requiring operation in step S477, checks the stored image data to be printed in step S478, and discriminates whether the stored image data must be printed in step S479. If the stored image data must be printed, the CPU 1-1 performs the end procedure of receiving in step S480, and then returns to the standby condition. If the stored image data need not be printed, the CPU 1-1 shifts from step S479 to step S446 (FIG. 30).

Figure 33:
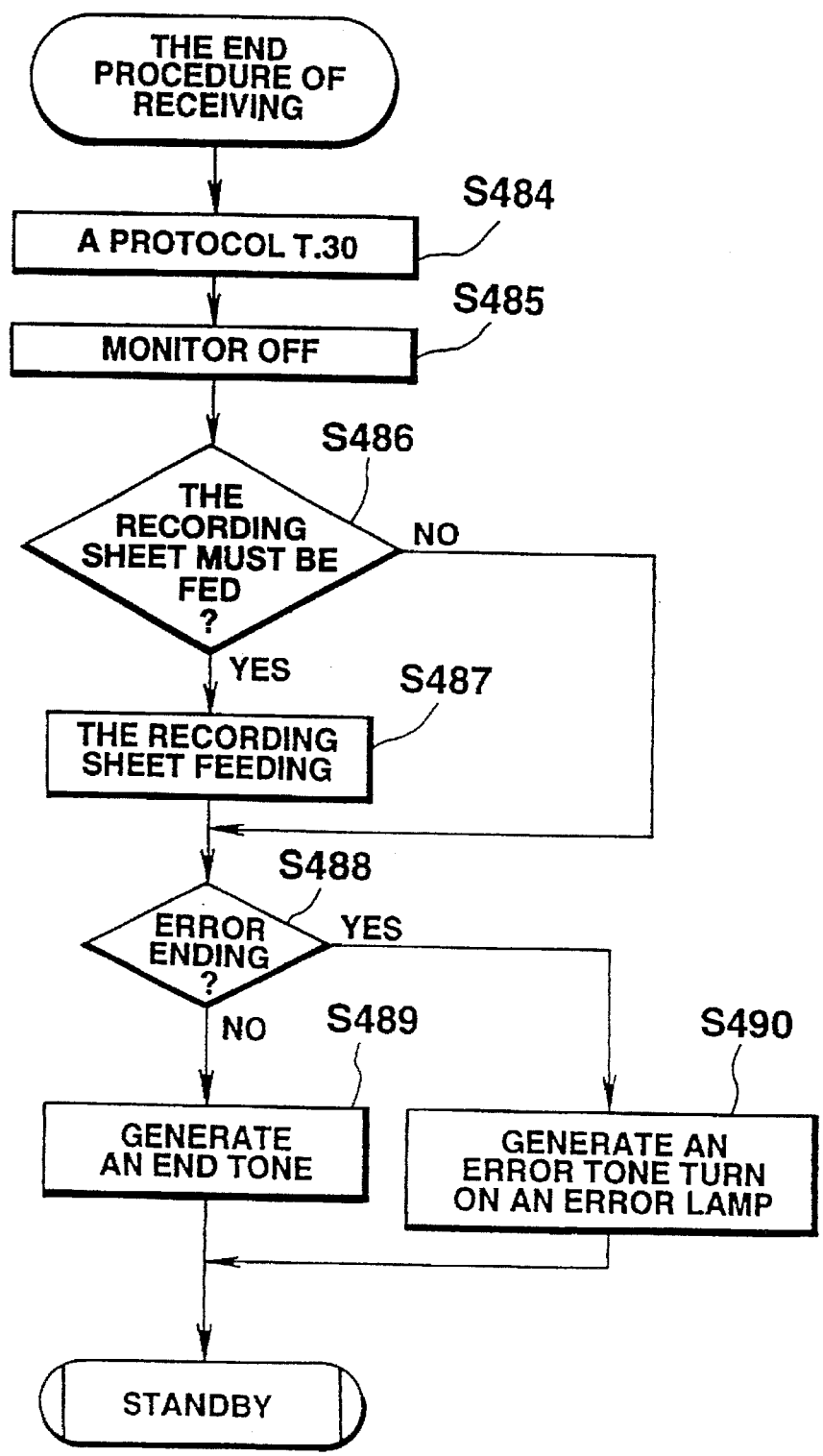
FIG. 33 is a flow chart showing the end procedure of receiving.

FIG. 33 is a flow chart showing the end procedure of receiving (e.g. step S412 of FIG. 25, step S426 of FIG. 27).

In step S484 of FIG. 33, the CPU 1-1 terminates the image reception in accordance with the procedure T.30 which is the CCITT recommendation. The CPU 1-1 then stops the monitor operation of the line in step S485, and discriminates whether the recording sheet feeding operation is performed in step S486. In a case where no recording sheet is in the recorder 1-6, or where no information has been printed on the recording sheet set in the recorder 1-6, etc., the feeding operation is not performed. In a case where some information has been printed on the recording sheet set in the recording 1-6, the CPU 1-1 performs the feeding operation in step S487.

In step S488, the CPU 1-1 discriminates whether the image reception was an error. If so, the CPU 1-1 causes the buzzer 1-14 to generate an error tone and turns on an error lamp of the console unit 1-4 in step S490. If the image reception was not an error, the CPU 1-1 causes the buzzer 1-14 to generate an end tone in step S489, and then returns to the standby condition.

FIG. 34 through FIG. 41 together form a flow chart showing the transmission mode operation (step S30 of FIG. 14).

In step S601 of FIG. 34 the CPU 1-1 initializes the transmission speed at the start time and the flag ECM-MODE, etc. In step S602, the CPU 1-1 decides whether to operate the monitor operation of the line. The CPU 1-1 then checks whether a timer T1 (to time e.g. 35 seconds), which has started in step S601, has timed out in step S603, and checks whether the DIS has been received in step S604. In a case where the DIS is received before the timer T1 has expired, the CPU 1-1 performs the monitor selecting A (FIG. 23) in step S605. On the other hand, in a case where the timer T1 has expired without the DIS being received, the CPU 1-1 performs an end procedure of transmitting (FIG. 41) in step S611, and then returns to the standby condition.

In step S606, the CPU 1-1 discriminates whether ECM transmission is possible, in accordance with information as to reception of the DIS and information as to ECM communication set in the start key mode (i.e. ON/OFF). If ECM transmission is possible, the CPU 1-1 sets the flag ECM-MODE in step S613. If ECM transmission is not possible, the CPU 1-1 clears the flag ECM-MODE in step S607. Then, in step S608, the CPU 1-1 sends the DCS and a TCF to the line, and checks whether a result of the training is acceptable in step S609. If the result of the training is not adequate, the CPU 1-1 returns to step S606 and sends the DCS and the TCF to the line again. In a case where the result of the training is satisfactory in step S609, the CPU 1-1 performs image transmission (FIG. 39) in step S610, and checks whether the flag ECM-MODE is on in step S614 of FIG. 35. If the flag ECM-MODE is on, the CPU 1-1 shifts from step S614 to step S625 of FIG. 36, and performs a phase D of the ECM transmission. If the flag ECM-MODE is not on, the CPU 1-1 performs a phase D of the normal G3 transmission.

In step S615, the CPU 1-1 checks whether the next document has been set. If the next document has not been set, the CPU 1-1 sends the EOP to the line in step S620, performs the end procedure of transmitting (FIG. 41), and then returns to the standby condition. On the other hand, if the next document has been set, the CPU 1-1 checks whether the transmission mode is changed in step S616. If the transmission mode is changed, the CPU 1-1 sends the EOM to the line in step S623. If the transmission mode is not changed, the CPU 1-1 sends the MPS to the line in step S617. Then, the CPU 1-1 performs the end procedure of transmitting (FIG. 41) in step S618, and checks whether the image transmission is able to be continued in step S619. If the image transmission can not be continued, the CPU 1-1 performs the end procedure of transmitting in step S624, and then returns to the standby condition. Otherwise, the CPU 1-1 shifts from step S619 to step S603, step S606 or step S610 (FIG. 34). When the MPS is sent in step S617, the CPU 1-1 shifts to step S610. When the EOM is sent in step S623, the CPU 1-1 shifts to step S603 or step S606.

Figure 36:
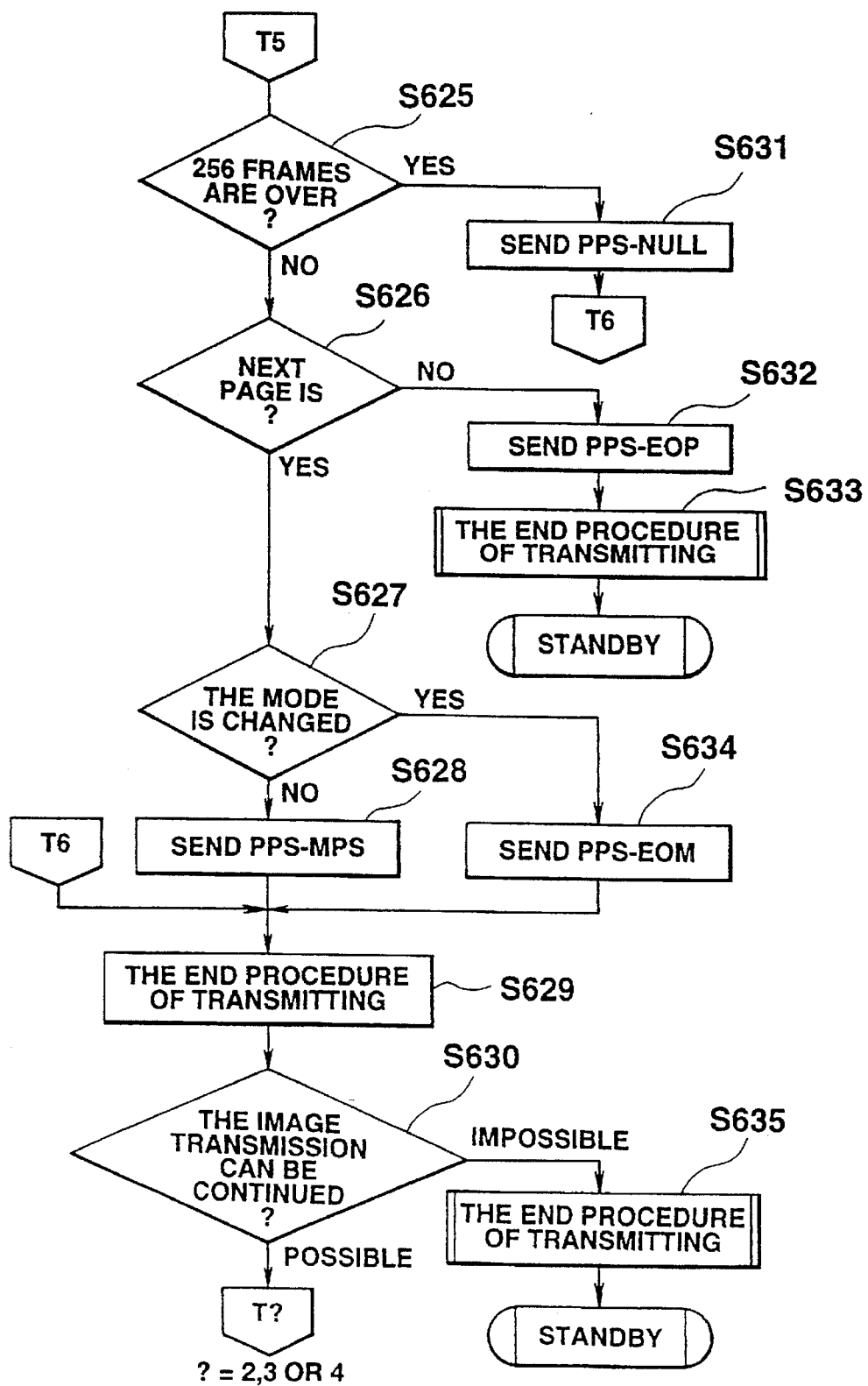

In a case where the flag ECM-MODE is on in step S614, the CPU 1-1 checks whether a page of image data to be transmitted is less than one block (256 flags) in step S625 (FIG. 36). If a page is not less than one block, the CPU 1-1 sends the PPS-NULL to the line in step S631, and then shifts to step S629. If a page of image data is less than one block, the CPU 1-1 checks whether another page of documents is set in the reader 1-5 in responsive to a requiring operation for setting a document after the reading of the previous document has been finished in step S626. If no next page has been set, the CPU 1-1 sends the PPS-EOP to the line in step S632, performs the end procedure of transmitting in step S633, and then returns to the standby condition. If a next page is set in step S626, the CPU 1-1 checks whether the transmission mode is changed in step S627. If the transmission mode is changed, the CPU 1-1 sends the PPS-EOM to the line in step S634. On the other hand, if the transmission mode is not changed, the CPU 1-1 sends the PPS-MPS to the line in step S628.

In step S629, the CPU 1-1 performs a procedure for continuing the image transmission in step S629, and checks whether the image transmission is able to be continued in step S630. If the image transmission is not able to be continued, the CPU 1-1 performs the end procedure of transmitting in step S635, and then returns to the standby condition. If the image transmission is able to be continued, the CPU 1-1 shifts from step S630 to either step S603, step S606, or step S610 (FIG. 34).

Figure 37:
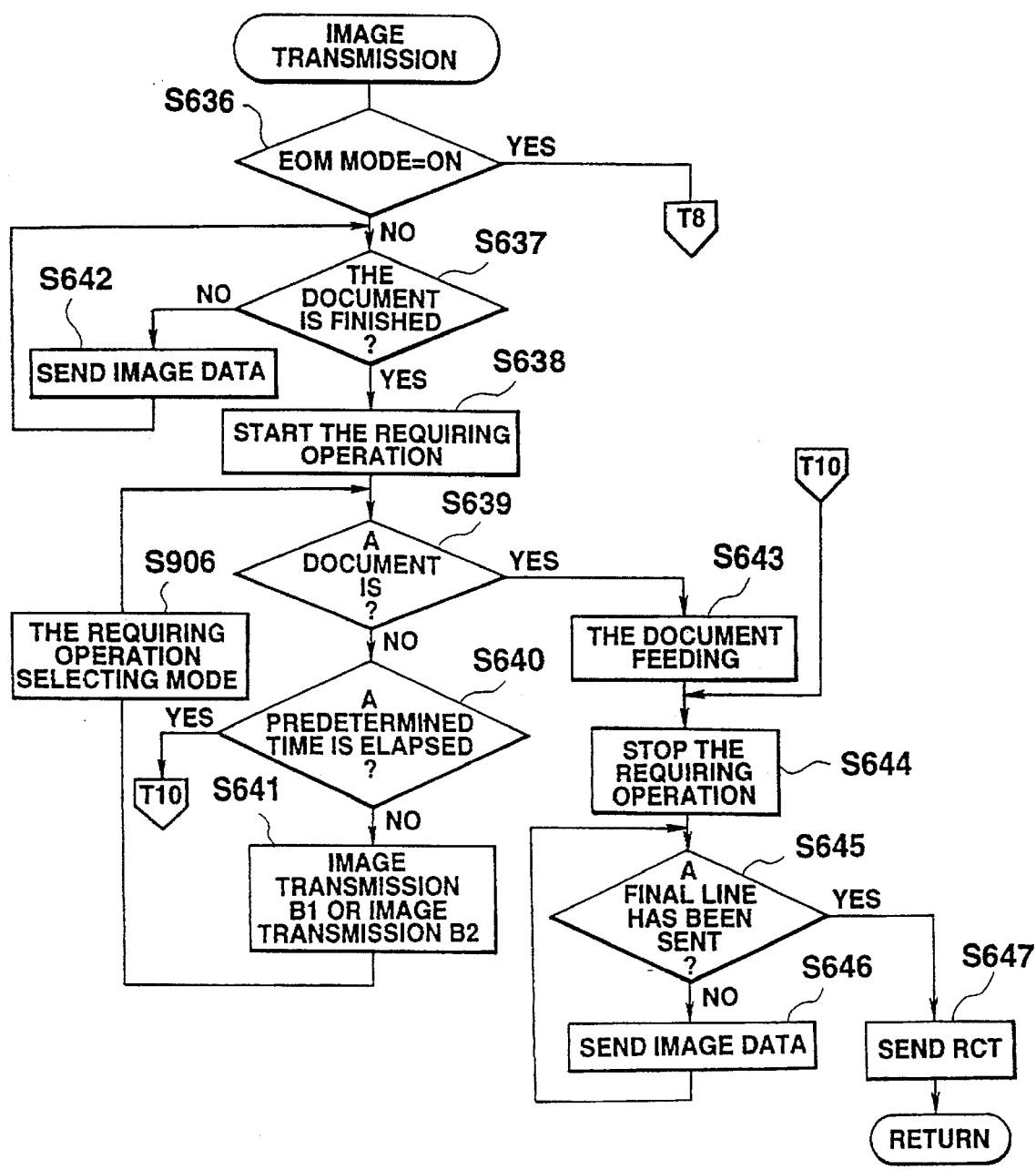
FIG. 37 and FIG. 38 together form a flow chart showing an operation of an image transmission.
Figure 38:
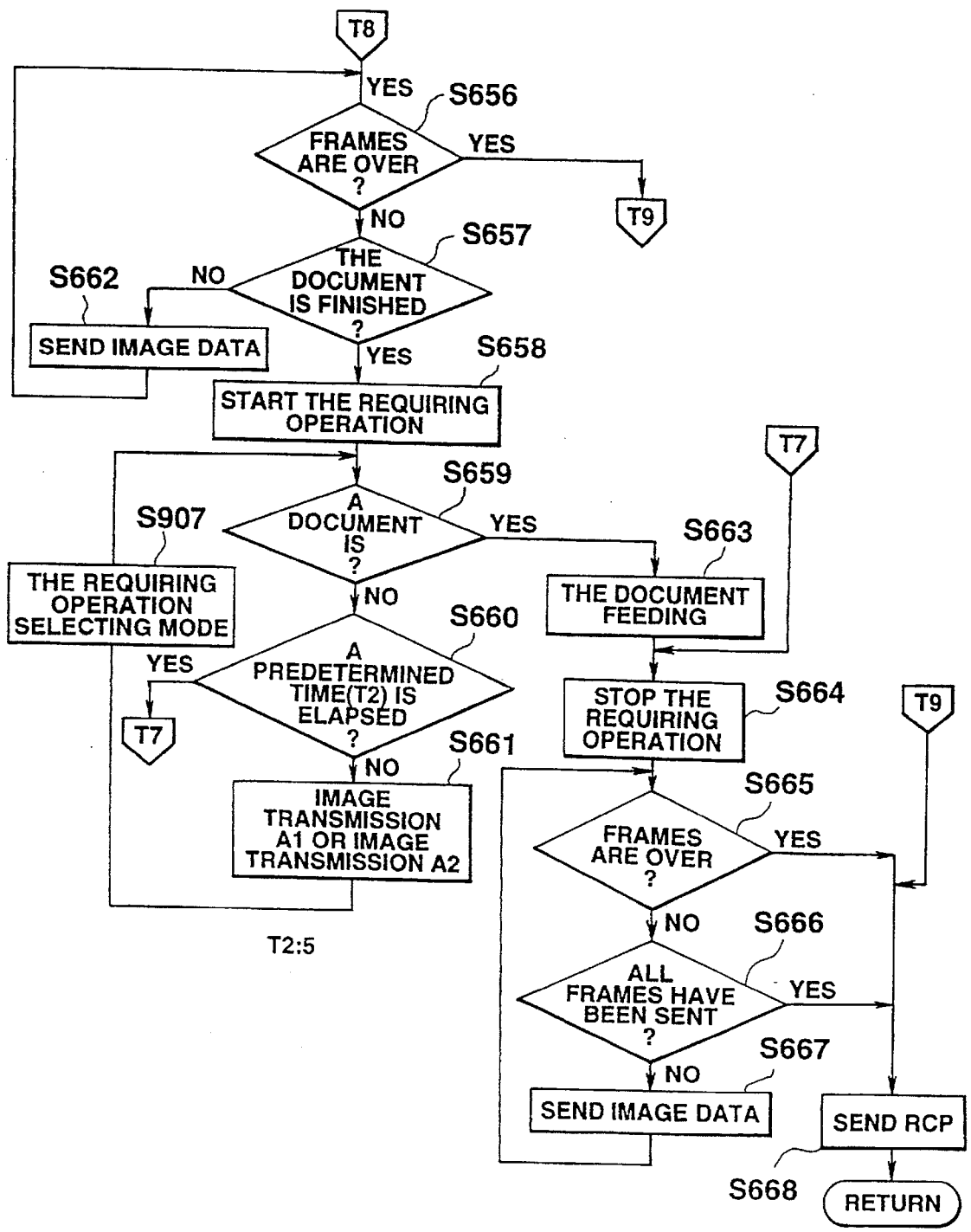

FIG. 37 and FIG. 38 together form a flow chart showing image transmission (step S610 of FIG. 34).

In step S636 of FIG. 37, the CPU 1-1 checks whether the flag ECM-MODE is on. If the flag ECM-MODE is on, the CPU 1-1 shifts from step S636 to step S656 of FIG. 38. If the flag ECM-MODE is not on, the CPU 1-1 checks whether the document is finished in step S637. If the document is not finished, the CPU 1-1 sends image signals to the line in step S642, and then returns to step S637. In a case where the document is finished in step S637, the CPU 1-1 starts a requiring operation (e.g. generating an alarm tone, or displaying an alarm) for setting an additional document in step S638, and checks whether the additional document is set in the reader 1-5 in step S639. If no additional document is set the CPU 1-1 checks the time elapsed from the start the requiring operation for setting a document in step S640. In a case where the time elapsed is less than 5 seconds, the CPU 1-1 performs an image transmission B1 (FIG. 39(a)) or an image transmission B2 (FIG. 39(b)) in step S641, performs the requiring operation switching mode (FIG. 42) in step S906, and then returns to step S639. On the other hand, in a case where the time elapsed is over 5 seconds, the CPU 1-1 shifts from step S640 to step S644. In a case where an additional document is set before the time exceeds 5 seconds, the CPU 1-1 performs the feeding operation of the original document (FIG. 21) in step S643, stops the requiring operation of setting the document in step S644, and checks whether a final line of image data has been sent to the line in step S645. If the final line of image data has not been sent, the CPU 1-1 sends image signals to the line in step S646. If the final line of image data is sent, the CPU 1-1 sends the RTC to the line in step S647, and then returns to the previous flow.

The image transmission B1 and B2 are processes to insert fill data between one line and the next line, or between a final line and the RTC, so as to hold the communication line.

Figure 39A:
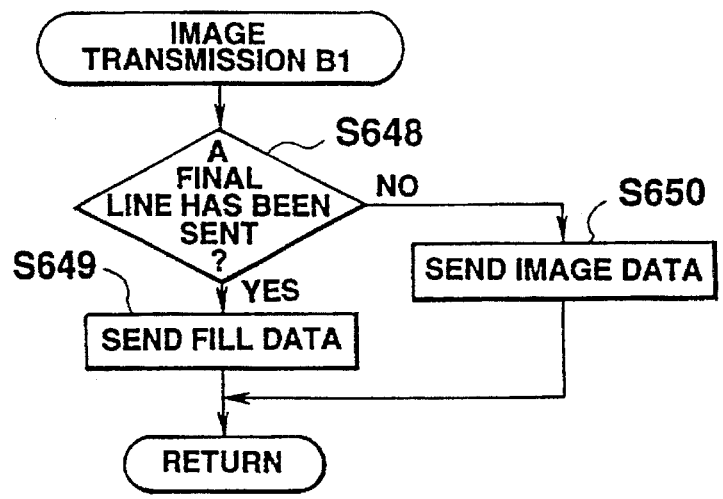
FIG. 39(a) is a flow chart showing an image transmission B1.

In the image transmission B2 (FIG. 39(a)), the CPU 1-1 checks whether the final line of image data has been sent in step S648, and if so, the CPU 1-1 sends fill data to the communication line in step S649. On the other hand, if the final line of image data has not been sent, the CPU 1-1 sends image signals to the communication line in step S650.

Figure 39B:
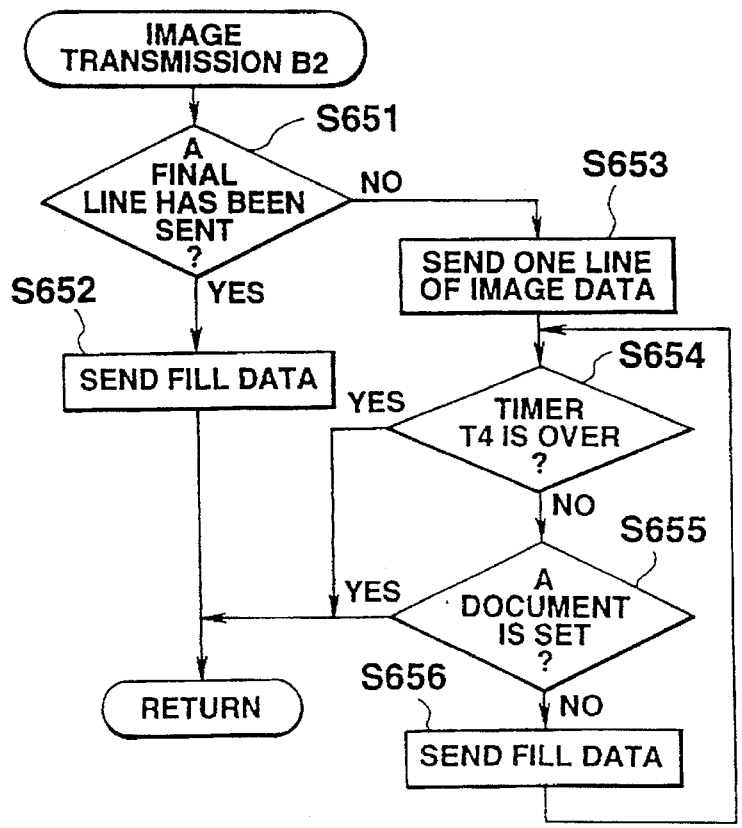
FIG. 39(b) is a flow chart showing an image transmission B2.

In the image transmission B2 (FIG. 39(b)), the CPU 1-1 checks whether the final line of image data has been sent or not in step S651, and if not, the CPU 1-1 sends one line of image data to the communication line and clears a timer T4 in step S653. The CPU 1-1 then checks whether the timer T4 is expired in step S654, and checks whether an additional document is set in the reader 1-5 in step S655. In a case where the timer T4 has expired, or where an additional document is set before the timer T4 has expired, the CPU 1-1 returns to step S906 (FIG. 37). In a case where no additional document is set, the CPU 1-1 sends fill data to the communication line in step S656 until timer T4 has expired. If the final line of image data has been sent in step S651, the CPU 1-1 sends fill data to the communication line in step S652 and then returns to step S906 (FIG. 37).

In a case where the flag ECM-MODE is on in step S638, in step S656 the CPU 1-1 checks whether the sending of one block of data (256 frames) is finished (FIG. 38).

If one block of data is not finished being sent, the CPU 1-1 checks whether the document is finished in step S657. If not, the CPU 1-1 sends image signals to the communication line in step S662. If the document is finished, in step S658, the CPU 1-1 starts the requiring operation of setting a document in step S658, and checks whether a document is set in the reader 1-5 in step S659. If not, the CPU 1-1 checks whether the time elapsed since starting the requiring operation is over a predetermined time (e.g. 5 seconds) in step S660, and if the elapsed time is less than the predetermined time, the CPU 1-1 performs an image transmission A1 (FIG. 40(a)) or an image transmission A2 (FIG. 40(b)) in step 3661. The CPU 1-1 then performs the requiring operation switching mode (FIG. 42) in step S907, and returns to step S659. On the other hand, if the elapsed time is greater than the predetermined time in step S660, the CPU 1-1 shifts to step S664.

If a document is set in the reader 1-5 in step S659, the CPU 1-1 performs the document feeding operation (FIG. 21) in step S663, stops the requiring operation for setting a document in step S664, and checks whether sending one block data (256 frames) is finished in step S665. In a case where sending one block data is finished in step S656 or step S665, the CPU 1-1 sends the RCP to the communication line in step S668, and then returns to the previous flow.

If sending one block of data (256 frames) is not finished in step S665, the CPU 1-1 checks whether all frames have been sent in step S666, and if not, the CPU 1-1 sends image signals to the communication line in step S667. If all frames have been sent in step S666, the CPU 1-1 shifts to step S668.

The image transmission A1 and A2 are processes to insert flags between one frame and the next so as to hold the communication line.

Figure 40A:
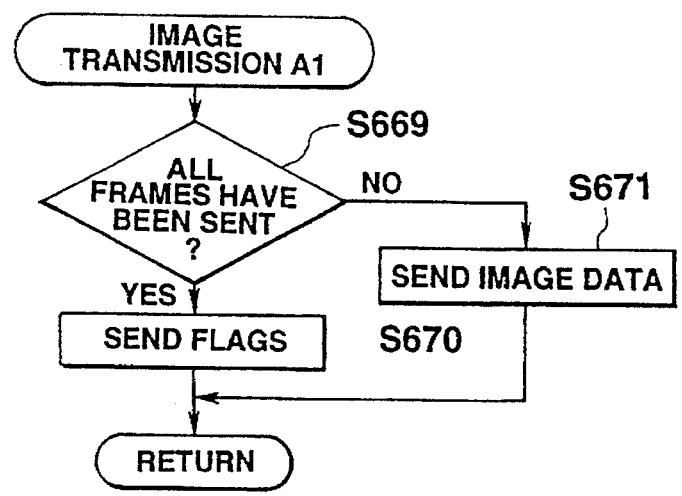
FIG. 40(a) is a flow chart showing an image transmission A1.

In the image transmission A1 (FIG. 40(a)), the CPU 1-1 checks whether all frames have been sent in step S669, and if not, the CPU 1-1 sends image signals to the communication line in step S671. On the other hand, if all frames have been sent, the CPU 1-1 sends flags to the communication line in step S670.

Figure 40B:
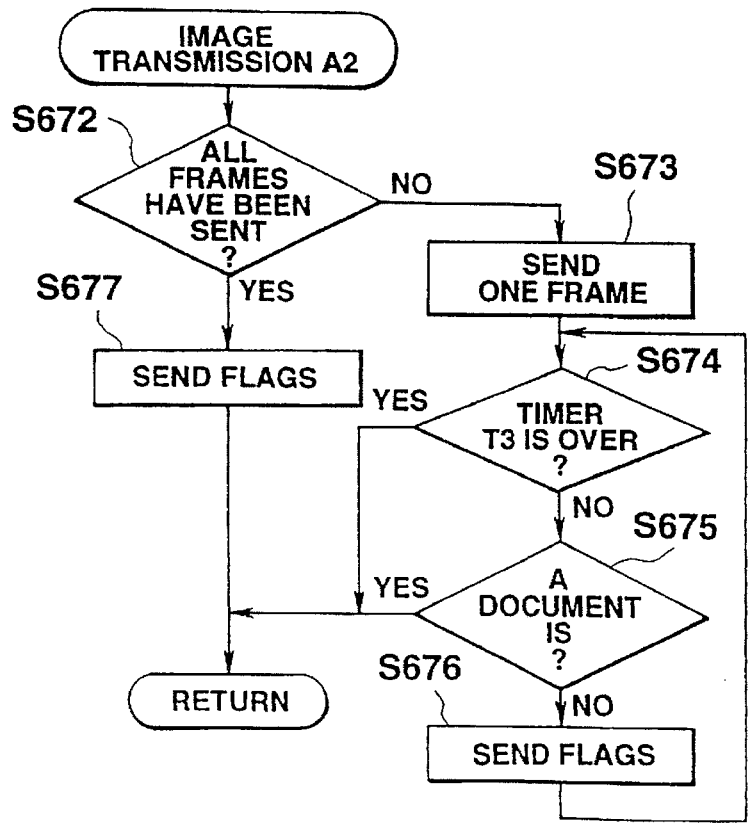
FIG. 40(b) is a flow chart showing an image transmission A2.

In the image transmission A2 (FIG. 40(b)), the CPU 1-1 checks whether all frames have been sent in step S672, and if so, the CPU 1-1 sends flags to the communication line in step S677. If all frames have not been sent, the CPU 1-1 sends one frame of data to the communication line and clears a timer T3 in step S673.

In step S674 the CPU 1-1 checks whether the timer T3 has expired. If so, the CPU 1-1 checks whether a document is set in the reader 1-5 in step S675. In a case where the timer T3 has expired, or where a document is set in the reader 1-5 before the timer T3 has expired, the CPU 1-1 returns to step S907 (FIG. 38). In a case where no document is set, and where the timer T3 has not expired, the CPU 1-1 sends flags to the communication line in step S695.

Figure 35:
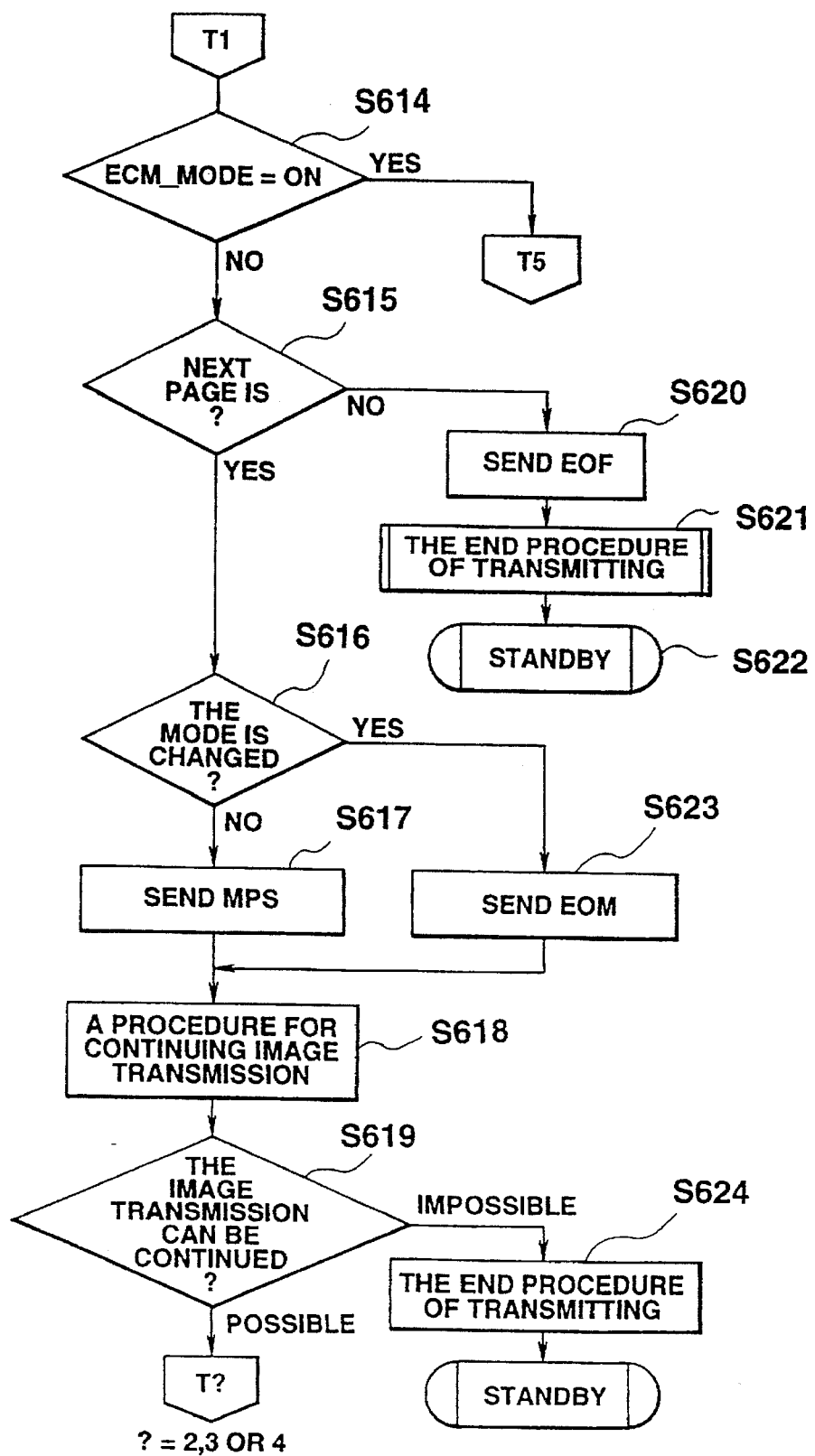
Figure 41:
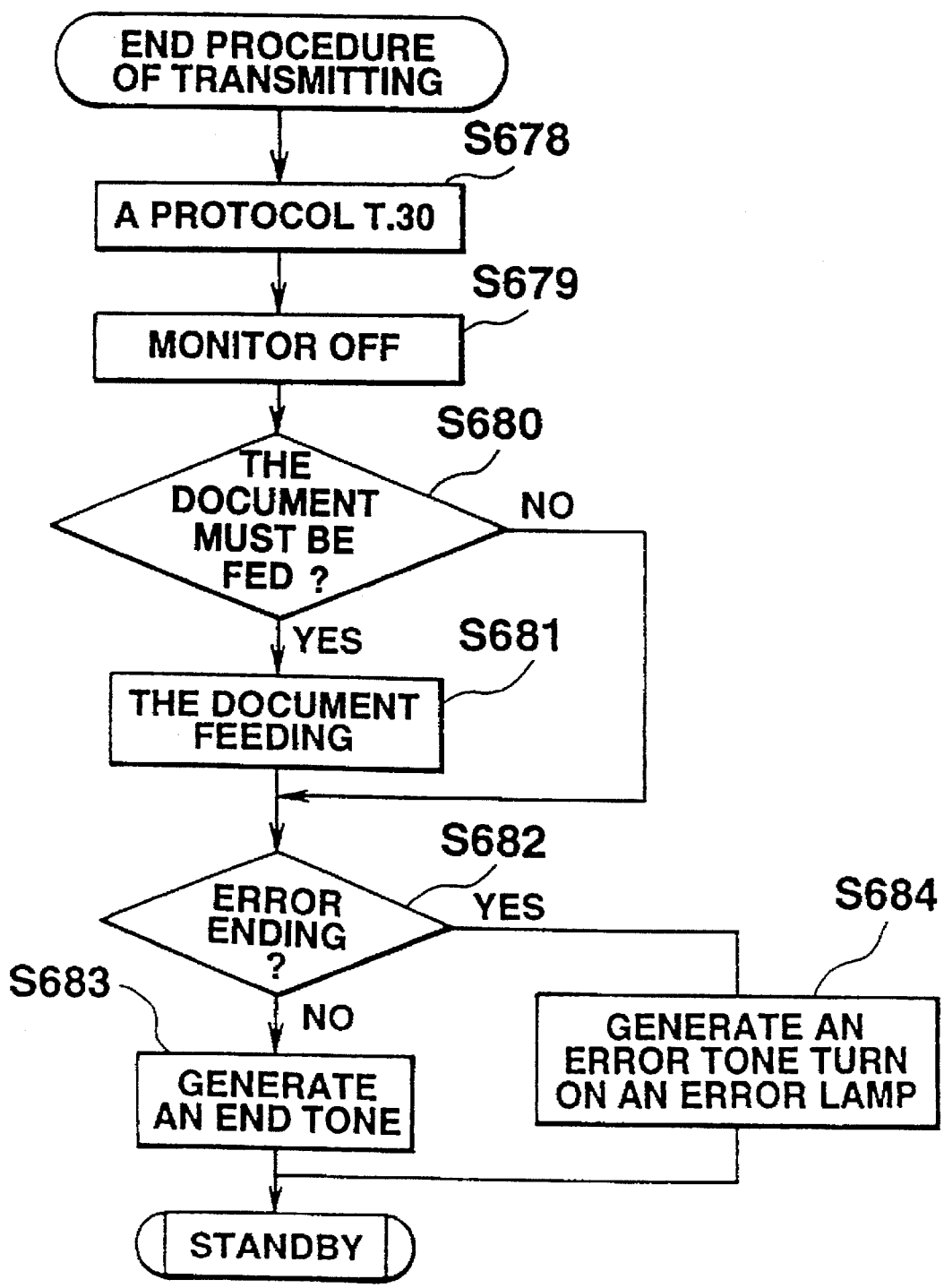
FIG. 41 is a flow chart showing an end procedure of transmitting.

FIG. 41 is a flow chart showing the end procedure of transmitting (step S624 of FIG. 35 and steps S633 and S635 of FIG. 36).

In step S678 of FIG. 41, the CPU 1-1 performs a protocol which is to finish the image transmission and which accords with the recommendation T30 by the CCITT. CPU 1-1 then stops the monitor operation in step S679, and checks if the document must be fed in step S680. If the document must be fed, the CPU 1-1 performs the document feeding operation in step S681.

In step S682, the CPU 1-1 checks whether the image transmission was an error, and if not, the CPU 1-1 causes the buzzer 1-14 to generate an end tone in step S683, and then returns to the standby condition. If the image transmission was an error, the CPU 1-1 causes the buzzer 1-14 to generate an error tone and turns on an error lamp in step S684, and then returns to the standby condition.

Figure 42:
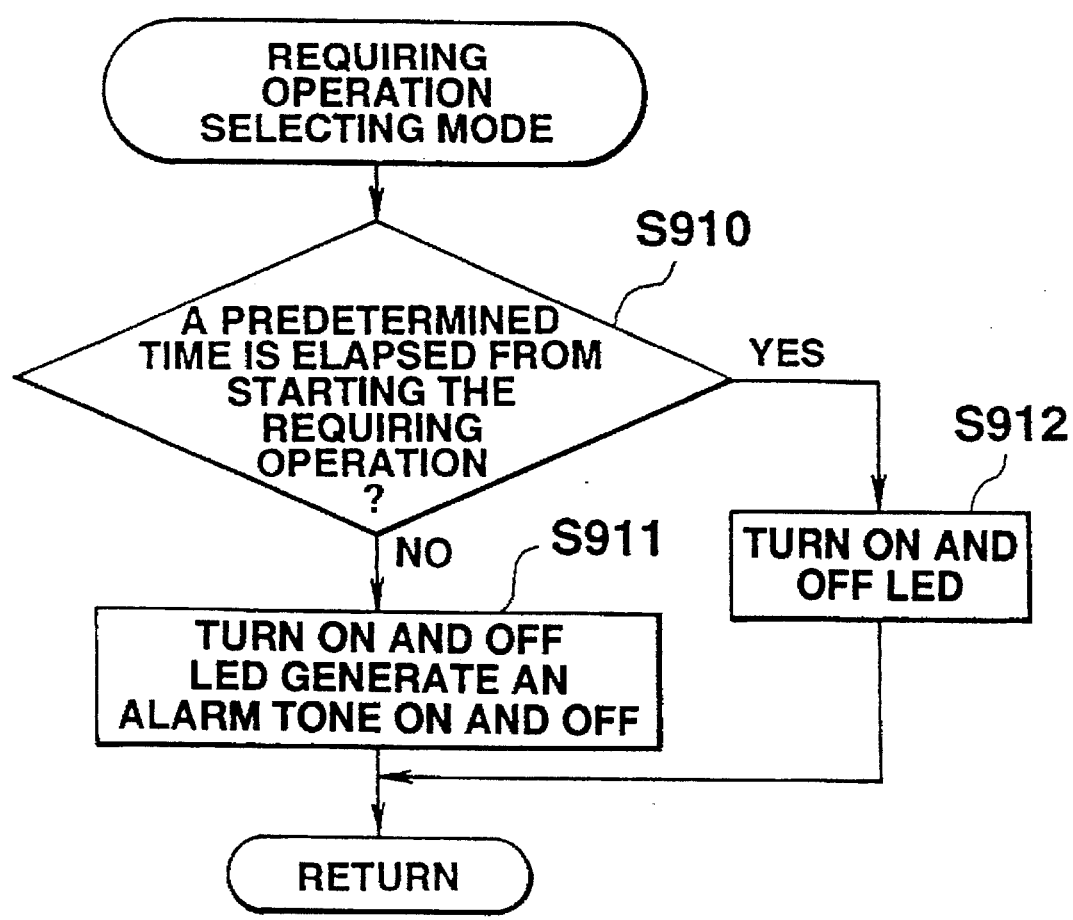
FIG. 42 is a flow chart showing an operation of a requiring operation switching mode.

FIG. 42 is a flow chart showing the requiring operation switching mode (step S906 of FIG. 37, step S907 of FIG. 38, step S908 of FIG. 28, and step S909 of FIG. 32).

In step S910 of FIG. 42, the CPU 1-1 checks the time elapsed from starting the requiring operation of setting a document (or a recording sheet). In a case where the elapsed time is not greater than predetermined time, in step S911 the CPU 1-1 causes the buzzer 1-14 to generate an alarm tone intermittently and turns an LED on and off. If the elapsed time is greater than the predetermined time, the CPU 1-1 turns the LED on and off in step S912 (the CPU 1-1 stops generating the alarm tone), and then returns to the previous flow.

Figure 48A:
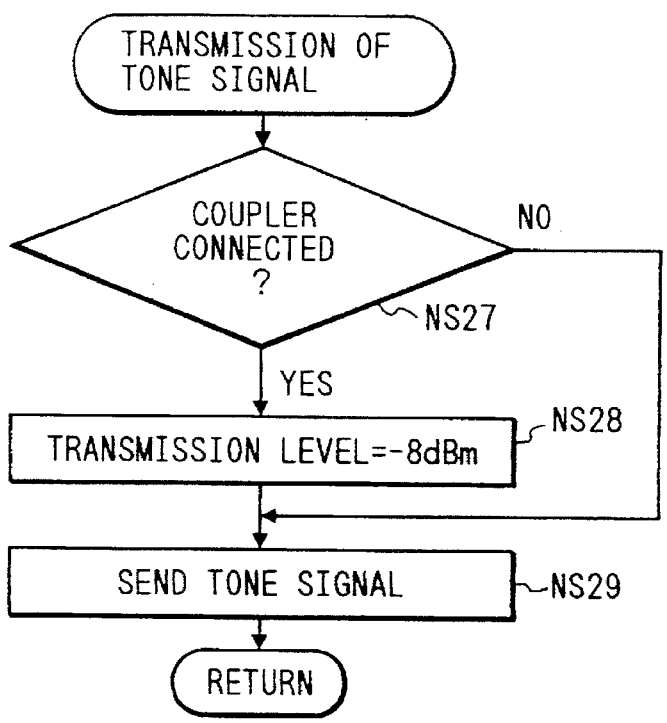
FIG. 48(a) is a flow chart showing processes when a protocol signal is transmitted.
Figure 48B:
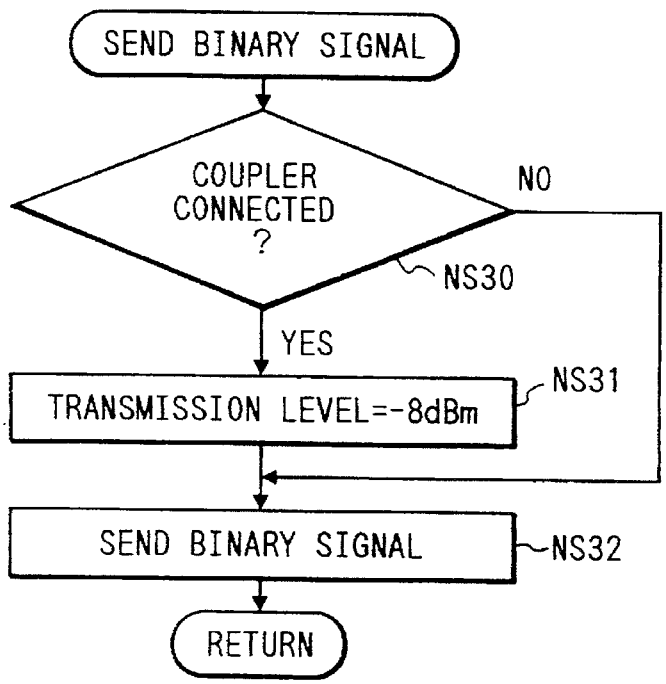
FIG. 48(b) is a flow chart showing processes when a protocol signal is transmitted.
Figure 49:
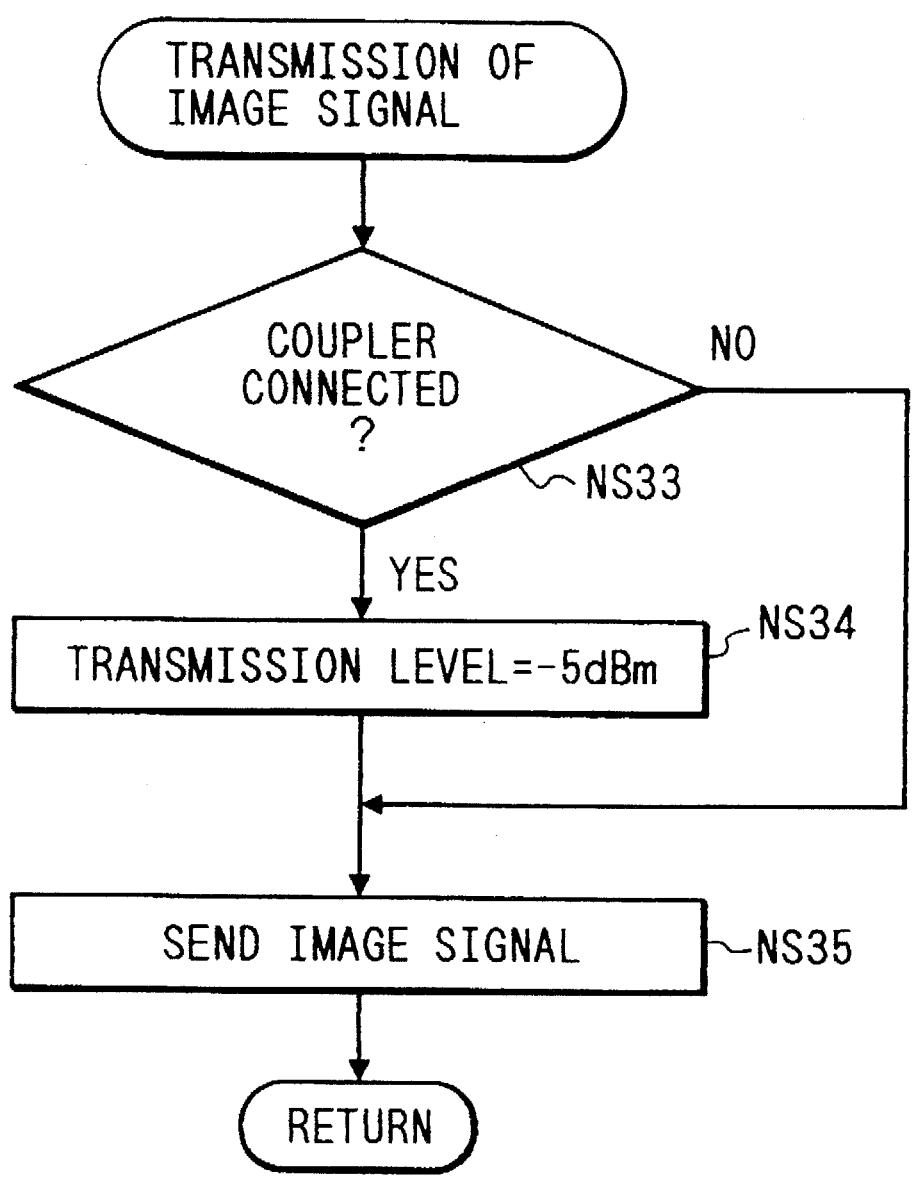
FIG. 49 is a flow chart showing processes when an image signal is transmitted (for example, step S610 in FIG. 34).

FIGS. 48(a) and 48(b), and 49 are flow charts showing a level change and the like when a tone signal, a binary signal, and an image signal are to be sent.

In use of coupler connection, a transmission level for each signal is changed to be different from an initial setting (which is the same for all the transmission levels) in accordance with the acoustic characteristics of the coupler.

In a case of transmission of a tone signal:

In step NS27, the CPU 1-1 checks whether a transmission level must be changed under conditions whether the coupler is connected, and the like.

If the transmission level must be changed, the transmission level of a tone signal is changed in step NS28 (it is set at −8 dBm). That is, if the coupler is connected, the level is changed in step NS28.

In step NS29, a tone signal is transmitted.

In a case of transmission of a binary signal:

In step NS30, the CPU 1-1 checks whether a transmission level must be changed under conditions whether the coupler is connected, and the like.

If the transmission level must be changed, the transmission level of a binary signal is changed in step NS31 (it is set at −8 dBm). That is, if the coupler is connected, the level is changed in step NS31.

In step NS32, a binary signal is transmitted.

In a case of transmission of an image signal (including the TCF):

In step NS33, the CPU 1-1 checks whether a transmission level must be changed under conditions whether the coupler is connected, and the like.

If the transmission level must be changed, the transmission level of an image signal is changed in step NS34 (it is set at −5 dBm). That is, if the coupler is connected, the level is changed in step NS34.

In step NS35, an image signal is transmitted.

Transmission characteristics of each signal may be reset to an optimal level for each type of signal on the basis of the type of destination to be connected to the main body.

In addition, reception characteristics of each signal may be set at an optimal level for each type of signal on the basis of the type of destination to be connected to the main body.

At the communication units, as has been described above, since an optimal reproducing time exceeding the flow control time within which reproduction can be performed by the low-speed reproducing means can be assured during communication, the ECM reception for an elongated original and plural pages can be realized.

In addition, even under software and hardware conditions that the memory which can be used for reception and reproduction of image signals is only one block, and a hardware condition that only a one-block memory is equipped, the smooth, high-speed ECM reception with few wastes can be realized.

What is claimed is:

1. A data communication apparatus having an error correction communication function, comprising:

memory means for storing data received from a transmitter in an error correction communication mode;

processing means connected to said memory means for processing data stored in said memory means;

calculating means for calculating a data amount corresponding to a time required to process data which has been stored in said memory means but not yet processed by said processing means; and sending means for sending a retransmission request signal to the transmitter to retransmit previously received data, wherein said sending means changes an amount of data to be retransmitted by the retransmission request signal based on the data amount calculated by said calculating means.

2. A data communication apparatus according to claim 1, wherein said sending means first performs a flow control by sending a signal indicating that said apparatus is not ready to receive data, and then sends the retransmission request signal.

3. A data communication apparatus according to claim 1, wherein said sending means sends a retransmission request signal requesting retransmission of data previously received correctly.

4. A data communication apparatus according to claim 1, further comprising means for suppressing writing of data retransmitted in reply to the retransmission request signal in said memory means.

5. A data communication method for use in an apparatus having an error correction communication function, comprising the steps of:

storing in memory data received from a transmitter in an error correction communication mode;

processing the data stored in said memory in said storing step;

calculating a data amount corresponding to a time required to process data which has been stored in the memory but not yet processed in said processing step; and sending a retransmission request signal to the transmitter to retransmit previously received data, an amount of data to be retransmitted by the retransmission request signal being changed based on the data amount calculated in said calculating step.

6. A data communication method according to claim 5, wherein said sending step includes first performing a flow control by sending a signal indicating that the apparatus is not ready to receive data, and then sending the retransmission request signal.

7. A data communication method according to claim 5, wherein said sending step includes sending a retransmission request signal requesting retransmission of data previously received correctly.

8. A data communication method according to claim 5, further comprising the step of suppressing a writing of data retransmitted in reply to the retransmission request signal in the memory means.

* * * * *

UNITED STATES PATENT AND TRADEMARK OFFICE
CERTIFICATE OF CORRECTION

PATENT NO. : 5,668,641

DATED : September 16, 1998

INVENTOR(S): TAKESHI TSUKAMOTO ET AL.

Page 1 of 2

It is certified that error appears in the above-identified patent and that said Letters Patent is hereby corrected as shown below:

<u>ON TITLE PAGE AT [57] ABSTRACT</u>

Line 1, "having" should read --has--;
Line 7, "printing" should read --printing,--.

<u>SHEET 33</u>
"TRAINNING" should read --TRAINING (both occurrences).

<u>COLUMN 4</u>
Line 54, "12V" should read --+12V--.

<u>COLUMN 5</u>
Line 33, "0P" should read --OP--.

<u>COLUMN 8</u>
Line 14, "step S55" should read --step S5--.

<u>COLUMN 9</u>
Line 1, "of" should be deleted.

<u>COLUMN 13</u>
Line 2, "steps S420" should read --step S420--.

<u>COLUMN 18</u>
Line 39, "After" should read --¶ After--.
Line 56, "S473" should read --S473.--.

UNITED STATES PATENT AND TRADEMARK OFFICE
CERTIFICATE OF CORRECTION

PATENT NO. : 5,668,641

DATED : September 16, 1998

INVENTOR(S): TAKESHI TSUKAMOTO ET AL.

It is certified that error appears in the above-identified patent and that said Letters Patent is hereby corrected as shown below:

COLUMN 20
Line 31, "responsive" should read --response--;
Line 67, "start" should read --start of--;

COLUMN 21
Line 19, "transmission B1" should read --transmissions B1--;
Line 57, "step 3661."" should read --S661.--.

COLUMN 22
Line 9, "transmission A1" should read --transmissions A1--.

COLUMN 23
Line 51, "few wastes" should read --little waste--.

Signed and Sealed this

Twenty-first Day of July, 1998

Attest:

BRUCE LEHMAN

*Attesting Officer*  *Commissioner of Patents and Trademarks*